United States Patent
Rabinovitz

(10) Patent No.: US 7,271,999 B2
(45) Date of Patent: Sep. 18, 2007

(54) ENCLOSURE FOR COMPUTER PERIPHERAL DEVICES

(76) Inventor: Josef Rabinovitz, 20400 Plummer St., Chatsworth, CA (US) 91344

( * ) Notice: Subject to any disclaimer, the term of this patent is extended or adjusted under 35 U.S.C. 154(b) by 38 days.

(21) Appl. No.: 11/142,010

(22) Filed: May 31, 2005

(65) Prior Publication Data

US 2006/0041783 A1   Feb. 23, 2006

Related U.S. Application Data

(63) Continuation-in-part of application No. 10/090,423, filed on Mar. 1, 2002, now Pat. No. 6,906,918, which is a continuation-in-part of application No. 09/310,036, filed on May 11, 1999, now Pat. No. 6,483,107, application No. 11/142,010, which is a continuation-in-part of application No. 10/386,297, filed on Mar. 11, 2003.

(51) Int. Cl.
   *G06F 1/16* (2006.01)
(52) U.S. Cl. ........................ 361/685; 248/682; 250/239
(58) Field of Classification Search ................ 361/685; 250/239; 248/682
   See application file for complete search history.

(56) References Cited

U.S. PATENT DOCUMENTS

| 4,941,841 | A | * | 7/1990 | Darden et al. | ............... 361/685 |
| 5,277,615 | A | * | 1/1994 | Hastings et al. | ............ 361/685 |
| 5,652,695 | A | * | 7/1997 | Schmitt | ....................... 361/685 |
| 6,058,016 | A | * | 5/2000 | Anderson et al. | ........... 361/685 |
| 6,064,569 | A | * | 5/2000 | Sands et al. | ................. 361/685 |
| 6,325,353 | B1 | * | 12/2001 | Jiang | .......................... 361/685 |

* cited by examiner

*Primary Examiner*—Lisa Lea-Edmonds
(74) *Attorney, Agent, or Firm*—W. Edward Johansen

(57) ABSTRACT

A canister is for use with a data storage device and a casing of a computer peripheral enclosure with the casing having at least one compartment. Each compartment has a rectangular cross-section and a depth. Each compartment also has two guide rail guides. The canister includes a u-shaped tray and a pair of guide rails. The u-shaped tray also has a pair of side walls. Each guide rail is mechanically coupled to the side walls of the u-shaped tray walls. The data storage device has a pair of side walls each of which has a pair of mounting holes. The canister on the guide rails of the unshaped tray slides freely, but snugly, into the compartment on the guide rail guides. The u tray has a pair of inward-directed protrusions each of which is aligned with one of the mounting holes of the data storage devices so that the storage device can be securely disposed with said u shaped tray.

2 Claims, 48 Drawing Sheets

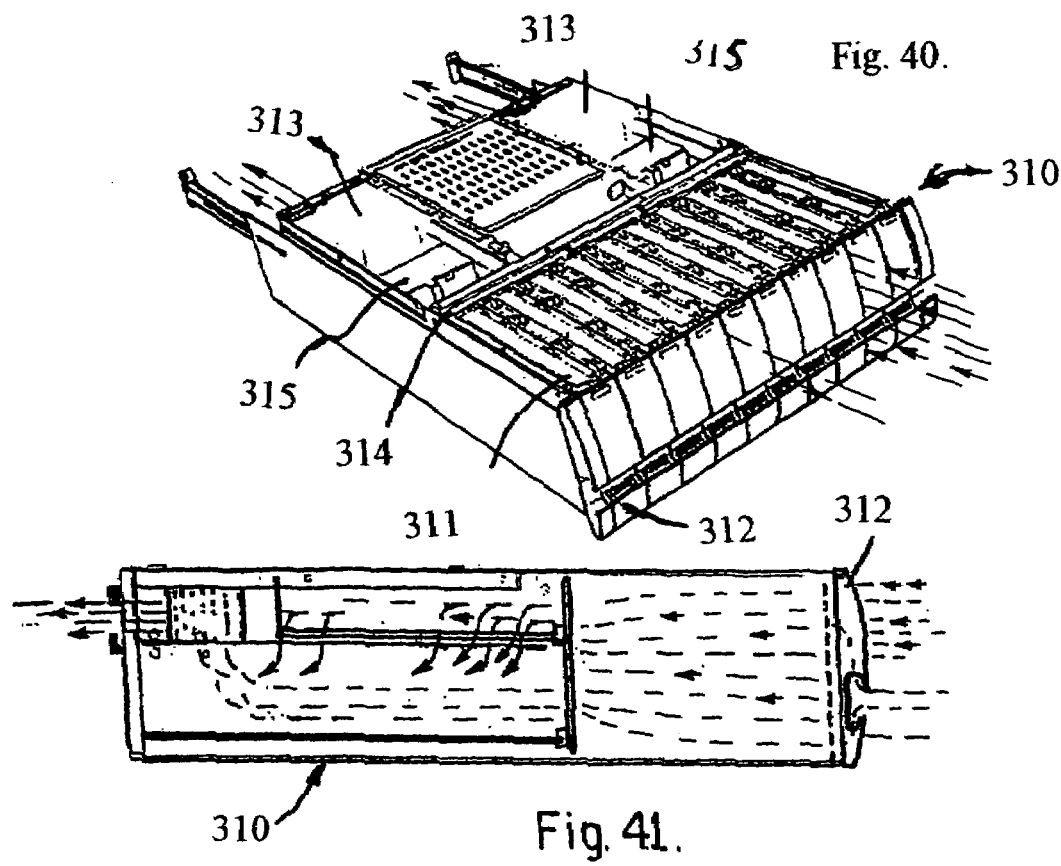
Fig. 40.
Fig. 41.
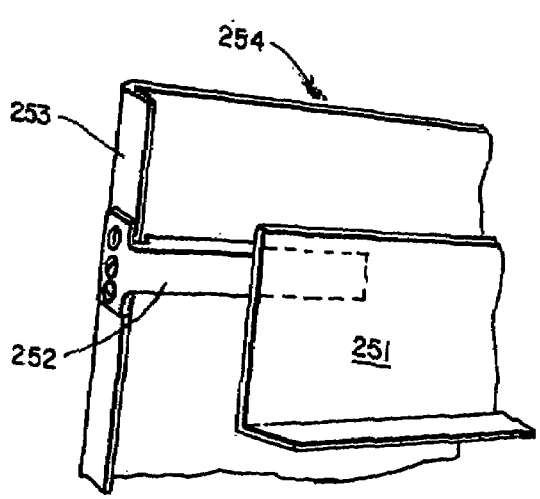
Fig. 35.

Fig. 36.
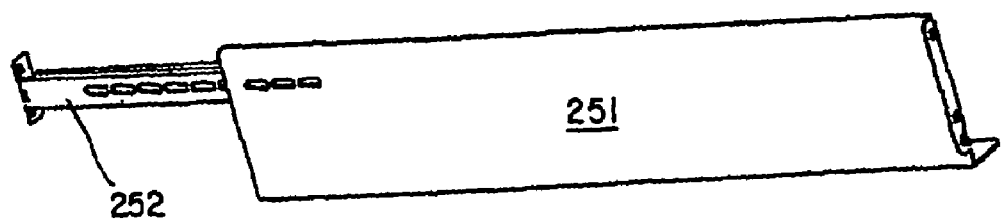
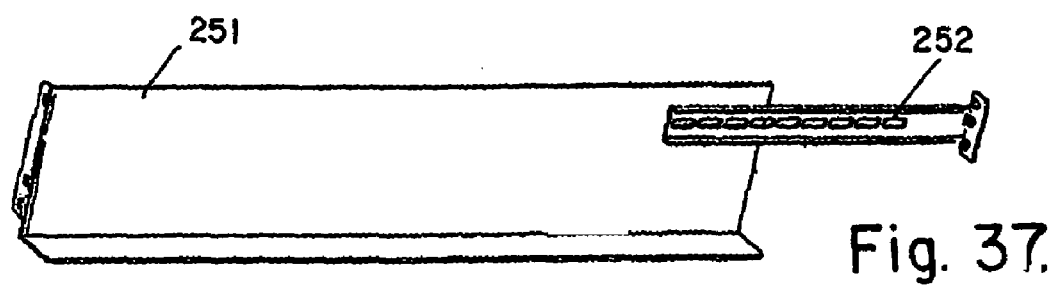
Fig. 37.
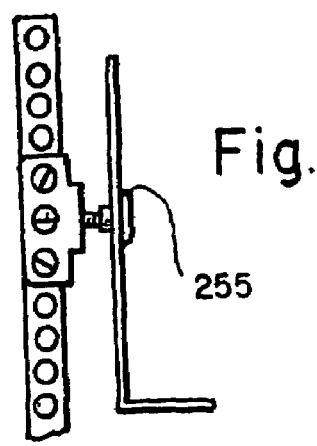
Fig. 38.
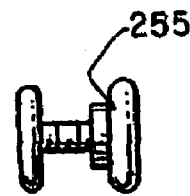
Fig. 39.

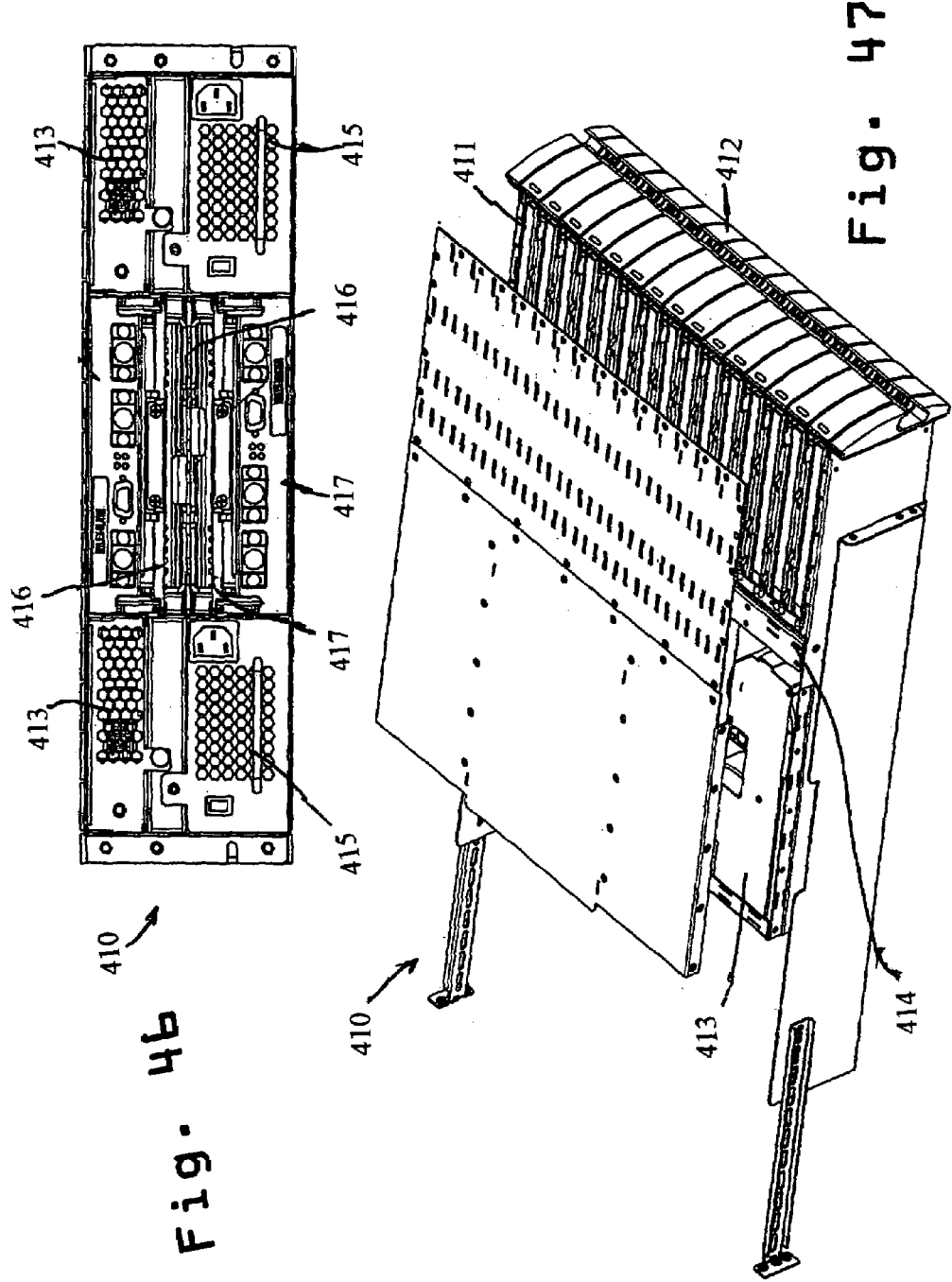

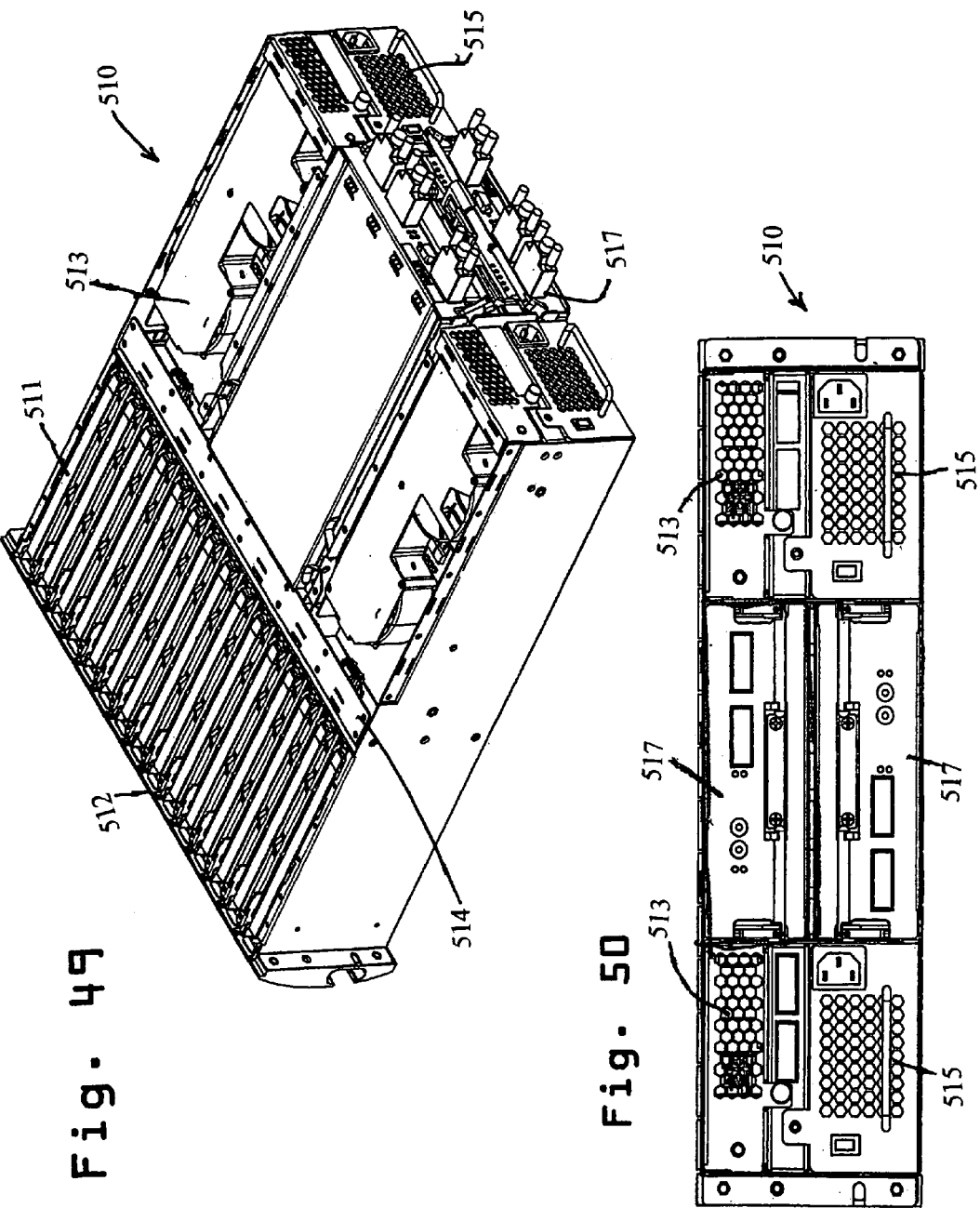

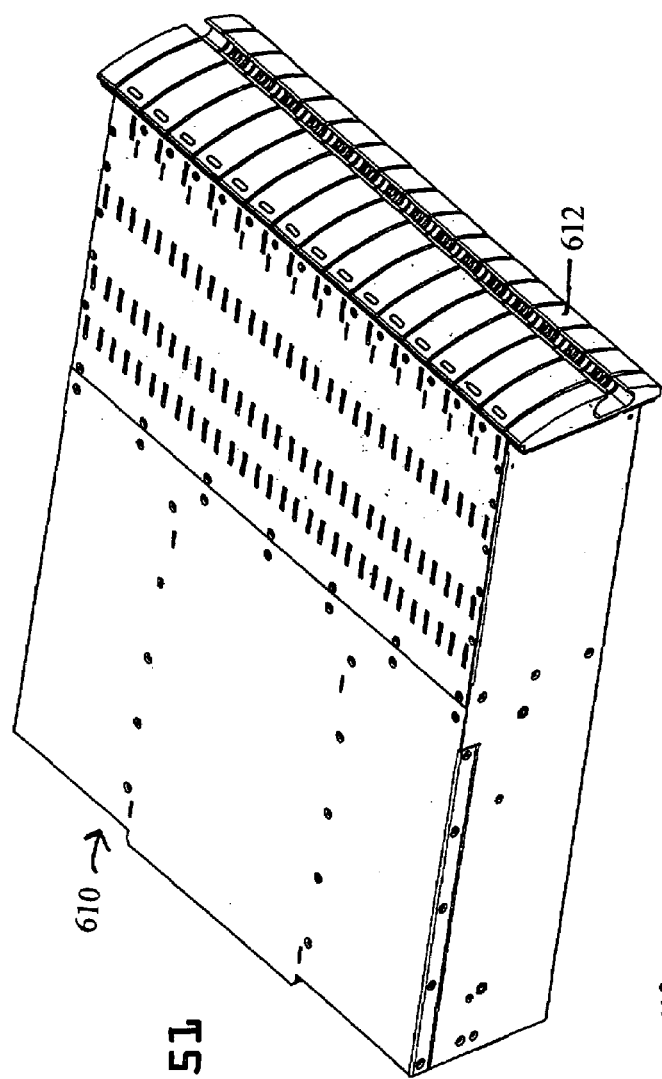
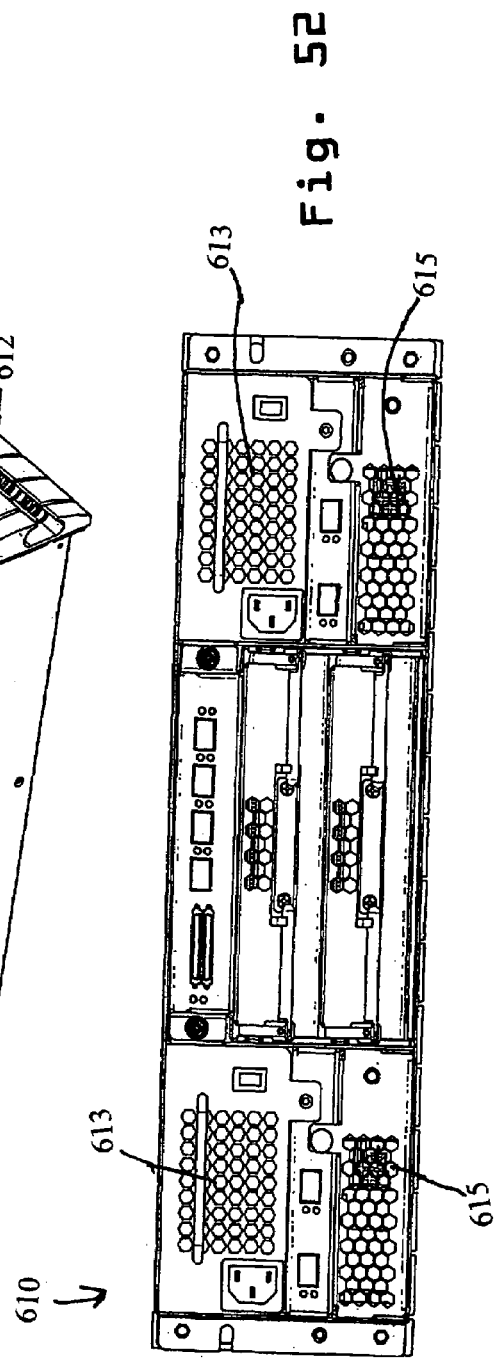
Fig. 51
Fig. 52

ENCLOSURE FOR COMPUTER PERIPHERAL DEVICES

This application is a continuation in part of the application filed under Ser. No. 10/090,423 on Mar. 1, 2002 now U.S. Pat. No. 6,906,918, which is a continuation in part of the application filed under Ser. No. 09/310,036 on May 11, 1999 U.S. Pat. No. 6,483,107. This application is also continuation in part of the application filed under Ser. No. 10/386,297 on Mar. 11, 2003.

BACKGROUND OF THE INVENTION

This invention relates to enclosures for receiving and operating computer peripheral devices and more particularly to enclosures that allow computer peripheral devices, such as hard disk drives, to be readily interchanged and used in different combinations.

Computers include storage devices and other peripheral devices. These storage devices include compact disks, floppy disks, magnetic optical disks and tape back-up units. These devices are connected by wires and are operated in conjunction with a computer. The spectacular proliferation of electronic devices, particularly computers, in modern society, both in numbers and complexity, demands that such devices satisfy ever-increasing standards of reliability and serviceability to avoid degeneration into chaos. In the early days of the computer industry, relatively high failure rates and corresponding "down time" when the computer system was unavailable to perform useful work were accepted as the norm. As the industry has matured, computers have become more reliable, and users have come to depend on these systems being available when needed. This dependence has become so profound that, for many businesses, the mere unavailability of the computer system for any appreciable length of time can cause significant commercial injury.

In the early days of the computer industry in order to replace a component in a computer one would shut off power to the computer, replace the computer component and re-power the computer. This is a logical way to fix a toaster, but the complexity of modern computers makes this undesirable. It is not possible to simply shut off power and then turn it back on as one would a light bulb. A computer system's state and data must be saved when it is powered down. Its software must be re-loaded, and its state restored, when it is re-powered. For a large modern computer system, these operations can take a very significant amount of time, during which the system is unavailable to its customers.

Computer manufacturers are well aware of the dependence of their customers and have accordingly devoted considerable attention to these problems. As a result, many modern computer systems have some degree of fault tolerance and are capable of concurrent maintenance. Fault tolerance means simply that a single component of the computer system may fail without bringing the entire system down, although in some cases performance of the system or some other characteristic may be adversely affected. Concurrent maintenance is the capability to repair or replace some component of a computer system without shutting down the entire system. The system can continue to operate and perform useful work (although possibly in a diminished capacity) while the repair is being performed. When a computer system is both fault-tolerant and capable of concurrent maintenance it can, in theory, be kept running 24 hours a day for an indefinite length of time. In fact few, if any, computer systems achieve this level of reliability with respect to every component that may possibly fail.

One example of this type of fault tolerance is an array of storage devices known as a redundant array of independent disks. A RAID system stores data on multiple storage devices in a redundant fashion, such that any data can be recovered in the event of failure of any single storage device in the array. RAID systems are usually constructed with rotating magnetic hard disk drive storage devices, but may be constructed with other storage devices such as optical drives, fiber channel devices and tape drives. A paper entitled, "A Case for Redundant Arrays of Inexpensive Disks", by Patterson, Gibson & Katz and presented at the ACM SIGMOD conference (June, 1988) describes RAID systems that provide different levels of redundancy or other operating characteristics and classifies five types of RAID, designated levels 1 through 5. The Patterson Nomenclature has become standard in the industry. RAID systems have proliferated to the point where an industry trade group called the RAID Advisory Board has attempted to establish standards for RAID characteristics. Further information regarding RAID systems can be found in The RAID-book, A Source Book for Disk Array Technology, published by the RAID Advisory Board (5th Ed. February 1996).

Frequently, a RAID system is manufactured and marketed as a stand-alone storage system that is housed in its own cabinet with its own power supply and supporting hardware and software and that communicates through a standard communications interface with a host computer system. Since it is desirable to make data available to the host system at all times, even if a single storage device in the RAID system fails, the RAID system will frequently have its own on-board data recovery capability that may include temporary spare drives for storage of recovered data. The RAID system may have redundant power supplies or other redundant components.

Electronic systems frequently use back-plane circuit cards for distribution of power, data signals and/or mounting of active or passive circuit elements and connectors. Such a card typically contains multiple parallel layers for embedded circuit patterns, grounds, or power distribution. Pluggable connectors couple the back-plane to other modules which make up the electronic system, such as power supply modules, storage devices, or logic cards. A back-plane card acts primarily as a distribution medium. The back-plane card conveys power and/or data signals from one module to another and contains relatively few functional components attached directly to the back-plane itself. The back-plane contains functional components.

A back-plane contains embedded power planes for distributing electrical power to pluggable modules or other attached devices. It also contains a multiple ground planes. One of the power planes is associated with ground and must be grounded. Grounding insures that electrical paths of negligible resistance are created between ground planes and the zero volts power plane.

The existence of such paths causes parasitic current to flow in the ground planes and lowers the noise immunity of the system. It is desirable to reduce the parasitic current flowing in the ground planes of a back-plane circuit card, particularly a back plane that distributes power to multiple pluggable modules.

U.S. Patent Application No. 0030005231 teaches an access detector that detects an access type of an access to one of a plurality of serial ports interfacing to serial storage devices. The access is intended to one of a plurality of parallel channels interfacing to parallel storage devices via task file registers of the parallel channels. A mapping circuit maps the serial ports to the parallel channels. A state machine emulates a response from the one of the parallel channels based on the access type and the mapped serial ports. The parallel ATA interface has existed in substantially the same form since 1989, and has become the highest volume disk drive interface in production. However, as demand for higher transfer and storage bandwidth increases, the parallel ATA is nearing its performance limit. Serial ATA interface is introduced to replace parallel ATA. The benefits of serial ATA include high data transfer rates up to 150 MB/s as compared to 100 MB/s for parallel ATA, low cost, easy installation and configuration and low pin count. However, due the large amount of parallel ATA currently in existence, the transition from parallel ATA to serial ATA may be a problem. Parallel ATA allows up to two devices to be connected to a single port using a master/slave communication technique. One ATA device is configured as a master and the other slave. Both devices are daisy-chained together via one ribbon cable that is an unterminated multidrop bus. This bus or connection is typically referred to as a parallel channel. In addition, a personal computer may have two parallel ATA channels: a primary channel and a secondary channel. Serial ATA, on the other hand, connects each of the two drives with individual cables in a point-to-point fashion. Software drivers for parallel ATA have to be modified to accommodate serial ATA. In addition, new serial ATA interface is preferably backward compatible with parallel ATA device drivers to avoid transition costs and provide an easy migration path.

U.S. Patent Application No. 0030045175 teaches a dual serial advanced technology attachment (SATA) connector that includes a first SATA connector interface, a second SATA connector interface and housing. The first SATA connector interface and the second SATA connector interface may be mounted in the housing in a double stack configuration parallel to each other. The first SATA connector interface and the second SATA connector interface may be mounted in the housing longitudinally in an end-to-end configuration. The footprints on a printed circuit board (PCB) associated with the SATA connector interfaces provide less manufacturing problems and good electrical performance. Dual SATA interfaces on a single connector save PCB space and manufacturing assembly time.

Currently, most computers have a storage device called a hard drive. A hard drive is connected to the computer by way of an interface, usually a controller card, a cable, and some software protocols. One type of hard drive interface used today is an integrated drive electronics (IDE) interface. This is also known as an advanced technology attachment (ATA) interface. ATA is the actual interface specification for the IDE standard. The current IDE/ATA standard is a parallel interface whereby multiple bits of data are transmitted at one time across the interface simultaneously during each transfer. A parallel interface allows for high throughput, however, as the frequency of the interface is increased, signaling problems and interference between signals become common. SATA is an interface specification that abandons the parallel concept in favor of a serial interface where only one bit is transferred at a time. This allows the interface to operate at higher speeds without the problems associated with a parallel interface at higher speeds. As computer processor performance has increased, so have the read/write data rates of hard disk drive heads and media. Serial ATA eliminates bottlenecks that occur in parallel AT interfaces. Currently, serial ATA connectors are only single position seven pin connectors. Today, not only are processor speeds increasing, but the amount of space that a computer fits into is also shrinking. Therefore, the motherboards or printed circuit boards (PCB) that hold the electronics and other devices for a computer have limited space. In a computer that may contain multiple hard drives, multiple SATA connectors may need to reside on the printed circuit board. This takes up considerable space, depending on the number of hard disk drives and associated SATA connectors. Therefore, there is a need for a dual serial ATA connector that saves PCB space and simplifies the assembly and manufacturing of the PCB.

U.S. Pat. No. 4,977,532 teaches a computer that includes computer cards, disk drives and power supply circuitry that are mounted in a drawer assembly that is readily removable from the rear of the cabinet.

U.S. Pat. No. 6,025,989 teaches a rack mounted multi-processor in a computer that has a node assembly. The node assembly has a logic chassis and a removable chassis. The logic chassis contains logic cards that include memory cards, a service processor card, central processing unit processor cards and input/output cards to which input/output and processor interconnecting cables are attached. The removable chassis contains the power supply module for the node, a node supervisor card, disk drives and cooling fans. The removable chassis is removable from the logic chassis without moving or disturbing the logic chassis. One fan of a pair of cooling fans in the removable chassis draws air through the power supply that has relatively higher cooling needs and blows the air into the logic chassis over logic modules that have relatively lower cooling needs. The other cooling fan draws air over the disk drives and node supervisor card and blows air over into the logic chassis over logic modules that have relatively higher cooling needs.

U.S. Pat. No. 5,604,873 teaches a disk drive controller that has a plurality of disk drive interfaces. Each disk drive interface includes a connector and a delay circuit. A set of power application circuits has a server which supports hot docking of SCA drives. Each connector mates with a hot docking disk drive having equal length connecting pins and detects the presence of such disk drive when the hot docking disk drive makes contact with the connector. Each delay circuit generates a set of properly delayed enabling signals to the corresponding power application circuits. Each set of power application circuits regulates power applications to the hot docking disk drive making contact with the corresponding connector. The delayed and regulated manner of applying power prevents voltage and power swings that might disrupt on-going operations and/or cause damages to the neighboring drives.

U.S. Pat. No. 5,790,374 teaches a computer cabinet and hot-pluggable disk drive module design that includes an indicator light support for the disk drive module. The cabinet includes a disk drive module-receiving bay into which the disk drive module is removably installed. The disk drive receiving module bay includes a back plane having at least one connector for engagement with a corresponding connector that is a single connector architecture connector, protruding from a leading surface of the disk drive module. A light source mounted to the back plane near the back plane connector is illuminated to provide status information concerning the disk drive module. A light conduit extends from the light source to a conspicuous viewing location on the computer cabinet. Multiple indicator lights and corresponding light conduits are tinted to different colors and may be employed to provide different status indications, such as power, activity and fault status information. The light conduits are incorporated into the disk drive modules. Once the disk drive module has been installed within the drive bay the light conduits extend from a location on a leading surface of disk drive tray opposing the light sources contained on the back plane to a conspicuous viewing location on a visible surface of the disk drive module.

U.S. Pat. No. 5,862,313 teaches a system that implements a serial RAID system. Data is striped for an array of disk drives and parity for the striped data is calculated and the resulting data and is written serially to a RAID system over a Fiber Channel or other type of network. The system also allows reading of the striped data and parity serially from the disk array.

U.S. Pat. No. 5,812,754 teaches a modular and highly available RAID system that has a fiber channel arbitrated loop interface coupled with a disk array. Fault-tolerant operation is assured. The system provides dual and isolated arbitrated host and storage device loop circuits for redundant, independent input/output paths to local and/or remote host computers. Each loop includes bypass circuits. The bypass circuits prevent the failure of any device (host computer or storage device) from affecting the operation of loop. Orthogonal data striping may be used to further assure data integrity.

U.S. Pat. No. 5,805,788 teaches a system that implements RAID-5 parity generation and reconstruction. Data for an array of disk drives is placed in an input/output buffer. The RAID-5 parity engine creates parity data and stores the resulting parity data in the input/output buffer as well. The input/output buffer (both the data and the parity) is then sector-striped across a network of disk drives, such as a Fiber Channel network. The RAID-5 parity engine creates parity on multiple stripes of data upon a single activation of the engine. The RAID-5 parity engine can reconstruct a sector of data using the parity information. The RAID-5 parity engine can also check the data against its expected parity.

U.S. Pat. No. 5,740,397 teaches an adapter for use in a computer system. The adapter has an IDE interface controller and a plurality of drives. The adapter is connected to the IDE controller and the plurality of drives and monitors information transmitted between the IDE interface controller and the plurality of drives. The adapter determines whether each of the plurality of drives is serviceable and whether data on each of the plurality of drives are equal. Identical data is directed to each of the plurality of drives when data on each of the plurality of drives are equal. Data is prevented from being directed to at least one of the plurality of drives when data on each of the plurality of drives are not equal. One of the pluralities of drives is selected as a drive from which to read data.

U.S. Pat. No. 5,515,515 teaches a small computer system interface disk array subsystem that has removable disk drive units that can be removed while the subsystem has power applied to it and is operational. In order to prevent malfunctions of other disks in the disk array, and in order to prevent rapid fluctuations in the current in the power circuits of the subsystem, the power and the data and control signals are applied to the inserted disk drive unit in a phased sequence. The ground of the disk drive unit is connected to the ground of the subsystem. A pre-charge power connects the power buses of the disk drive unit to the power buses of the subsystem through resistors so that capacitance is connected to the power buses of the disk drive unit is charged gradually through the resistors rather than abruptly. Power is applied directly from the power buses of the subsystem to the power buses of the disk drive unit. Finally, the control and data signal connections are made between the subsystem and the disk drive unit. This phased sequence of connections between the subsystem and the disk drive unit is accomplished by providing sets of contacts having differing lengths in a connector on the disk drive unit so that some connections are made before other connections.

U.S. Pat. No. 5,438,226 teaches an enclosure for heat-generating electronic components that establishes an airflow path for cooling air. Powered air movers force air through the enclosure. One powered air mover is mounted at the air inlet to the enclosure, and the other of which is mounted at the outlet. Only one air mover is used at a time. In the event of failure of the air mover being used, the remaining air mover begins operation. The total cooling airflow passes through both air movers. The air movers may be arranged in series with respect to the airflow. Because the air movers are mounted in series with respect to the airflow, the airflow pattern is substantially the same regardless of which air mover is currently operating. Hot spots may result when one fan in a fan bank fails. The enclosure may house a redundant array of independent disks of a computer system. The air movers are arranged serially with the airflow and may be used to provide additional cooling for severe operating conditions.

U.S. Pat. No. 5,991,852 teaches a memory system that includes a main memory such as a cache memory and a shadow or back-up cache memory in conjunction with a write cache. The shadow memory is coupled to the same data bus as the main memory and is written to simultaneously. There is no latency between writing to the main memory and writing to the shadow memory. Redundancy is provided for by having a switching circuit that allows control of the shadow memory to be transferred to a second controller upon failure of a first controller. A unique layout arrangement for a RAID chassis is also described in which back-to-back circuit boards are mounted in the center of the chassis and a main bus on one board becomes the shadow bus on the other board, providing a mirror arrangement for the circuit boards.

U.S. Pat. No. 6,058,019 teaches an electronic system that contains a back-plane circuit card assembly for distribution of electrical signals among component devices. Power is distributed in embedded power planes. One plane is associated with ground. The back plane also contains multiple embedded ground planes. The circuit card assembly is divided by an axis into two halves, each half receiving and consuming approximately equal power. Electrical couplings for power sources and power planes in each half of the back plane are located symmetrically with respect to the axis. A row of ground vias along the axis couples the ground planes to the associated power plane. At all other locations on the back plane the ground planes are electrically isolated from the associated power plane. The back-plane assembly includes a pair of base cards, connected by a single smaller jumper card in which all ground vias are located. Each base card lies on a respective side of the axis, the jumper straddling the axis. An intelligent redundant array of independent disks storage server has concurrent maintenance capability.

U.S. Pat. No. 5,822,184 teaches a modular data device assembly for a computer that has a housing that is designed to fit into a conventional, industry standard size expansion bay. Individual plug-in data storage devices, such as hard disk drive and compact disk drives, are disposed vertically in a stacked formation within the housing. A motherboard with plug-in connectors to which the drives are connected allows easy replacement of defective data devices, which devices slide in or out. The disk drives and modular data device assemblies may be arrayed in either series or in parallel to a controller. By its modular structure and redundant storage functions, the device benefits from what is known as the principle of an redundant array of inexpensive disks.

U.S. Pat. No. 5,797,667 teaches a hard disk drive mount. The hard disk drive mount includes a stop bar at either side of a front end of a hard disk drive frame. The stop bars prevent a pull handle on a case of the hard disk drive frame from being forcefully pulled up thereby protecting the hard disk drive lock. The relative movement between the pull handle and the stop bar results in a counter force between the case and a mount to cause two connecting ports to be separated to permit smooth removal of the hard disk drive.

U.S. Pat. No. 5,828,548 teaches a removable hard disk drive mount that includes structures at the end of a rack. The structures of the disk drive mount cooperate with structures on the shaft of a pivotal handle to ensure that final insertion of the hard disk drive casing into the rack is carried out in an even manner without excessive force. The mount includes two notches. The two notches are disposed at the end of a pivotal shaft of a handle for the casing. Corresponding angles and bent portions of the rack permit final insertion of the hard disk drive casing into the rack only when the handle is turned from a horizontal to a vertical position.

U.S. Pat. No. 5,886,869 teaches a sleeve that holds a hard disk drive in portable removable engagement with a computer. The sleeve includes a base and a cover attachable to the base by mechanism of threaded fasteners. The base includes plural holder arms. When the cover is removed from the base and the hard disk drive advanced into the base, the holder arms move outwardly as the hard drive rides on the arms. When the hard disk drive clears the arms, the arms, which are biased to a hold configuration, move back inwardly to hold the hard disk drive in the base, with the cover then attached to the base. The edge of the cover cooperates with the base to hold the holder arms in the hold configuration and thereby securely hold the hard disk drive in the sleeve.

U.S. Pat. No. 5,741,055 teaches a hard disk drive converting drawer that includes a drawer and a fixing seat. A pull handle is back and forth slidably disposed at the front end of bottom side of the drawer. A transverse beam is disposed between two balance levers of the pull handle for back and forth pulling an auxiliary lever to press and close/open a touch switch. When the touch switch is pressed and closed, the auxiliary lever is forced by a leaf spring disposed on one side to retract the pull handle to a hidden position. When the touch switch is bounded open, the pull handle is pushed and ejected for a user to easily pull out the pull handle. When pulling the pull handle, the auxiliary lever is driven to push a stopper block projecting from one side of the fixing seat so as to smoothly draw out the drawer from the fixing seat for taking out the hard disk drive.

U.S. Pat. No. 5,808,871 teaches a modular tower that has a plurality of bays. The bays are fitted with rails upon which individual trays are able to slide. The trays are detailed to carry electronic components. Each tray is fitted with electrical connectors that are connected to corresponding electrical connectors on a back plane in the tower. The tower can be employed vertically and horizontally. The tower has easily removable top and side panels. A base may be adjustably secured to one or more of the towers. The front thereof is fitted with a removable frame that carries a hinged door. The frame can be removed and rotated 180 degrees in order to change the swing of the door from left to right and vice-versa.

U.S. Pat. No. 5,788,347 teaches a system that interlocks computer peripheral enclosures.

U.S. Pat. No. 5,067,041 teaches a shielding strip for a computer that includes an electrically conductive housing and a non-conductive drive mounting structure situated within the housing.

U.S. Pat. No. 5,224,019 teaches a modular computer chassis that includes a main chassis. A motherboard is attached to the main chassis and a sub-chassis that is attachable to the main chassis. The sub-chassis has at least one computer component that is attached thereto such that the computer component is electrically connected to the motherboard. The computer component is separable from the main chassis by removing the sub-chassis from the main chassis. The sub-chassis contains those computer components subject to mechanical wear and most often requiring replacement, such as the power supply and hard disk drives. The sub-chassis is mechanically connected to the main chassis by using slots and tabs such that when the cover is in place upon the computer, then the sub-chassis is secured therein. The sub-chassis and the computer components disposed thereon thus form a module which is conveniently removable and replaceable such that those computer components most frequently requiring service is quickly removed and replaced by a person unskilled in computer repair.

U.S. Pat. No. 5,420,750 teaches computer apparatus that includes a compartment and a plurality of modules. Each module has a disk drive memory package and is inserted in a compartment.

U.S. Pat. No. 4,754,397 teaches a fault tolerant computing facility that includes a housing array for containing a plurality of hardware element modules such as disk drives, a plurality of modularized power supplies and plural power distribution modules.

U.S. Pat. No. 5,227,954 teaches a mounting arrangement which allows drives of different sizes to be mounted in a drive dock and the hardware device necessary to mount full height, half height or third height drives in a conventional size drive dock. The hardware device provides mounting plates which have upper and lower ridges for mounting a single disk drive of varying size within the single drive dock.

U.S. Pat. No. 5,222,897 teaches a circuit board inserter/ejector system which is for inserting a circuit board into a back plane in a chassis and for ejecting the circuit board from the back plane of the chassis. The inserter/ejector system can be used with a magnetic disk drive to facilitate insertion and removal thereof within a computer.

U.S. Pat. No. 5,224,020 teaches a modular electrical apparatus that includes a plurality of customer removable electrical devices such as disk drives. The devices and support units are all blind pluggable into a removable central electrical distribution unit.

U.S. Pat. No. 5,006,959 teaches a computer apparatus with modular components including segregated functional units like a disk array, various plug-in card packages, a plurality of power supplies, a plurality of fan units and a motherboard. Another goal for moving towards modular computer components is to improve reliability. A number of disk drives are interconnected in an array for redundant storage of data. Failure of one disk drive does not destroy irreplaceable data.

U.S. Pat. No. 5,119,497 teaches a computer that has modular components and is used/replaced on a common base mount. The computer also has a motherboard with some number N of connect-receptacles thereon. A deck is superposed to form a plenum above the motherboard and is characterized by N like aperture sets, a connector-slot in registry with each connect-receptacle and several like removable, circuit-modules. An air cool arrangement is arranged to draw cooling-air into the circuit-modules and down upon and across the motherboard.

U.S. Pat. No. 5,844,776 teaches a static memory device that has compatibility with a disk drive installed in an electronic apparatus as an external storage unit. The static memory device has a first memory board arranged on the same base portion as the one on which the disk drive can be installed, the first memory board having the same projected area as the disk drive.

U.S. Pat. No. 5,852,546 teaches a computer includes a chassis and a hard disk drive. The hard disk drive is mounted in the chassis of the computer.

U.S. Pat. No. 5,602,696 teaches a computer system that provides for quick removal and quick and simple installation of a disk drive into the system.

U.S. Pat. No. 5,327,308, U.S. Pat. No. 5,122,914, U.S. Pat. No. 5,515,215, U.S. Pat. No. 5,517,373 and U.S. Pat. No. 5,563,748 teach a computer system that provides for quick removal and quick and simple installation of a disk drive unit into the system.

U.S. Pat. No. 5,119,270 teaches a multimedia data storage system that includes a compartmentalized drawer which can be tailored to accommodate the differing cooling requirements of different device types thus allowing each device type to be mounted in any device position.

U.S. Pat. No. 5,207,613 teaches a high-density electronic module packaging system that includes a cabinet for housing a plurality of modules. Disposed at the rear of the cabinet and forming a rear wall thereof is a cooling system that is used for cooling the modules that are contained in the cabinet. Disposed within the cabinet are four cooling modules, a power distribution unit having twelve power converters and twenty-eight electronic modules. The number of cooling modules, power converters and electronic modules may be added or subtracted as needed or desired. The cooling modules allow the flow of cooling fluid to and/or from the power distribution unit and/or to the plurality of electronic modules. The power distribution unit supplies power to the plurality of electronic modules. The electronic modules may house one or more sub-modules such as storage disk drives or printed circuit boards.

U.S. Pat. No. 5,379,184 teaches a multi-module storage array that includes cabinets. Each cabinet has a number of identical bays.

U.S. Reissue Pat. No. 34,369 teaches an adapter that is provided for a removable information storage device in an information storage and retrieval system or control system.

U.S. Pat. No. 5,471,099 teaches a modular enclosure apparatus for a personal computer and a workstation that has a plurality of removable and replaceable modules. These modules include a cooling module for cooling the enclosure. A memory storage device module has a plurality of mating slides and carriers for routine installation and removal of each memory storage device and a power supply module for providing power to the enclosure. The modular enclosure apparatus includes a RAID controller module that is similarly removable and replaceable. Each module may include a circuit interrupt assembly for disabling individual modules by cutting off power to the desired module and allowing that module or parts contained therein to be removed while the power is disabled only to the module desired and the remaining modules continue to be enabled.

U.S. Pat. No. 5,247,427 teaches a disk array system that is for use in a data processing system. The disk array system includes a chassis having a top wall, a bottom wall, two side-walls, an open front end and an open rear end. Disposed within the chassis are three power supplies, a pair of controller boards, a back plane and a set of twenty disk drive modules.

U.S. Pat. No. 5,604,662 teaches an expandable modular data storage system that includes a plurality of data storage devices and a plurality of identical, vertically stackable storage device housings. The housings slidably receive a data storage device and mechanical connection elements for releasably connecting the top of one storage device housing to the bottom of a storage-device housing stacked thereon.

U.S. Pat. No. 6,061,250 teaches a full enclosure chassis system with tool-free access to hot-pluggable circuit boards therein. The system includes a front access plate that can be opened and closed from the front of a primary chassis when mounted within a secondary chassis so that only the front access panel is externally accessible. When the front access plate is in an open position, circuit boards within the full enclosure chassis system can be hot-pluggably removed and inserted without powering down the system or disrupting any component of the system. The full enclosure chassis system supplies standard connector access to the components that are external to the system and are connected by standard connectors disposed at the back plane at the back panel of the system.

U.S. Pat. No. 5,777,845 teaches a disk array which includes a mainframe chassis conforming to standard SCSI disk drive mechanical form factors, and a motherboard and a RAID controller within the chassis. The motherboard interconnects electrical signals between the electronic modules, at least some of which include disk drives forming a redundant array of independent, or inexpensive, disks. One of the electronic modules is a secondary power supply module that is connectable to the motherboard. The RAID controller is electrically connected to a system host power supply and a host interface bus. Through the RAID controller the motherboard interconnects all the electrical signals between the system host power supply and the host interface bus with the secondary power supply module and the RAID disk drives.

U.S. Pat. No. 6,065,096 teaches a RAID controller which is integrated into a single chip. The RAID controller chip includes a general purpose RISC processor, memory interface logic, a host central processing unit peripheral component-interconnect bus, at least one back-end input/output interface channel, at least one direct memory access channel, and a RAID parity assist circuit. The RAID chip enables higher integration of RAID functions within a printed circuit board and in particular enables RAID function integration directly on a personal computer or workstation motherboard. The back-end input/output interface channel is a dual SCSI channel. The RAID chip is operable in either of two modes. In a first mode, the chip provides pass through from the host central processing unit interface directly to the dual SCSI channels. This first mode of operation, a SCSI pass-through mode, allows use of the chip for non-RAID storage applications and enables low level manipulation of the disk array in RAID applications of the chip. The first mode of operation permits use of the chip without change to host applications and drivers. Rather, the chip is operable in a manner compatible with known available SCSI controller devices. The second mode of operation, a RAID control mode, provides full RAID management features to the attached host central processing unit. The RAID chip presents an intelligent input/output interface to the host central processing unit to enhance portability and performance of the host/RAID interaction.

U.S. Pat. No. 6,061,752 teaches a technique that allows hot plugging a peripheral controller card, containing both a local bus and a peripheral bus on a single connector, into a host system board containing a host system bus and a host input/output bus. When mating the peripheral controller card to the host system board a local device power supply is inactive, a peripheral device power bus is powered, and signal lines of a peripheral device are maintained in a high impedance state. Following a delay after the mating, the LDPS is activated by the host operating system. Following the activation of the LDPS, the host system bus is coupled to the single connector through switches that are under OS control. In response to the activation of the LDPS, the signal lines of the peripheral device are enabled. The peripheral controller card is a disk array controller card, the local bus is a peripheral component-interconnect bus and the peripheral bus is a SCSI bus. The disk array controller card is coupled to a mass storage peripheral and is programmed for RAID. A peripheral component-interconnect bus and a SCSI bus are carried on a single peripheral connector in order to provide cable management and readily allow hot plugging a redundant peripheral controller card into the host system board.

U.S. Pat. No. 6,058,054 teaches a system that provides a backup of a portion of a source drive of a plurality of drives in a redundant array of inexpensive disks data storage system. The portion of the source includes a plurality of segments. The system includes a source drive that is associated with a target drive of the plurality of drives.

U.S. Pat. No. 6,018,456 teaches an enclosure system that receives a number of plug in computer peripheral devices that includes hard disk drives in a disk array and utilizes front and rear cages or enclosures that are separated by a vertical back-plane. The back-plane has internal circuit interconnections and multi-pin docking connectors on each face. The system enclosure for receiving a number of computer peripheral devices to be plugged into and removed from interconnecting circuits includes front and rear cage enclosures. Each cage has a rectangular outline and open front and rear sides relative to an insertion axis the front cage enclosure including guide mechanisms that may be positioned at different elevations on the sides thereof to accommodate combinations of peripheral devices of different heights. A back plane circuit board has front and rear faces and being mounted vertically between the rear of the front enclosure and the front of the rear enclosure. The back plane circuit board includes multi-pin docking circuit connectors on the front and rear faces. Each of a plurality of computer peripheral holding units may be inserted through the front of the front cage enclosure into engagement with connectors on the front face of the back plane. Each of a plurality of support modules may be inserted through the rear opening of the rear enclosure into engagement with the connectors on the rear face of the back plane.

With the advent of disk arrays a number of hard disk drives are used together with a data processing system in order to provide high storage capacity. Manufacturers early adopted the approach of mounting a number of disk drives in a single enclosure. This became possible after hard disk drives and other peripherals became available that were compact, in successively smaller formats (8 inch, then 5¼ inch, then 3½ inch) while achieving high capacity storage now in the gigabyte range. Host computers and disk drive controller cards were designed to operate different disk drives in interrelated fashion on data to be stored by employing disk striping to distribute a data block among a number of disk drives. Data distribution was used to substantially increase data transfer rates, and also to facilitate error correction, using redundancy to improve reliability. These developments also led to the introduction of a number of variants that became referred to as RAID technology, which now encompasses tape drives as well as hard disk drives. Among the features adopted were the use of exchanges of spare drives for defective drives, and the mounting of disk drives and other peripherals in plug-in cassettes, canisters or trays of different configurations. These allowed the peripherals to be inserted into and retained in the enclosure and enabled completion of electrical power and data transfer connections. The peripheral devices could be removed in a "hot swapping" approach that precluded the need for shutdown. There are now many different types of enclosures for removable computer peripheral devices that include hard disk drives in RAID and non-RAID arrays. A number of adapter systems are available that are employable with a standard computer port or receptacle (now typically 5¼ inches or 3½ inches) to enable a smaller sized peripheral within a cassette or canister to be removably inserted. These systems include local controller cards, personality boards, power supplies and interconnects for the different computer peripheral devices. As the array systems and structures have become available in larger volume, system requirements have come into conflict with demands for greater versatility in use along with customer insistence on reduced cost. Current demands are for enclosures that can incorporate different sizes of disk drives, so as to accommodate different storage capacities or different device different configurations. When configurations change, the user interface (display and controls) should likewise be changed to be compatible.

U.S. Pat. No. 6,331,933 teaches a power sub-frame that has four walls defining first, second, third and fourth sides of a open, rectangular frame. A fifth side is open for receiving a plurality of power supply units for powering the system unit. A power distribution board located at a sixth side of the frame opposite to the open side, for making electrical contact to the power supply units. The power sub-frame can be manufactured as a sub-assembly for a system unit, facilitating manufacture, testing and maintenance. The power sub-frame can be pre-assembled with power distribution logic and cabling ready to be mounted in a system unit. The system unit can, for example, be a computer system unit for rack mounting in a telecommunications application.

U.S. Pat. No. 6,201,692 teaches a disk drive preferences. In 3½ inch drives higher capacity units are taller (1⅝ inches) than lower capacity (1 inch high) units even though both fit within a port or bay designed for a 3½ inch drive. An enclosure accommodates an integral number of whatever height drive is to be used or even allow a mix to be employed. Another respect in which the enclosure is adaptable relates to the different types of bus interconnections that may have to be made. The host input/output connection can be any of a number of different types. The local bus peripheral bus interconnections can also be of one of many different types, such as SCSI, IDE, and peripheral computer interconnect devices. There is also growing adoption of a connection approach known as Single Connector Attachment. It is therefore desirable to have available an arrangement in which only a back plane need be interchanged if different buses are to be used. The multiple pin mating connectors and cables used with different buses also should be readily changeable for enclosure that houses a mix of "slim" and "half high" disk drive sizes in almost any order. The disk drive enclosure includes at least thirteen equally spaced pairs of guide rails.

U.S. Pat. No. 6,313,983 teaches a computer enclosure that includes and an inner casing and an outer casing that receive the inner casing therein. The inner casing includes a bottom panel and a front panel that extends upright from the bottom panel. A disk drive rack is arranged above the bottom panel and attached to the front panel. A main board support panel supporting a main board is attached to the front panel, the bottom and the disk drive rack on a first side of the inner casing. A support member is connected between the disk drive rack and the bottom panel on an opposite second side of the inner casing for enhancing mechanical stability of the structure of the inner casing. The support member has an upper end pivotally attached to the disk drive rack. The support member is movable between an open position where the support member is substantially located outside the inner casing for facilitating maintenance and a closed position where an lower end of the support member engages with the bottom panel to releasably secure the support member to the bottom panel. The support member defines three sets of openings for selectively and interchangeably engaging with pawls of three receptacles containing power supplies of different specifications. Power supplies of different specifications may be selectively mounted to the computer enclosure.

U.S. Pat. No. 6,272,573 teaches a storage system for a computer system in which the storage capacity can be incrementally increased without disrupting the operations of the storage system. The storage system includes a base unit and a plurality of modular units. The modular units are inserted into the base unit when increased storage capacity is required. Each modular unit has an enclosure including a top wall, a bottom wall and two side walls. The bottom and top walls each have at least one power connector and data transmission connector. The bottom wall of a first modular unit attaches to the base unit and the top wall of the first modular unit can attach to the bottom wall of a second modular unit. At least one back plane is provided in each modular unit for providing attachment for a set of storage devices. A data transmission interconnect system transmits data and commands between the plurality of storage devices in the modular units and an external source. In the event of a loss of connection to any one set of storage devices data and commands can still be transmitted from and to any other set of storage devices. Application programs running on a host system issue requests to access data stored on the storage devices that are routed through an input/output bus adapter. An input/output bus itself is the medium in which host commands, disk responses and data are moved between adapters and the storage devices. A disk controller connects a host computer's input/output bus to the storage device input/output bus through a bus adapter channel. The input/output buses are small computer storage interconnect devices to the serial storage architecture and the fiber channel arbitrated loop. Storage subsystems also include power converters. Power from commercial AC power sources needs to be converted to DC power and further converted to supply the amount of power needed for the hard disk drives and the cooling fans in the subsystem. Redundancy is required in all aspects of the storage system, including the hard disk drives, the cooling fans and the power converter systems.

U.S. Pat. No. 6,118,776 teaches an apparatus that provides a fiber channel interconnection between a plurality of private loop devices through a Fiber Channel private loop device interconnect system. The Fiber Channel private loop device is connected to two or more Arbitrated Loops containing one or more private loop devices. The interconnect system includes a routing filter to filter incoming arbitrated loop physical addresses to determine which fiber channel frames must attempt to be routed through the fabric. Numerous topologies of interconnect systems may be achieved.

U.S. Pat. No. 6,338,110 teaches a data storage system that includes a first storage channel, a first controller that is coupled to the first storage channel and a first storage device that is coupled to the first storage channel. The system also includes a second storage channel, a second storage device that is coupled to the second storage channel and a switch that is coupled to the first storage channel and the second storage channel. The switch separates the first storage channel from the second storage channel in a first state and connects the first storage channel and the second storage channel in a second state. For disk drives and RAM disks, a storage array is commonly called a disk array, in which a disk controller connects a host computer to multiple disk drives. The disk controller provides access to the actual drives in a just a bunch of drives configuration or performs striping of data across the drives in a redundant array of independent disks configuration. Storage channels include an AT Attachment, a small computer system interface, a fiber channel or storage system architecture. The external access interfaces often include industry standard architecture, bus or peripheral component-interconnect bus for host adapters, SCSI, fiber channel, or SSA. For tape drives, the storage array commonly includes individual tapes or tape silos. The controller may provide data striping capability across the tapes. The storage channels and external access interfaces are usually the same as for disk drives. For memory chip storage devices, the storage array commonly is the main processor memory, cache memory, or other memory subsystem. The controller commonly performs error detection and correction (parity and ECC) and provides data striping (usually called interleaving). The storage channels are the memory buses. The external access interfaces are commonly peripheral component-interconnect bus or processor bus. In order to maintain access to the storage devices in the event of a single controller failure (to provide high-availability), two controller cards may be attached to the same storage devices, in a 'dual-controller' configuration. One controller may provide access to one set of storage devices and the other controller may provide access to another set of storage devices.

U.S. Pat. No. 6,304,942 teaches a system that upgrades an original data storage system into an enhanced data storage system. The data storage system includes a storage array controller device and a storage array. The data storage system is initially connected to a host system via a host bus and presents to the host system an original logical volume mapping associated with a logical identifier and mapped to a physical data set stored in individual storage devices in the storage array. An enhanced storage array controller device is operatively connected to the host system via the host bus and the storage array controller device and a storage connection device coupled to another storage array are operatively connecting to the enhanced storage array controller device via an intermediate bus. The physical data set of the storage array is redistributed across a plurality of storage arrays, including the original and the other storage arrays. The enhanced storage array controller device is reconfigured to present to the host system a logical volume mapping associated with the logical identifier mapping to the physical data set redistributed across the plurality of storage arrays. Other storage controller cards do not provide RAID functionality and merely present the host system with access to multiple disks in an enclosed array (often referred to as a JBOD) without providing the virtual disk functionality. When a JBOD is connected via a SCSI bus, for example, each disk is addressed with both a SCSI Target ID and at least one LUN. Such storage controller cards do not provide RAID functionality, but are intended primarily to provide access to multiple disks and to monitor the environment within a disk array enclosure.

U.S. Pat. No. 6,243,787 teaches an apparatus that conveys data over a packet-switching network. Data are received from a peripheral device for transmission via the network to a memory associated with a central processing unit, followed by an interrupt signal from the peripheral device associated with the data. One or more data packets containing the data are sent over the network to a host network interface serving the memory and the central processing unit, followed by an interrupt packet sent over the network to the host network interface. Responsive to the interrupt packet, an interrupt input of the central processing unit is asserted only after the one or more data packets have arrived at the host network interface. In current-generation computers, the central processing unit is connected to the system memory and to peripheral devices by a parallel bus, such as the ubiquitous Peripheral Component Interface bus. As data path-widths grow, and clock speeds become faster, however, the parallel bus is becoming too costly and complex to keep up with system demands. In response, the computer industry is moving toward fast, packetized, serial input/output bus architectures, in which computing hosts and peripheral are linked by a switching network, commonly referred to as a switching fabric. A number of architectures of this type have been proposed, including "Next Generation input/output" and "Future input/output," culminating in the "INFINI-BAND" architecture, which has been advanced by a consortium led by a group of industry leaders (including Intel, Sun, Hewlett Packard, IBM, Compaq, Dell and Microsoft). Storage Area Networks provide a similar, packetized, serial approach to high-speed storage access, which can also be implemented using an INFINIBAND fabric. In a parallel bus-based computer system, when a peripheral device needs to deliver data to the central processing unit, it typically writes the data to the memory over the bus, using direct memory access. When the peripheral has finished writing, it asserts an interrupt to the central processing unit on one of the interrupt lines of the bus. Bus arbitration ensures that the central processing unit will not attempt to read the data from the memory until the writing of the data is complete. When a packet-switching fabric connects a peripheral device and a central processing unit they operate asynchronously. The data sent to the memory and the interrupt to the central processing unit travel over different paths, or channels. A separate line or channel is provided to connect the interrupt pin of the peripheral device to an interrupt controller of the central processing unit, bypassing the switching fabric. There is no a priori assurance that all of the data will have been written to the memory before the central processing unit begins reading.

The inventor hereby incorporates all of the above referenced patents into this specification.

SUMMARY OF INVENTION

The present invention is generally directed to a canister that is for use with a data storage device. A casing of a computer peripheral enclosure with a casing having at least one compartment. Each compartment has a rectangular cross-section and a depth. Each compartment also has two guide rail guides.

In a first separate aspect of the invention the canister includes a u-shaped tray and a pair of guide rails. The u-shaped tray also has a pair of side walls. Each guide rail is mechanically coupled to the side walls of the u-shaped tray walls. The canister on the guide rails of the u-shaped tray slides freely, but snugly, into the compartment on the guide rail guides.

In a second separate aspect of the invention the data storage device has a pair of side walls each of which has a pair of mounting holes. The u shaped tray has a pair of side walls each of which has a pair of inwardly directed protrusions each of which is aligned with one of the mounting holes of the data storage devices so that the storage device can be securely disposed with said u shaped tray.

Other aspects and many of the attendant advantages will be more readily appreciated as the same becomes better understood by reference to the following detailed description. The features of the present invention which are believed to be novel are set forth with particularity in the appended claims.

DESCRIPTION OF DRAWINGS

FIG. 35 is a partial perspective drawing of a rail assembly for a rack-mountable, ten storage-device peripheral enclosure.

FIG. 36 is a partial outside, elevation side view of the rail assembly of FIG. 35 for a rack-mountable ten storage-device peripheral enclosure.

FIG. 37 is a partial inside, elevation side view of the rail assembly of FIG. 35 for a rack-mountable ten storage-device peripheral enclosure.

FIG. 38 is a partial outside, front perspective view of the rail assembly of FIG. 35 for a rack-mountable ten storage-device peripheral enclosure.

FIG. 39 is a front perspective drawing of one of the screws for the rail assembly of FIG. 35.

FIG. 40 is a front perspective drawing of the rack-mountable, ten storage device peripheral enclosure of FIG. 28 showing the path of air which is being drawn into and exhausted from the rack-mountable, ten storage device peripheral enclosure.

FIG. 41 is a side schematic drawing of the rack-mountable, ten storage device peripheral enclosure of FIG. 28 also showing the path of air which is being drawn into and exhausted from the rack-mountable, ten storage device peripheral enclosure.

FIG. 46 is a rear elevation view of the first rack-mountable, fifteen storage-device peripheral enclosure of FIG. 45.

FIG. 47 is a front exploded view of the first rack-mountable, fifteen storage-device peripheral enclosure of FIG. 45.

FIG. 49 is a front perspective view of the first rack-mountable fifteen storage-device peripheral enclosure of FIG. 45.

FIG. 50 is a rear elevation view of a second rack-mountable, fifteen storage-device peripheral enclosure that includes dual personality boards.

FIG. 51 is a front perspective drawing of a third rack-mountable fifteen storage device peripheral enclosure that includes a fifteen drive back plane and dual personality boards.

FIG. 52 is a rear elevation view of the third rack-mountable, fifteen storage-device peripheral enclosure of FIG. 51 that includes dual personality boards.

FIG. 72 is an exploded perspective of the canister of FIG. 73 each side wall has a pair of inward-directed protrusions that are aligned with mounting holes.

DESCRIPTION OF THE PREFERRED EMBODIMENT

Figure 1:
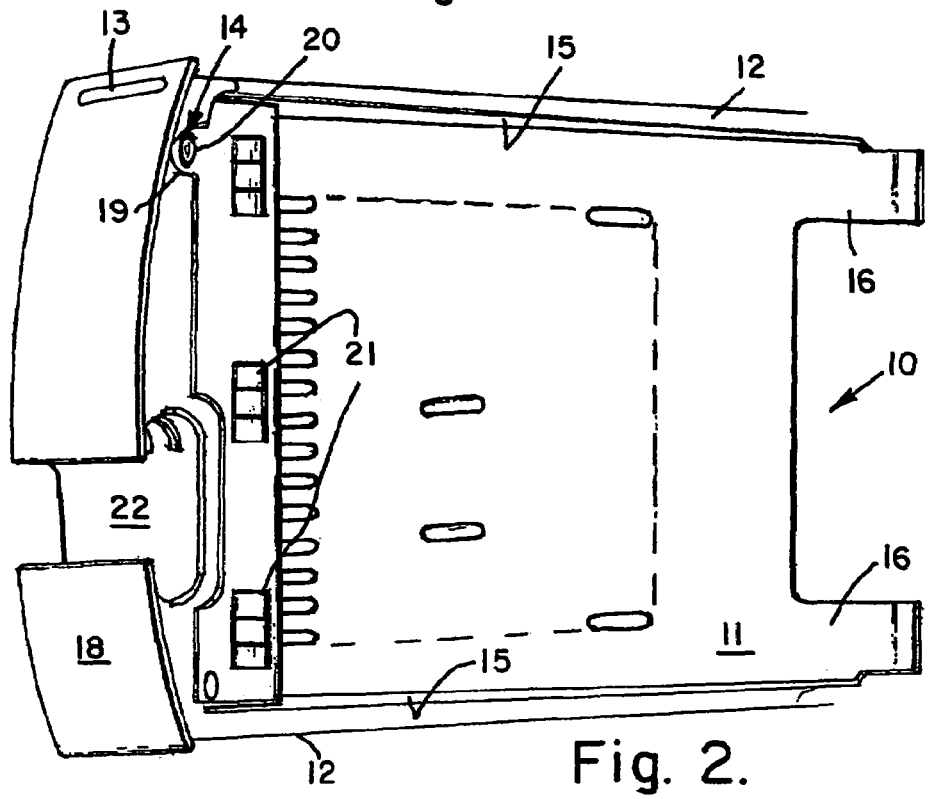
FIG. 1 is a perspective drawing of a canister that has a combined guide rail and light pipe system and a cam mechanism.
Figure 2:
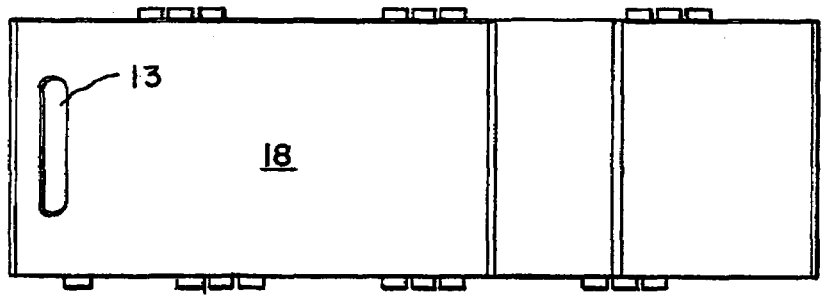
FIG. 2 is a front plan view of the canister of FIG. 1.
Figure 3:
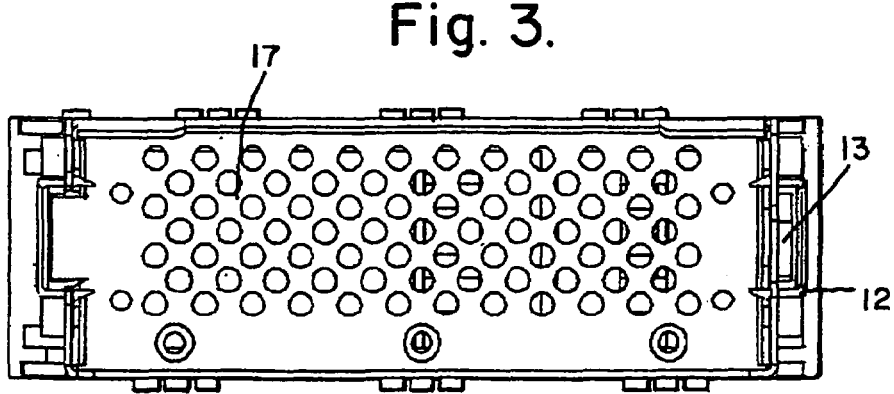
FIG. 3 is a rear plan view of the canister of FIG. 1.

Referring to FIG. 1 in conjunction with FIG. 2 and FIG. 3 a canister 10 includes a u-shaped tray 11 and two guide-rails 12. The u-shaped tray 11 has a rectangular cross-section and a depth. The canister 10 also includes a light pipe system 13 and a cam mechanism 14. The u-shaped tray 11 has two side walls 15 and two return lips 16. The canister 10 includes a front plate 17 and a handle 18. The front plate 17 is mechanically coupled to the u-shaped tray 11.

Figure 4:
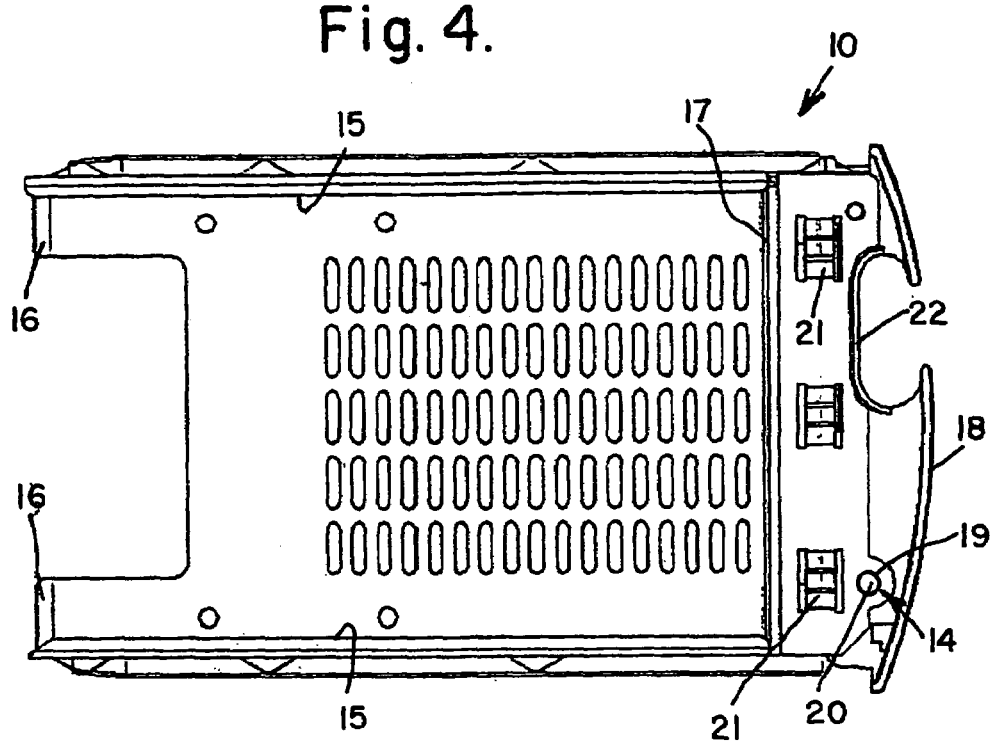
FIG. 4 is a top plan view of the canister of FIG. 1.
Figure 5:
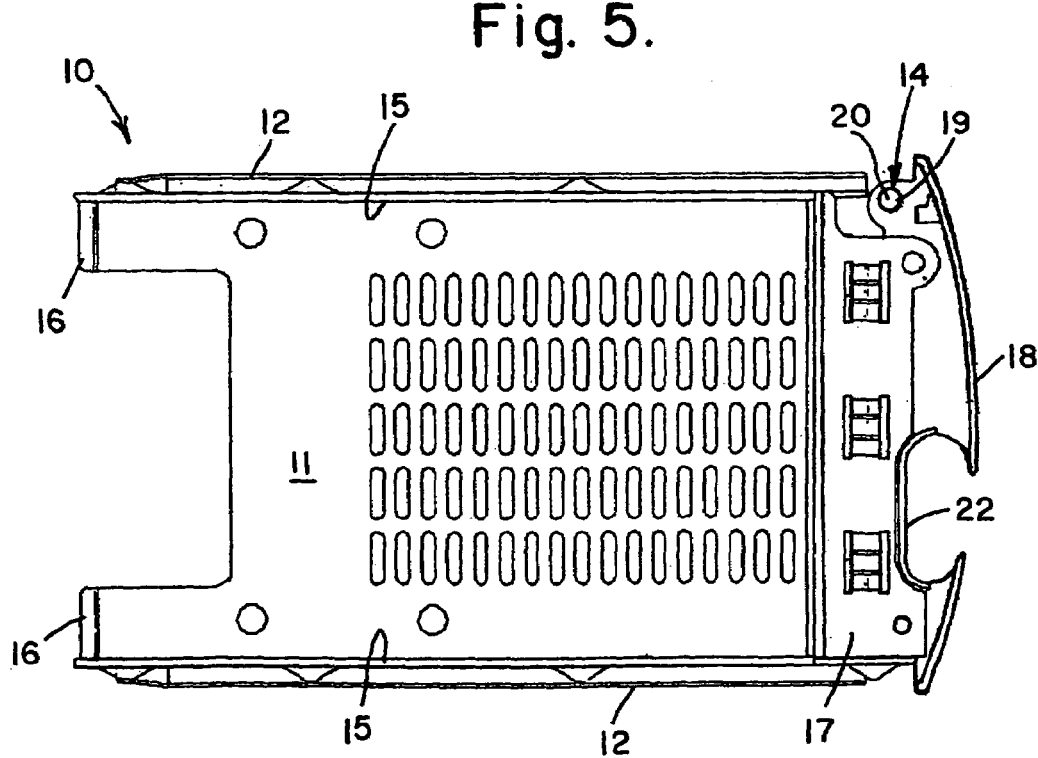
FIG. 5 is a bottom plan view of the canister of FIG. 1.

Referring to FIG. 4 in conjunction with FIG. 1 and FIG. 5 each guide rail 12 is mechanically coupled to one of the two side walls 15 of the u-shaped tray 11. The cam mechanism 14 has a pivot mount 19 and a pin 20. The pivot mount 19 mechanically couples the handle 18 to the u-shaped tray 11. The two lips 16 are adjacent to the bottom surface of the u-shaped tray 11 at its rear end. The u-shaped also has a plurality of flat springs 21 that are disposed on the top outside surface and the bottom outside surface of the canister 10. The handle 18 has a plastic insert 22 that is used for a commercial designation of a customer. The customer may choose the color and texture of the plastic insert 22.

Figure 6:
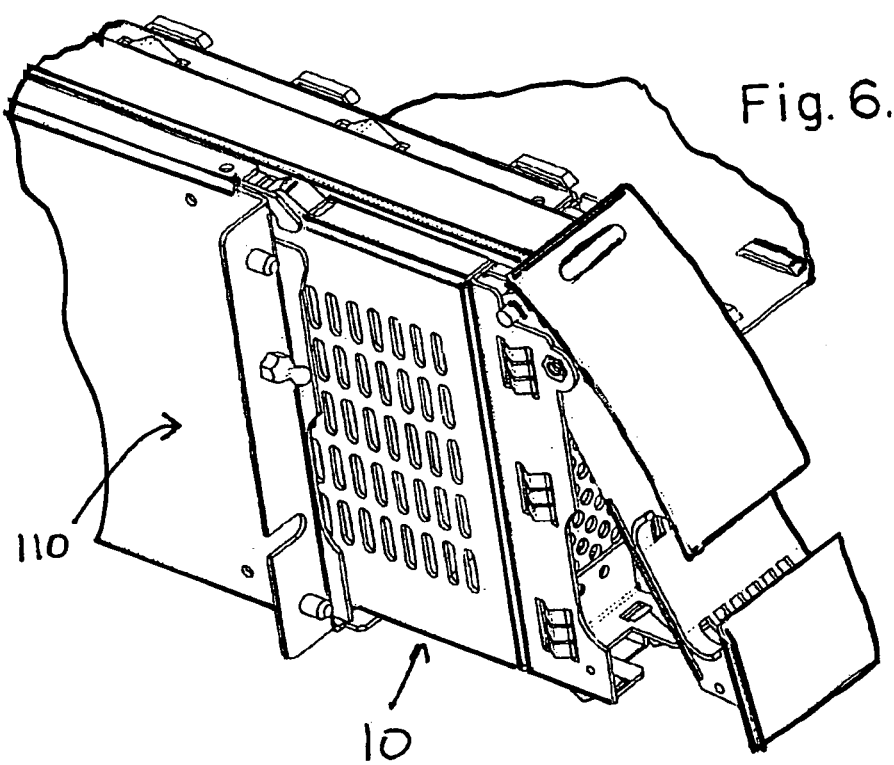
FIG. 6 is a schematic drawing of the canister of FIG. 1 as the canister is being inserted into one of the compartments of a casing.

Referring to FIG. 6 in conjunction with FIG. 1 a computer peripheral enclosure has a casing 110. The casing 110 has a plurality of compartments 111, two guide rail tracks 112, a slot 113 and a back plane 114. Each compartment 111 is rectangular and has a cross-sectional area and a depth. The compartment 111 also has two rail guide tracks 112. The cross-sectional area and the depth of the u-shaped tray 11 are slightly less than the cross-sectional area and the depth of the compartment 111, respectively. The u-shaped tray 11 of each canister 10 is able to slide freely, but snugly, into one of the compartments 111 of the casing 110. The guide rails 12 of the u-shaped tray 11 slide freely, but snugly, onto the rail guide tracks 112 of the compartment 111. The two lips 20 of the u-shaped tray 11 assist the user as he inserts the u-shaped tray 11 of each canister 10 into one of the compartments 111 of the casing 110. The flat springs 21 electrically couple each canister 10 to one of the compartments 111 of the casing 110 in order to either eliminate or reduce electro-magnetic interference. The handle 17 either inserts or removes the canister 10 from the casing 110 of the peripheral enclosure with just enough either insertion force or removal force to ensure that a storage device is either connected or disconnected and that its connectors are not damaged.

Figure 7:
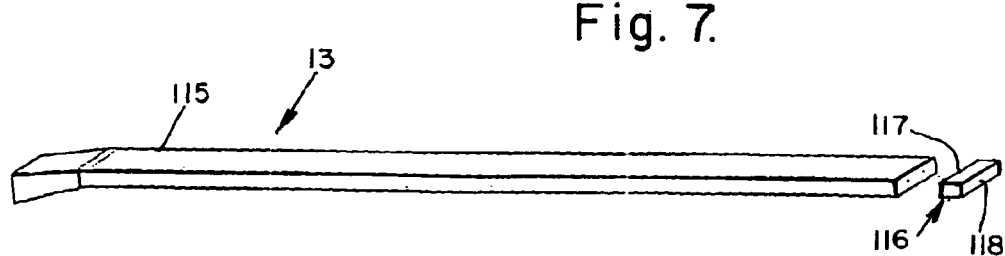
FIG. 7 is a perspective drawing of a plastic light carrier of the combined guide rail and light pipe system of the canister of FIG. 1.
Figure 8:
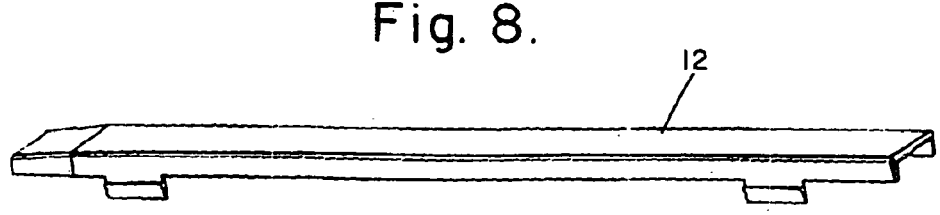
FIG. 8 is a perspective drawing of a guide rail of the combined guide rail and light pipe system of the canister of FIG. 1.

Referring to FIG. 7 in conjunction with FIG. 8 the light pipe system 13 includes a light pipe 115 and a special lens 116. The light pipe 115 has an input end and an output end. The area of the input end is larger than the area of the output end. The special lens 116 has a first light diffuser 117 on a first surface and a second light diffuser 118 on a second surface. The first and second light diffusers 117 and 118 are a frosted first surface and a frosted second surface of the special lens 116. The special lens 116 is mechanically coupled to handle 18. The light pipe 115 has a protrusion 119 which engages an indent 120 in the side wall 15 of the unshaped tray 11 in order to properly align the light pipe 115.

Figure 9:
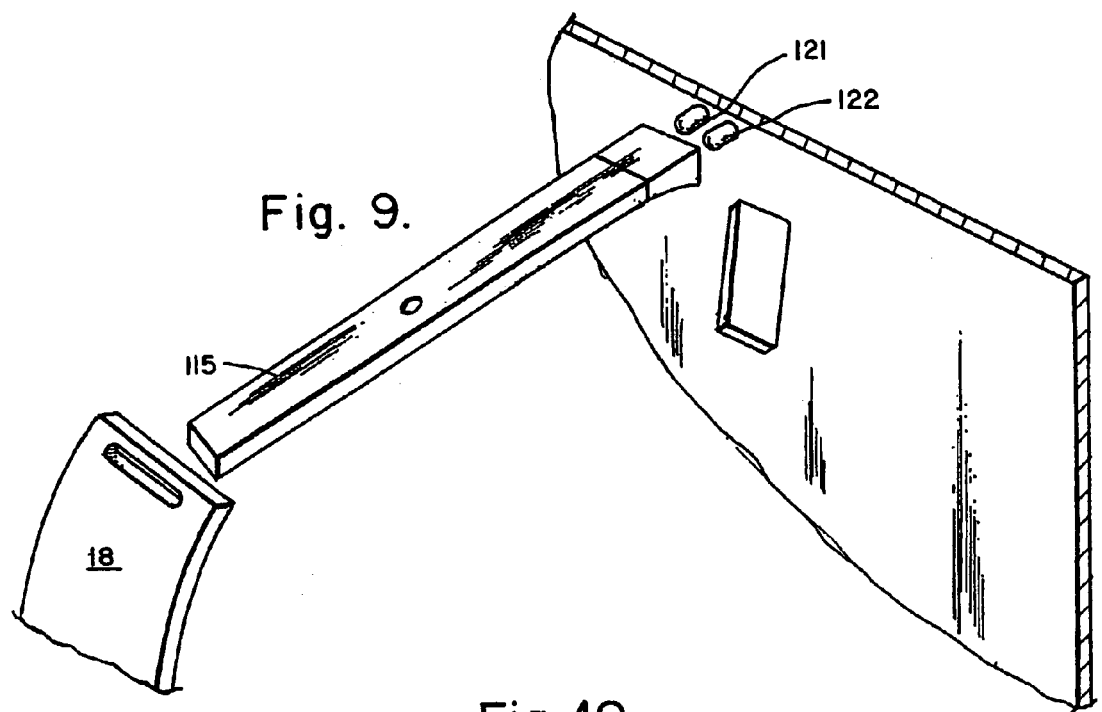
FIG. 9 is a schematic drawing of the light pipe system of the canister of FIG. 1
Figure 10:
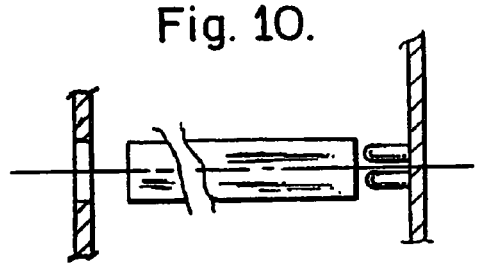
FIG. 10 is a partial schematic drawing of the light pipe system of FIG. 9.

Referring to FIG. 9 in conjunction with FIG. 10 the light pipe 115 and the special lens 116 are optically coupled to two light emitting diodes 121 and 122. One light emitting diode 121 emits a red light and the other light emitting diode 122 emits a blue light. When the red and blue lights are mixed the resulting mixture of light is a purple light. The light emitting diodes 121 and 122 are mounted onto the back plane 114. The light from each set of two light emitting diodes 119 and 120 travels through the air and into the light pipe 115 of one of the canisters 10. The light pipe 115 is mounted within one of the guide rails 12 to form a combined guide rail and light pipe system 119. The combined guide rail and light pipe system 119 is mounted on one of the two side walls 15 of the u-shaped tray 11.

Figure 11:
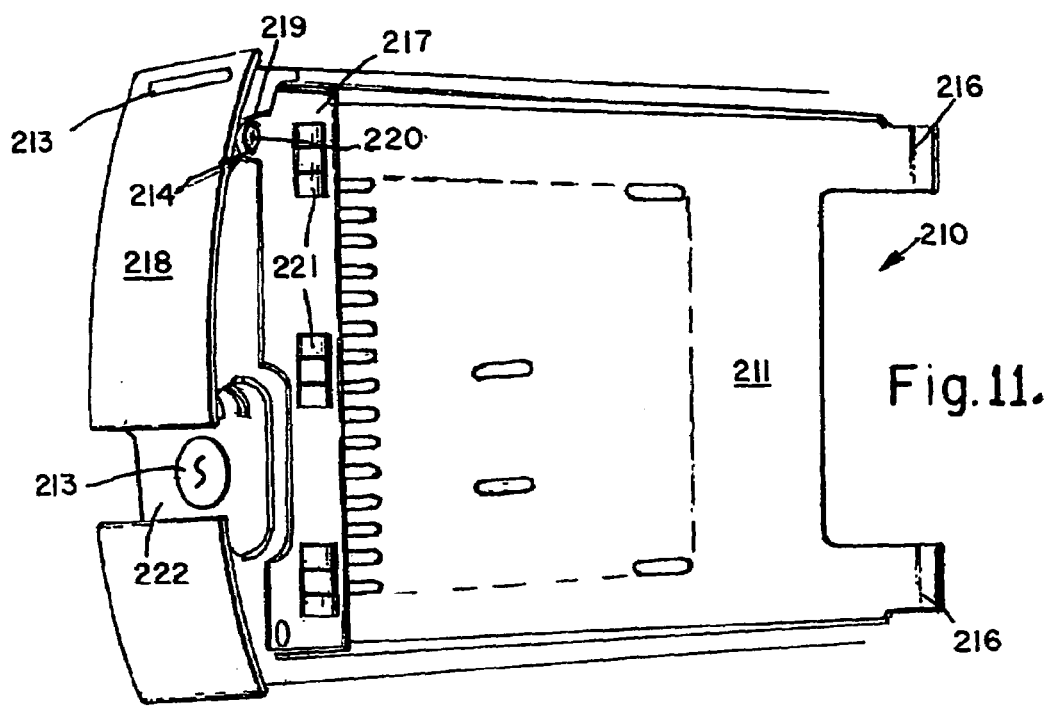
FIG. 11 is a perspective drawing of a canister that has a combined lock-cam mechanism and light pipe system.
Figure 12:
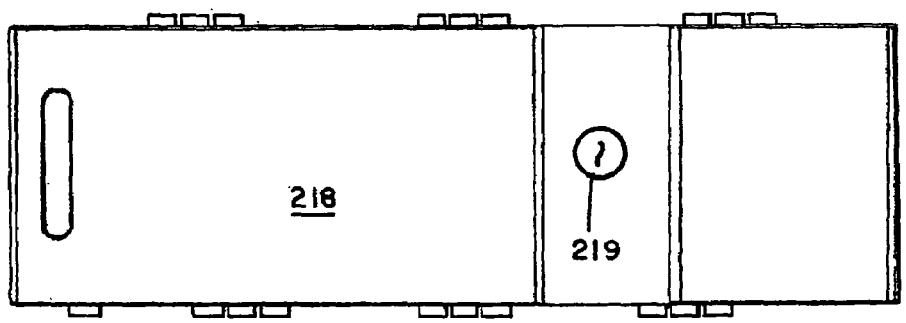
FIG. 12 is a plan view of the canister of FIG. 11.
Figure 13:
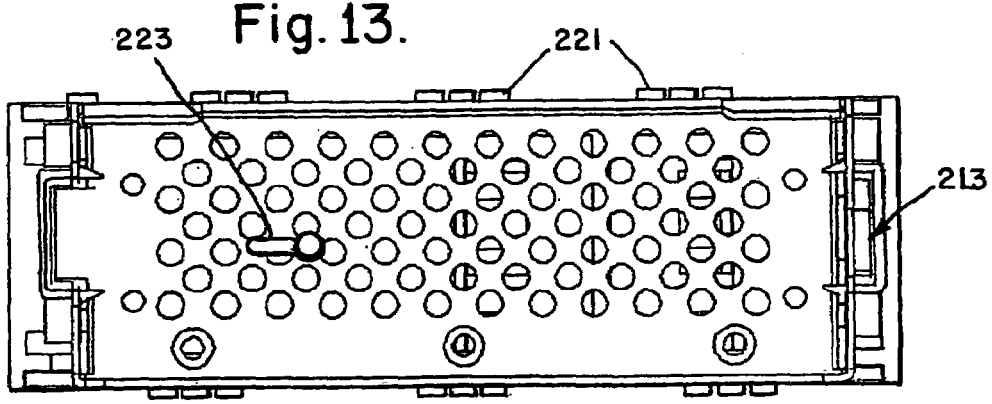
FIG. 13 is a rear plan view of the canister of FIG. 11.

Referring to FIG. 11 in conjunction with FIG. 12 and FIG. 13 the canister 210 includes a u-shaped tray 211, two guide rails 212, a light pipe system 213 and a cam mechanism 214. The u-shaped tray 211 is rectangular and has a cross-sectional area and a depth. The u-shaped tray 211 has two side walls 215 and two return lips 216. The canister 210 includes a front plate 217 and a handle 218. The front plate 217 is mechanically coupled to the u-shaped tray 211. The cam mechanism 214 has a pivot mount 219 and a pin 220. The pivot mount 219 mechanically couples the handle 218 to the unshaped tray 211. The two lips 216 are adjacent to the bottom surface of the u-shaped tray 11 at its rear end. The u-shaped also has a plurality of flat springs 221 that are disposed on the top outside surface and the bottom outside surface of the canister 20. The handle 218 has a plastic insert 222 that is used for a commercial designation of a customer. The customer may choose the color and texture of the plastic insert 222.

Figure 14:
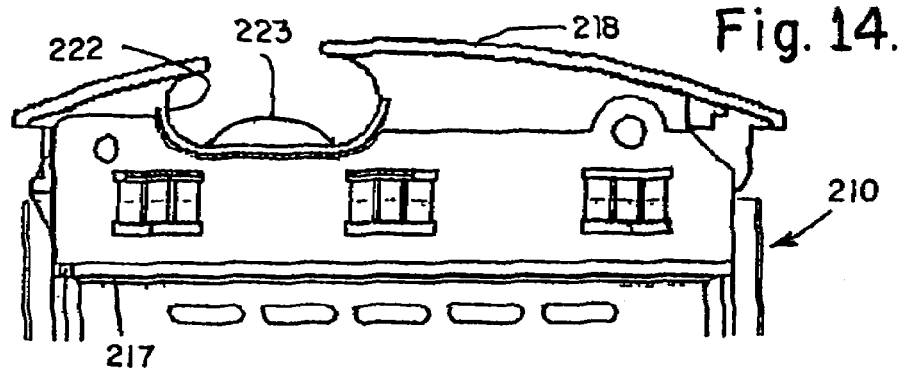
FIG. 14 is a partial top plan view of the canister of FIG. 11.
Figure 15:
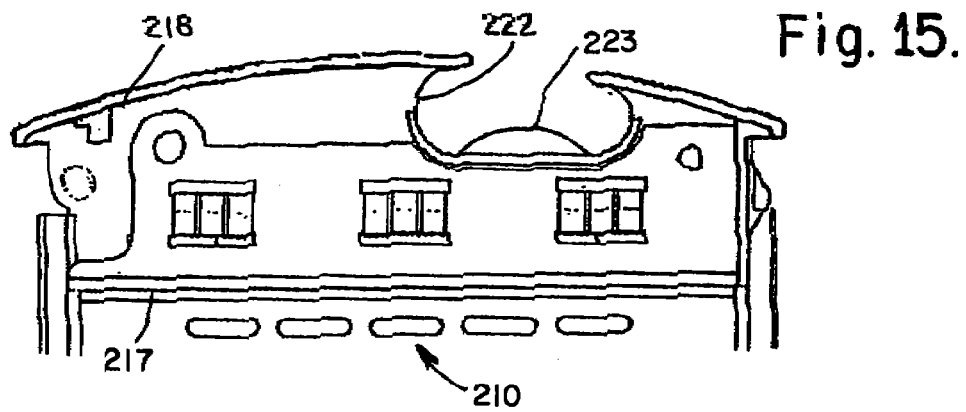
FIG. 15 is a partial bottom plan view of the canister of FIG. 11.

Referring to FIG. 14 in conjunction with FIG. 11 and FIG. 15 the canister 210 further includes a lock 223. The lock 223 locks the handle 218 to the front plate 217 so that neither installation into nor removal of the canister 210 from the compartment 111 of the casing 110 of the computer peripheral enclosure can occur once the lock 223 has been engaged.

Figure 16:
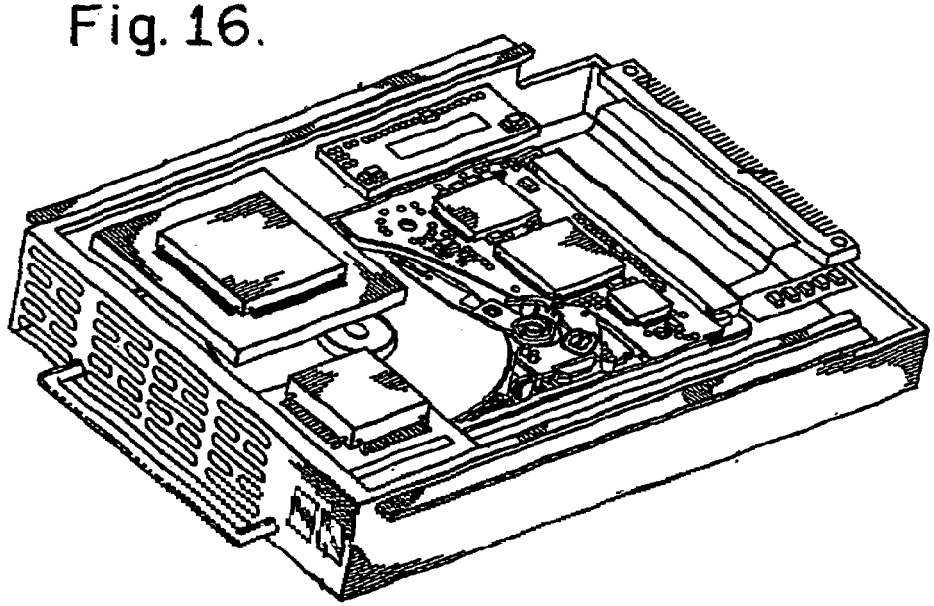
FIG. 16 is a perspective drawing of a storage device of U.S. Pat. No. 5,822,184 that is a hard disk drive.
Figure 18:
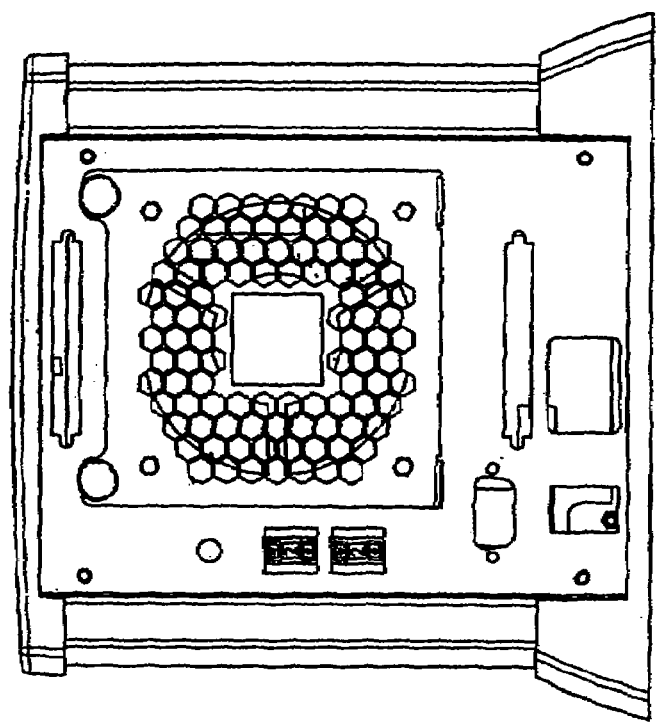
FIG. 18 is a rear elevation view of the two storage-device peripheral enclosure of FIG. 17.
Figure 17:
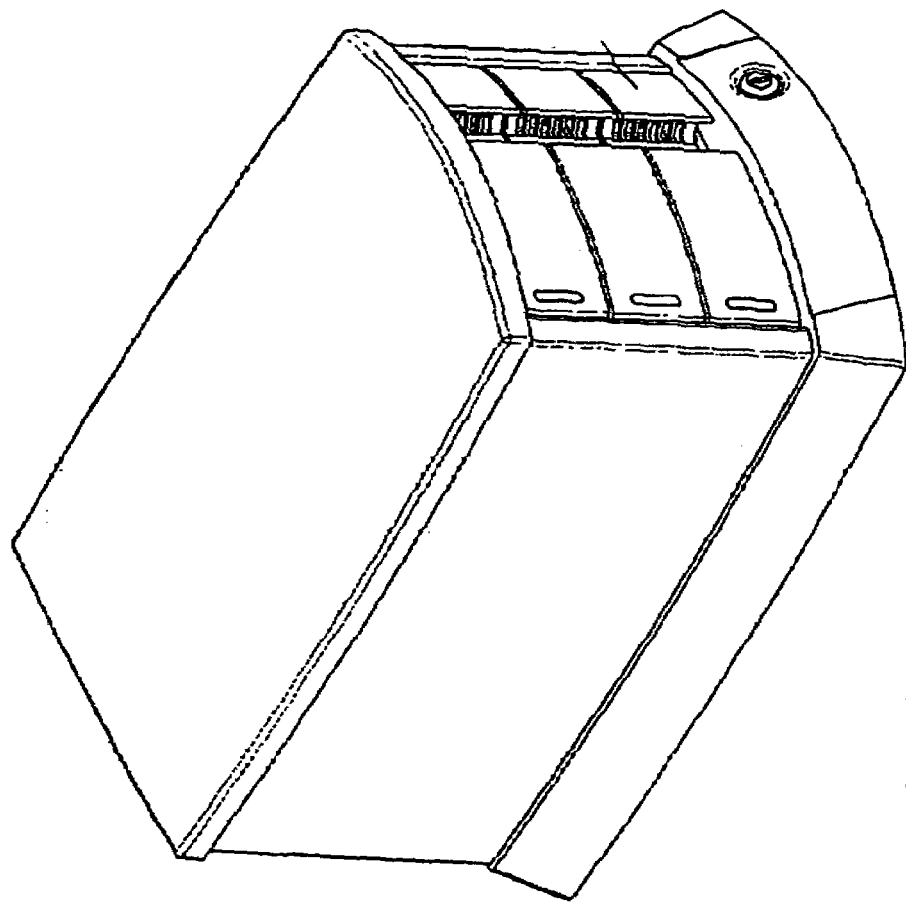
FIG. 17 is a perspective drawing of a two storage-device peripheral enclosure with three canisters that have two storage devices and one front removable power supply.
Figure 20:
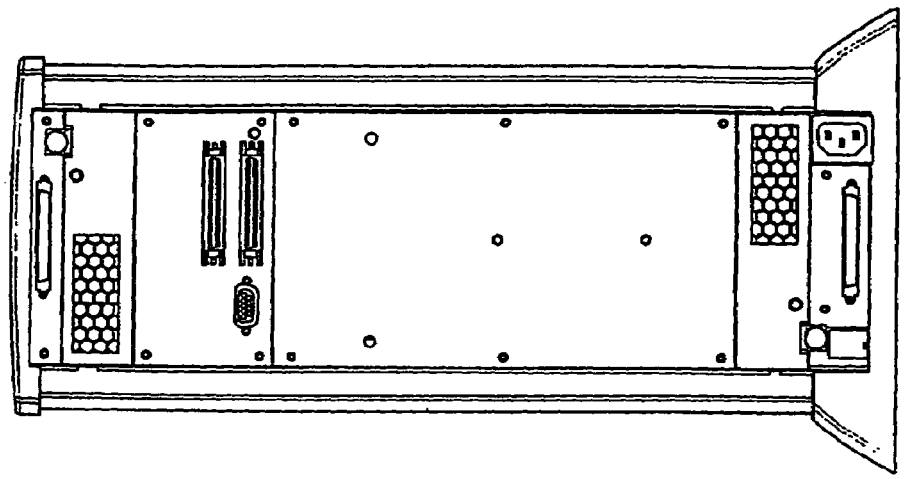
FIG. 20 is a rear elevation view of the six storage-device peripheral enclosure of FIG. 19.
Figure 19:
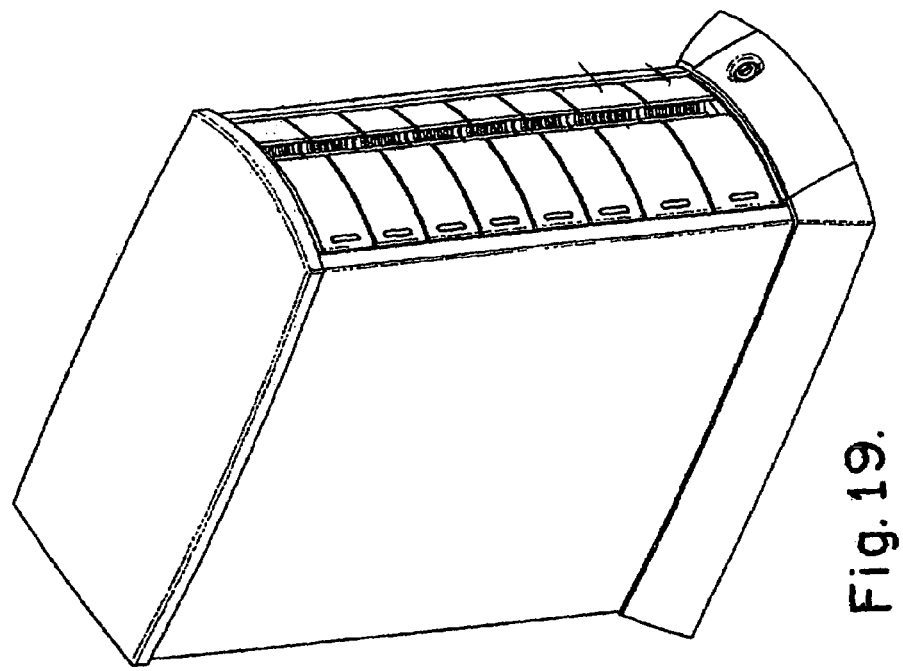
FIG. 19 is a perspective drawing of a six storage-device peripheral enclosure with eight canisters which have six storage devices and two front-removable power supplies.
Figure 22:
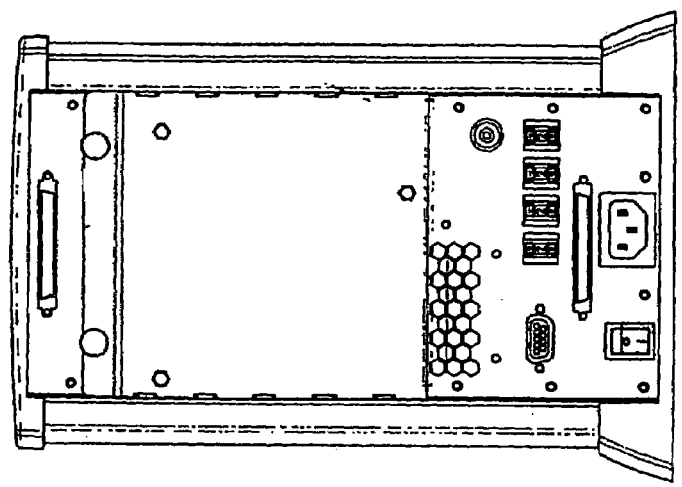
FIG. 22 is a rear elevation view of the four storage-device peripheral enclosure of FIG. 19.
Figure 21:
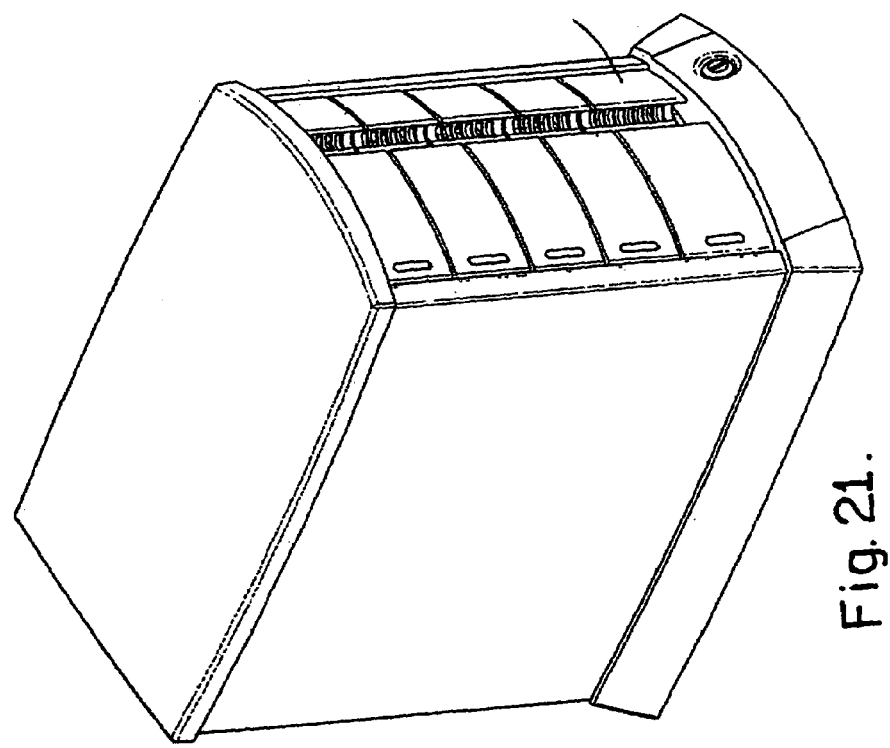
FIG. 21 is a perspective drawing of a four storage-device peripheral enclosure with five canisters which has four storage devices and one front-removable power supply.
Figure 24:
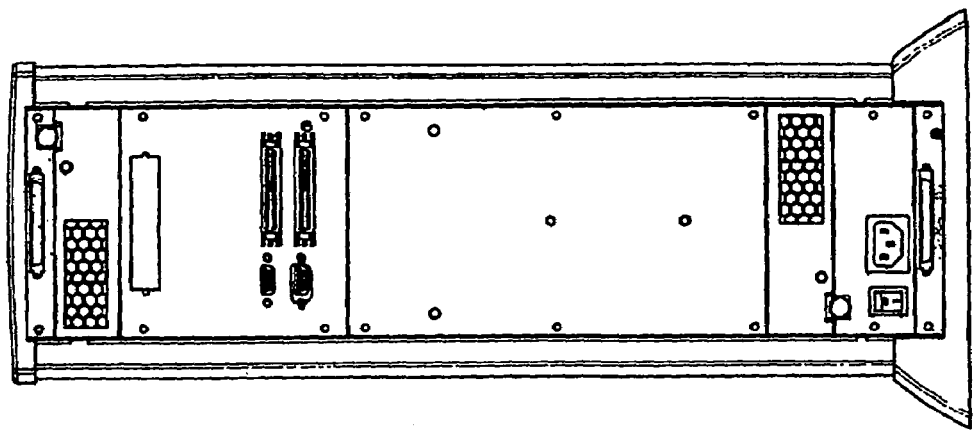
FIG. 24 is a rear elevation view of the eight storage-device peripheral enclosure of FIG. 23.
Figure 23:
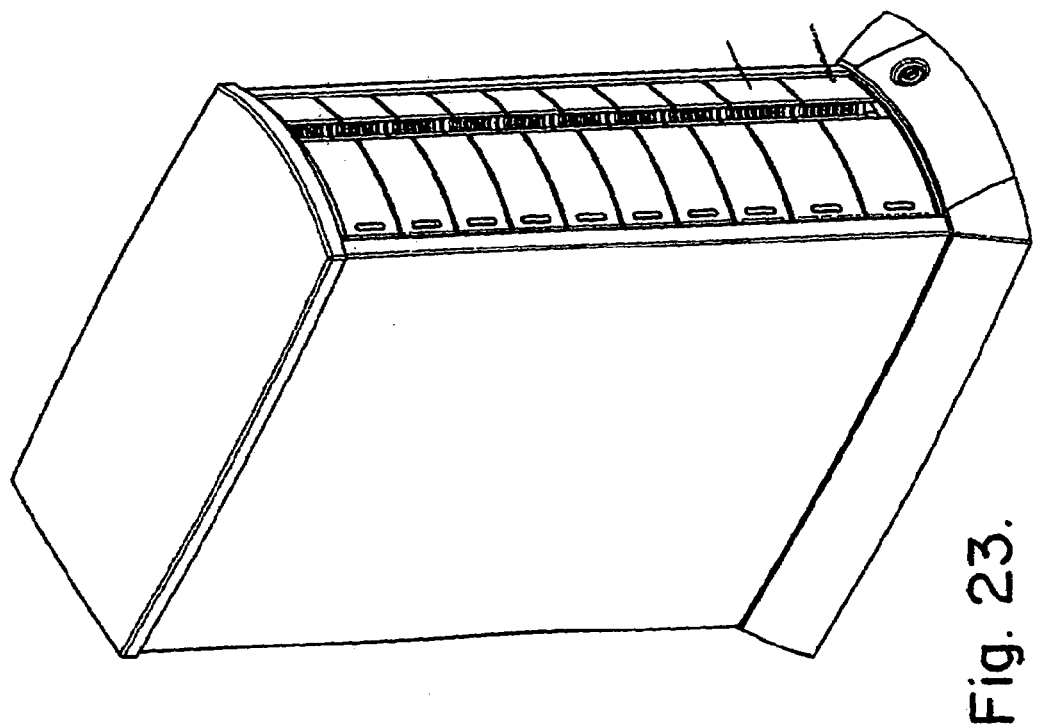
FIG. 23 is a perspective drawing of an eight storage-device peripheral enclosure with ten canisters that have eight storage devices and two front-removable power supplies.
Figure 26:
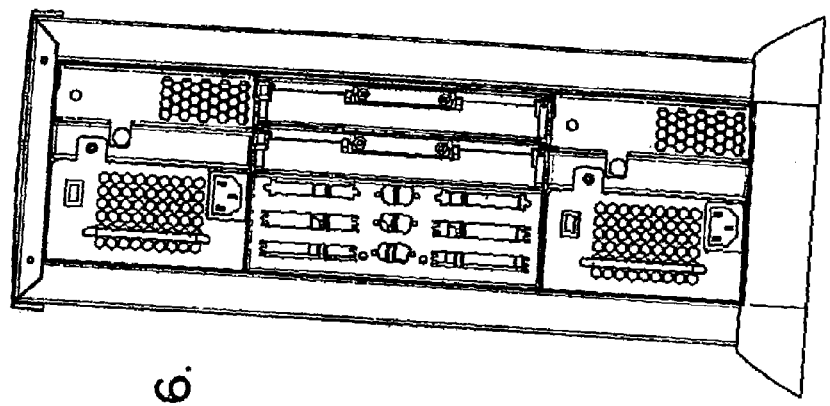
FIG. 26 is a rear elevation view of the ten storage-device peripheral enclosure of FIG. 25.
Figure 25:
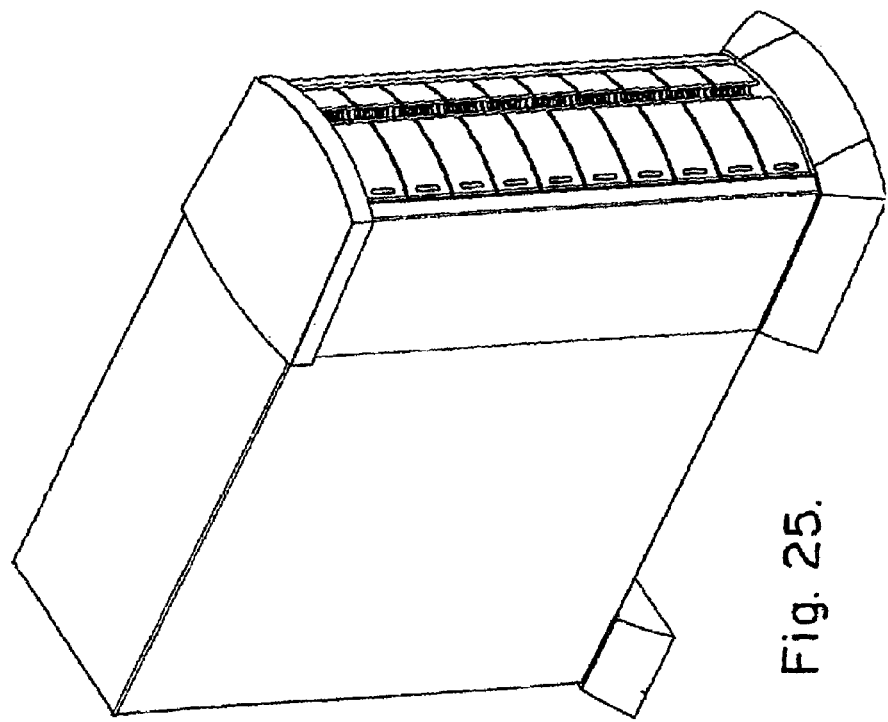
FIG. 25 is a perspective drawing of a ten storage-device peripheral enclosure with ten canisters that have ten storage-devices.
Figure 27:
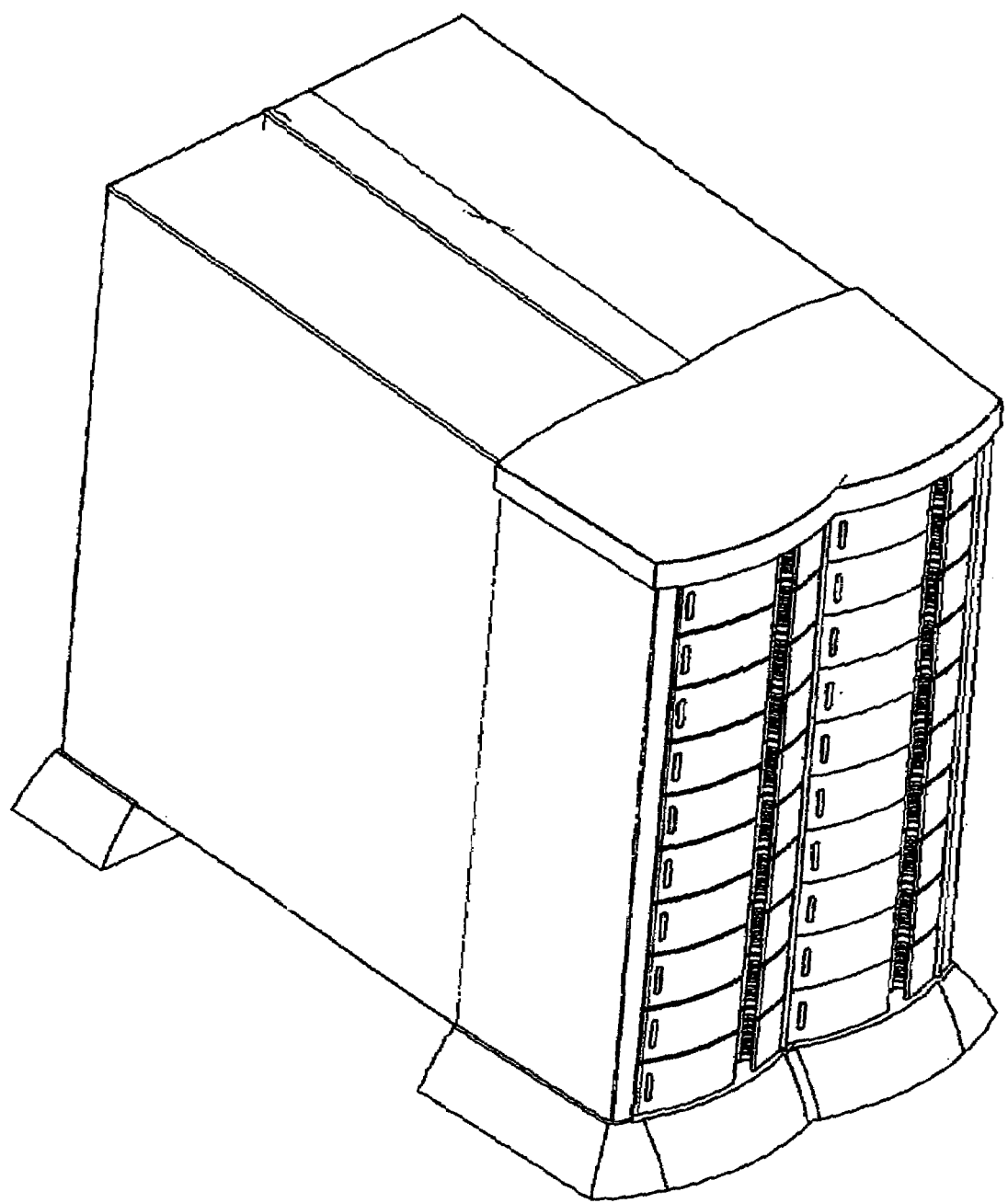
FIG. 27 is a perspective drawing of a twenty storage-device peripheral enclosure with twenty canisters that have twenty storage devices.
Figure 28:
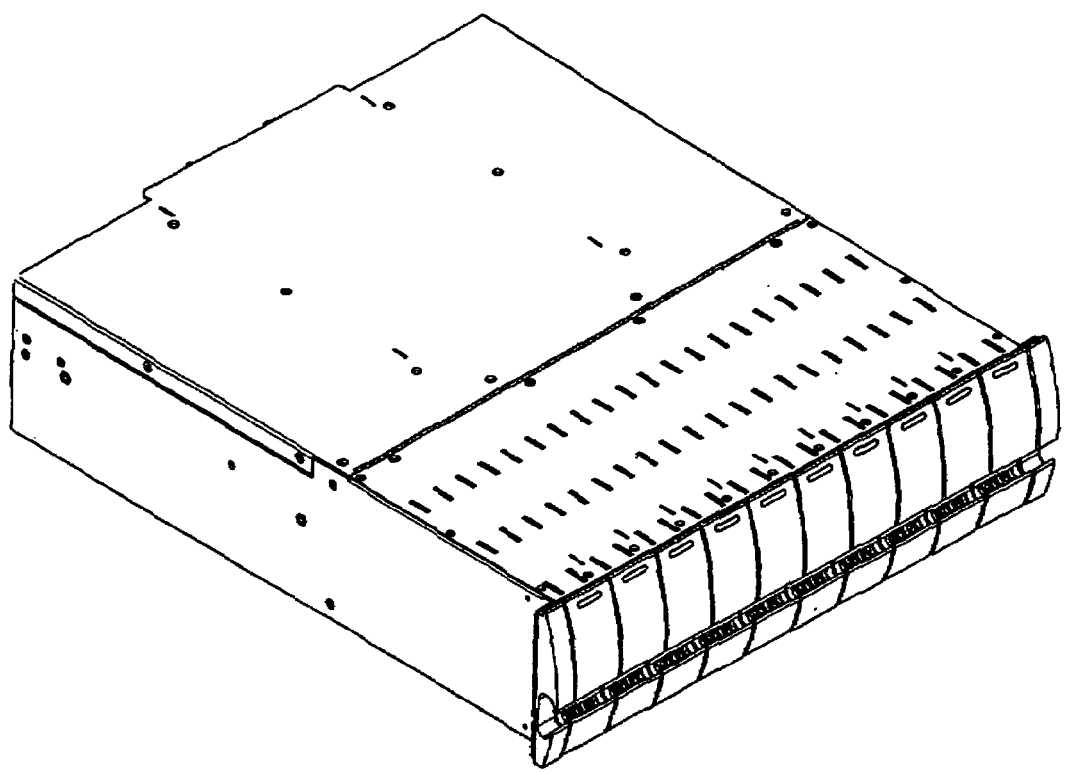
FIG. 28 is a front perspective drawing of a rack-mountable, ten storage-device peripheral enclosure.
Figure 29:
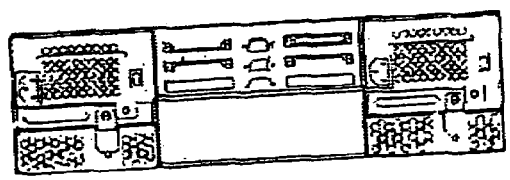
FIG. 29 is a rear elevation view of the rack-mountable, ten storage-device peripheral enclosure of FIG. 28.
Figure 30:
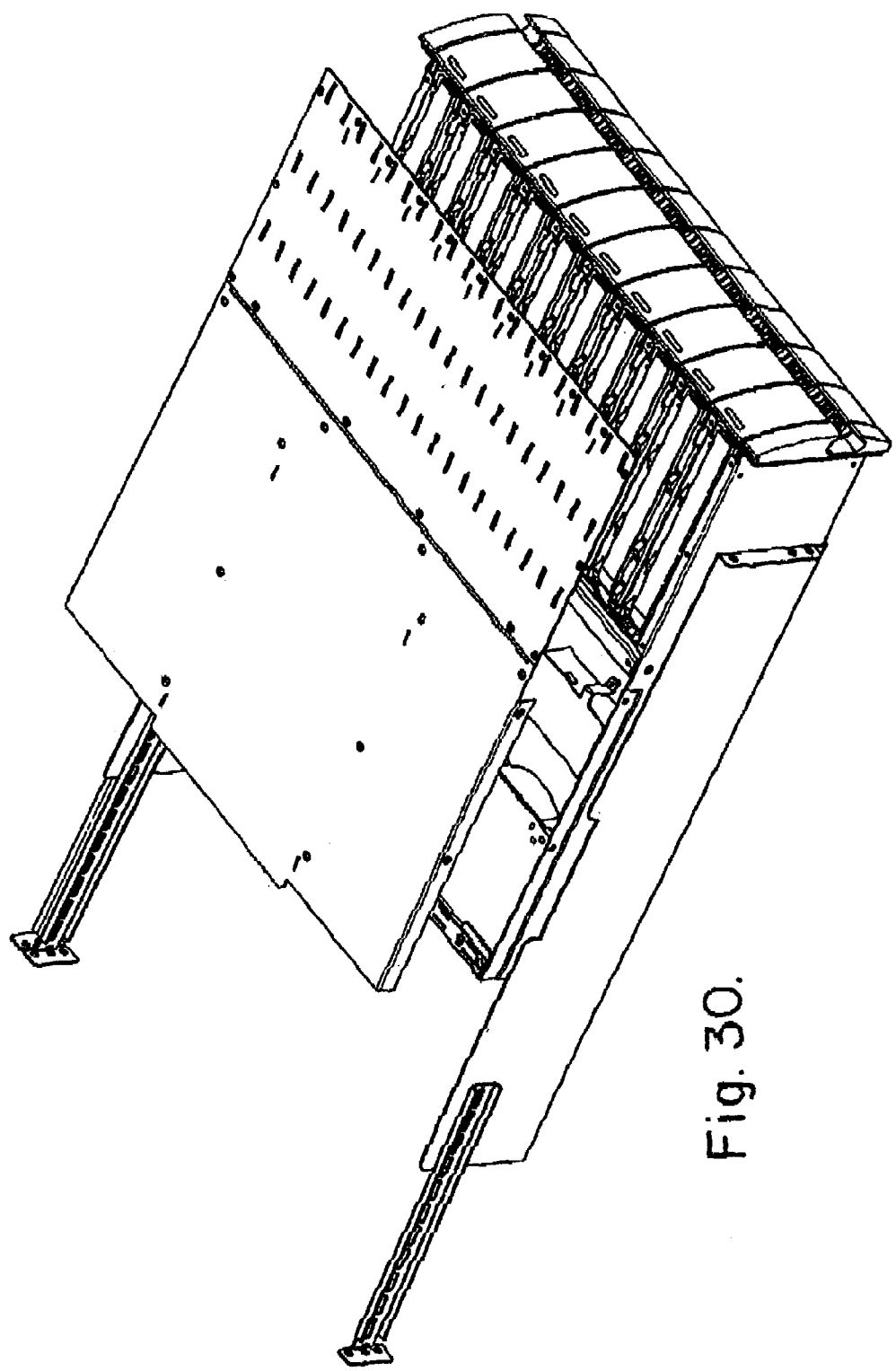
FIG. 30 is a front exploded view of the rack-mountable, storage-device peripheral enclosure of FIG. 28.
Figure 31:
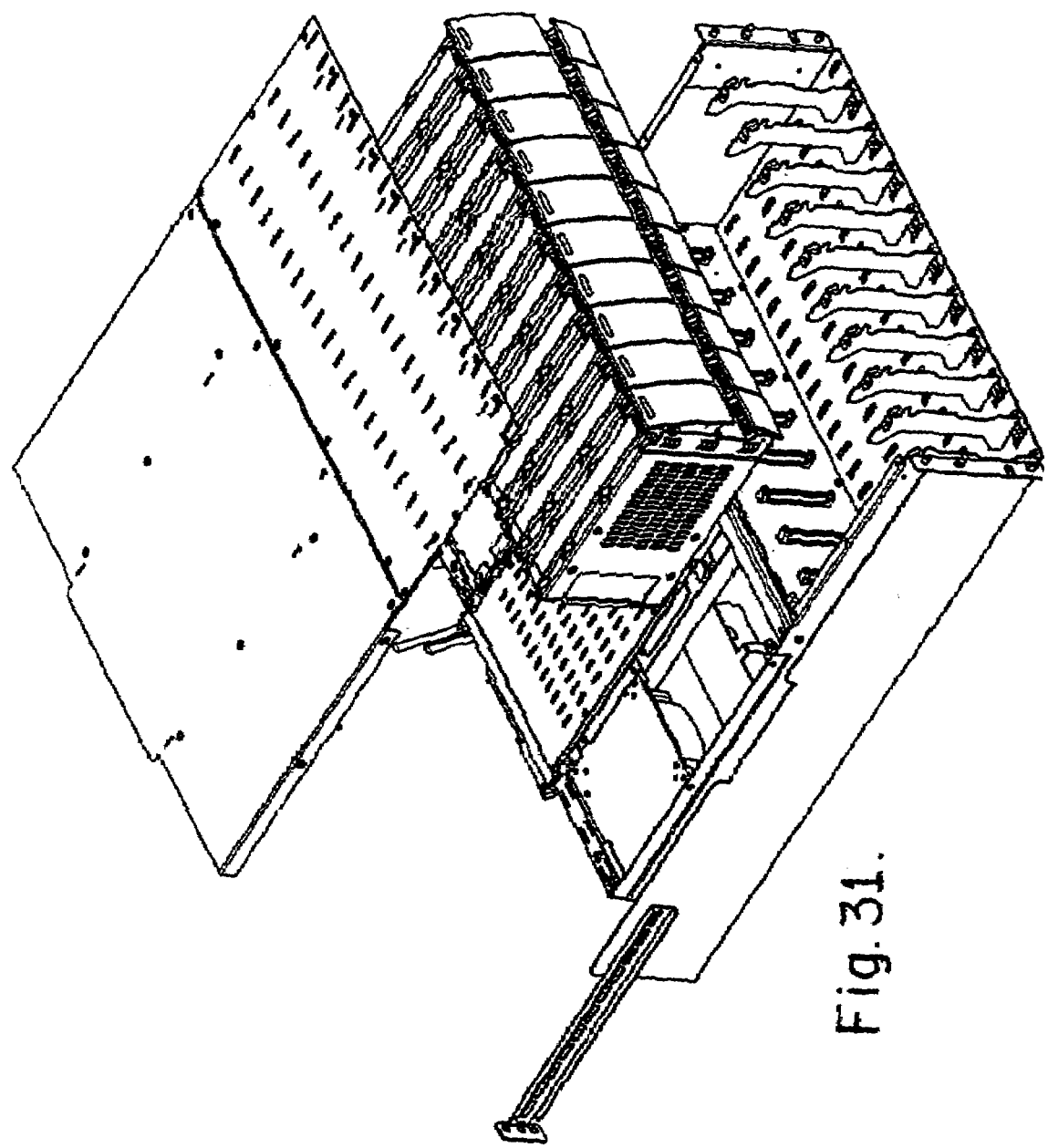
FIG. 31 is a front exploded view of the rack-mountable, ten storage-device peripheral enclosure of FIG. 28.
Figure 32:
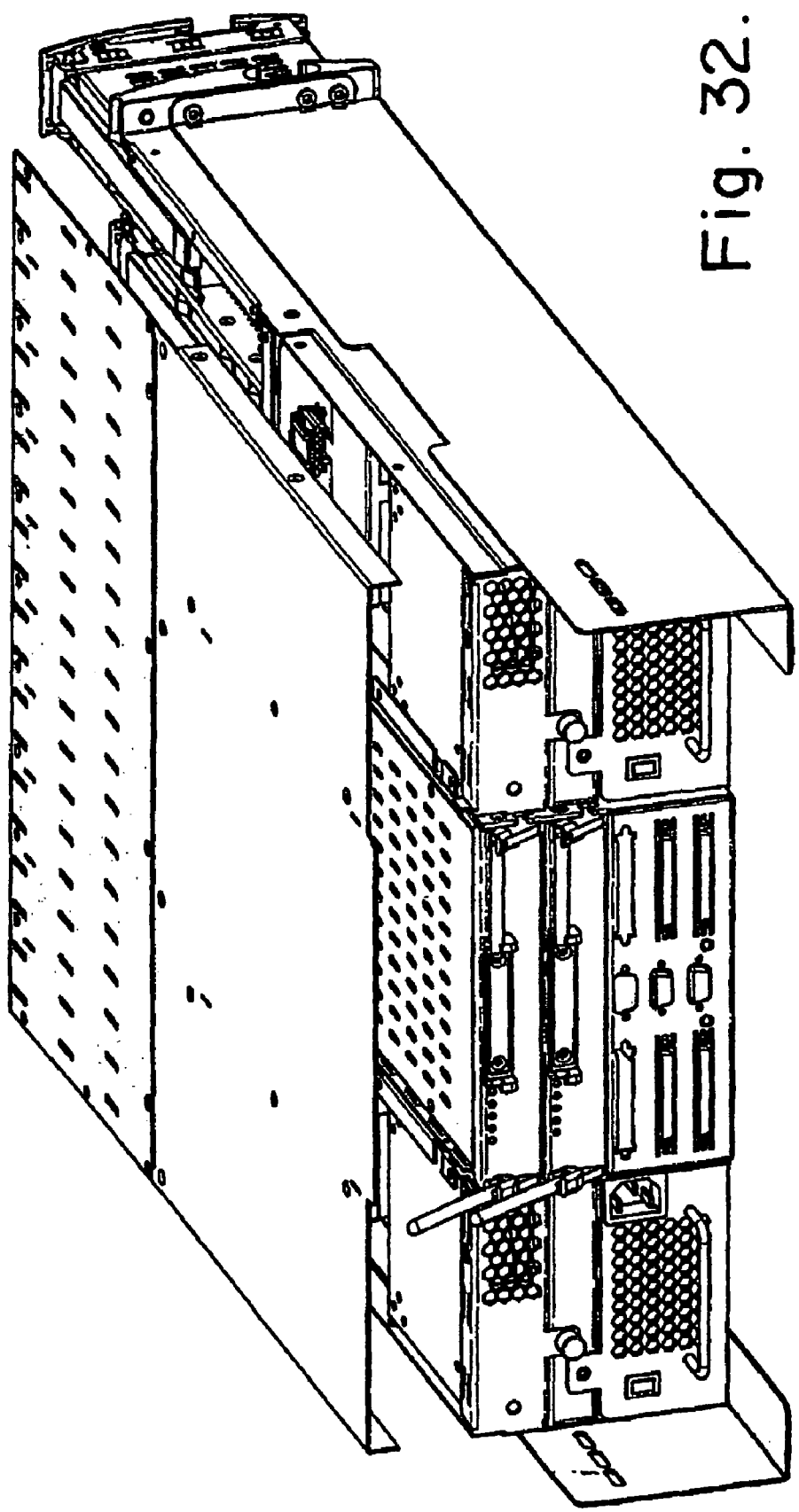
FIG. 32 is a first rear exploded view of the rack-mountable, ten storage-device peripheral enclosure of FIG. 28.
Figure 33:
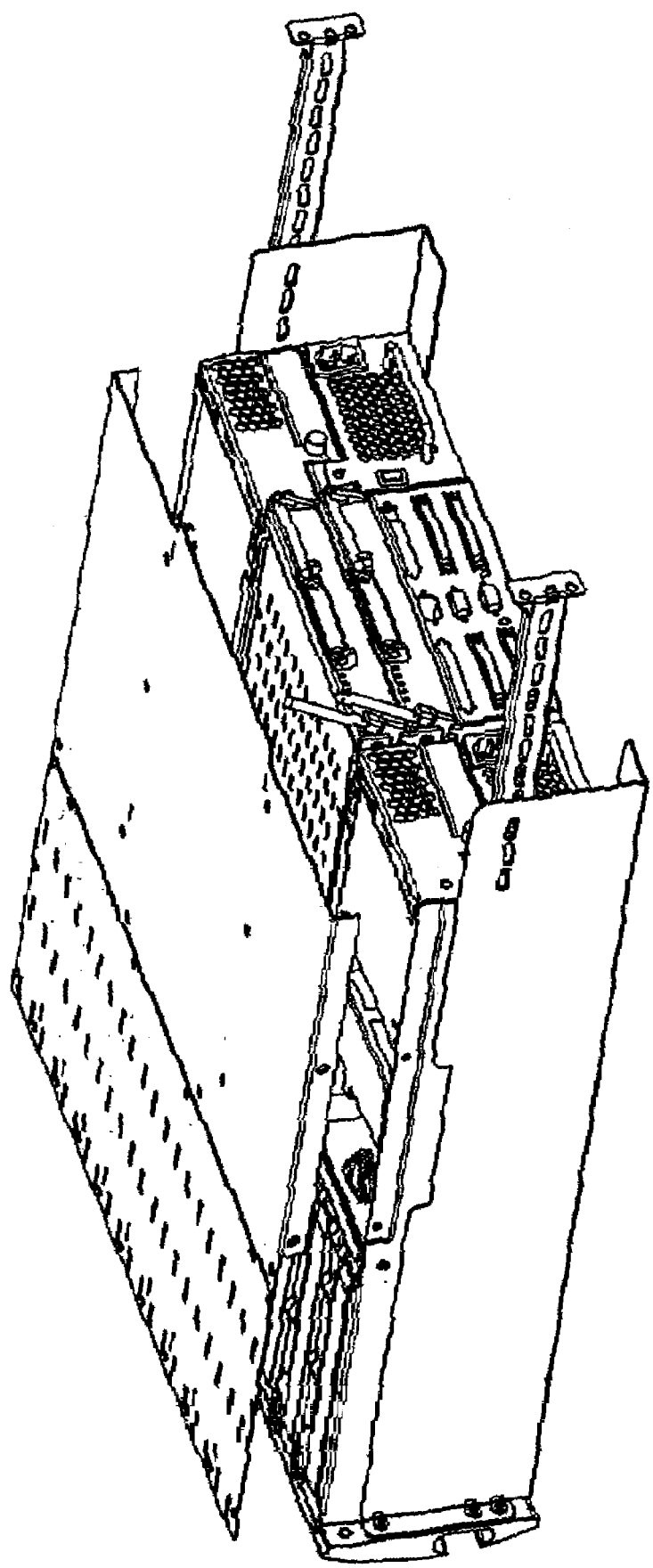
FIG. 33 is a second rear exploded view of the rack-mountable, ten storage-device peripheral enclosure of FIG. 28.
Figure 34:
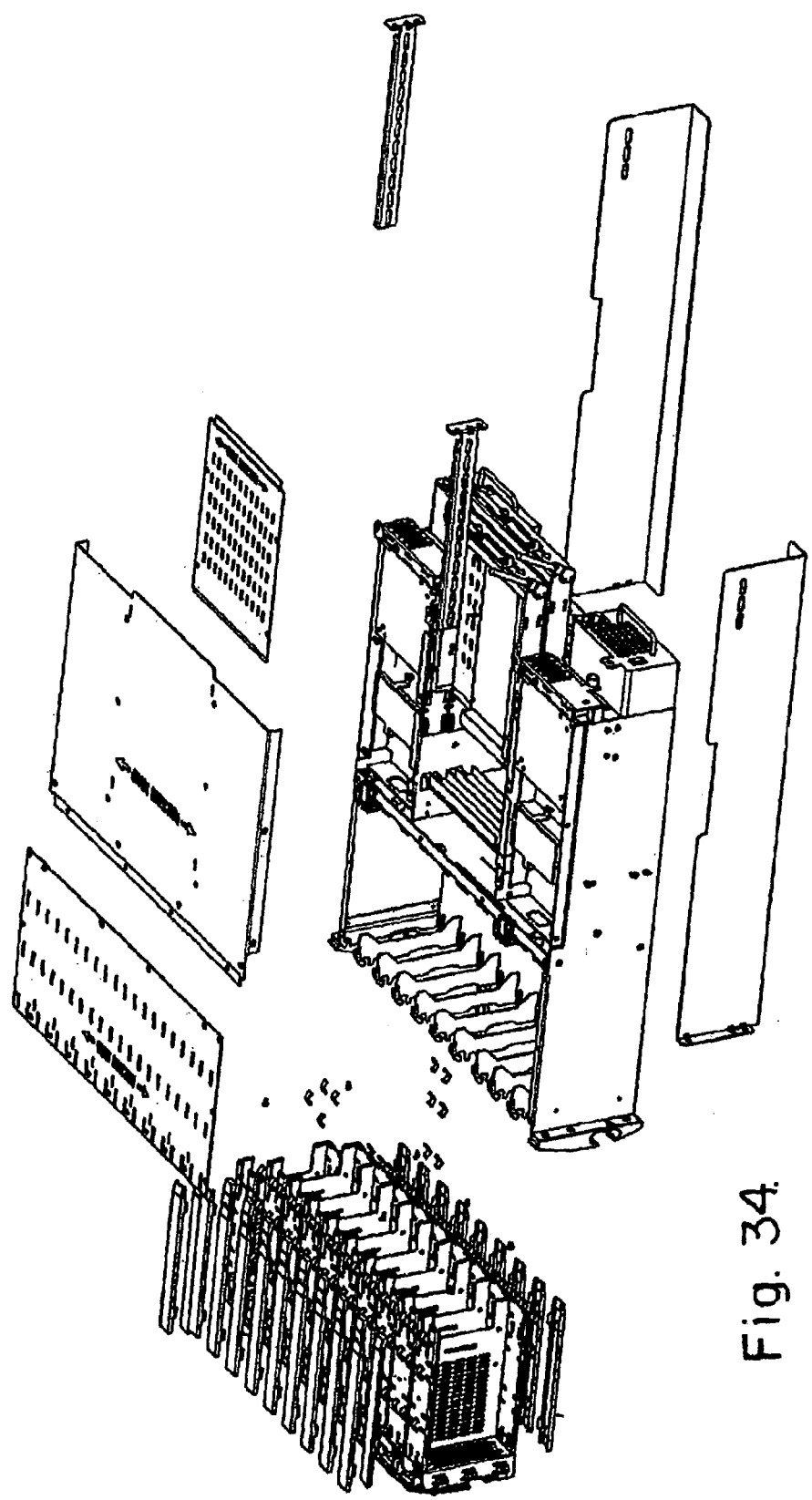
FIG. 34 is a rear exploded view of the rack-mountable, ten storage-device peripheral enclosure of FIG. 28.

Referring to FIG. 16 a storage device, such as a hard disk drive, can be of any given configuration. The storage device is readily available in the commercial market and known in the art. The back of the standard storage device has drive-ready connectors. If the storage device is not drive-ready then the storage device can be converted by either a forty-pin or an eighty-pin high density drive ready connector to make the storage device RAID ready. Other types of connectors can be used depending upon design requirements.

Referring to FIG. 17 through FIG. 34 there are peripheral enclosures that use the technology of this patent application. There are several different configurations: two drive bays through twenty drive bays tower peripheral enclosures and ten through sixteen drive bays rack-mountable peripheral enclosures. These peripheral enclosures are built to house all types of computer peripheral equipment including DAT drives, storage devices, optical drives, CD-ROM drives, DVD drives, any tape drive, any type storage devices and network attached storage servers along with up to two RAID controller cards. The RAID controller cards are fault-tolerant storage management devices. The connections on the SCSI units are for eighty-pin SCA drives, but there are boards that work for other interfaces. A fiber channel unit uses forty-pin connections. Configurations vary depending on the scalability requirements of the user. The rack-mountable bay casing can hold either up to ten 3.5" HH or up to sixteen 3.5" LP storage devices.

Referring to FIG. 35 a rail assembly 251 for the rack-mountable bay peripheral enclosure includes two L-shaped members.

Referring to FIG. 36 in conjunction with FIG. 35 and FIG. 37 the rail assembly 251 also includes two extension members 252.

Referring to FIG. 38 in conjunction with FIG. 35 and FIG. 39 each L-shaped member of the rail assembly 251 is attached to a side wall 253 of a cabinet 254 by screws 255.

Referring to FIG. 40 in conjunction with FIG. 41 a ten device peripheral enclosure 310 includes ten storage devices 311, ten canisters 312, two high-speed blowers 313, a back plane 314, two power supplies 315, two controller cards 316 and two personality boards 317. The blowers 313 are used to provide a pressurized cooling system. The ten storage-disk drives 111, the ten canisters 112, the two blowers 113, the back-plane 114, the power supplies 115 and the controller cards 116 have special venting locations. The venting locations provide the entire chassis with a balance of cooling within the ten device peripheral enclosure 310 across all storage devices 311. The back plane 314 has holes 320 in a hole-pattern. The design of the hole-pattern directs a balanced airflow all around the chassis of the ten device peripheral enclosure 310. In the canister 312 there are venting holes 321 in the unshaped tray 331, the side walls 335, the front plate 336 and the handle 337. These venting holes 321 channel air over the installed storage devices 311 in order to keep them operating within their thermal operating specifications under normal room temperature. The canister 312 further includes a ventilation system 340 that includes a pattern of holes 342 in the front plate 334, the side walls 335 of the unshaped tray 331 and the handle 337. The pressurized system of the ventilation system 340 allows the power supplies 315, the blowers 313 and controller cards 316 to be in the back. The back plane 314 is in the middle. The storage devices 311 are in the front in a 3U space while still cooling everything better than a 5U unit of similar specifications. The entire system relies on the use of this pressurization for cooling. This type of pressurization in such a small form factor with so many things to cool in this small amount of space does not exists in the prior art.

Figure 42:
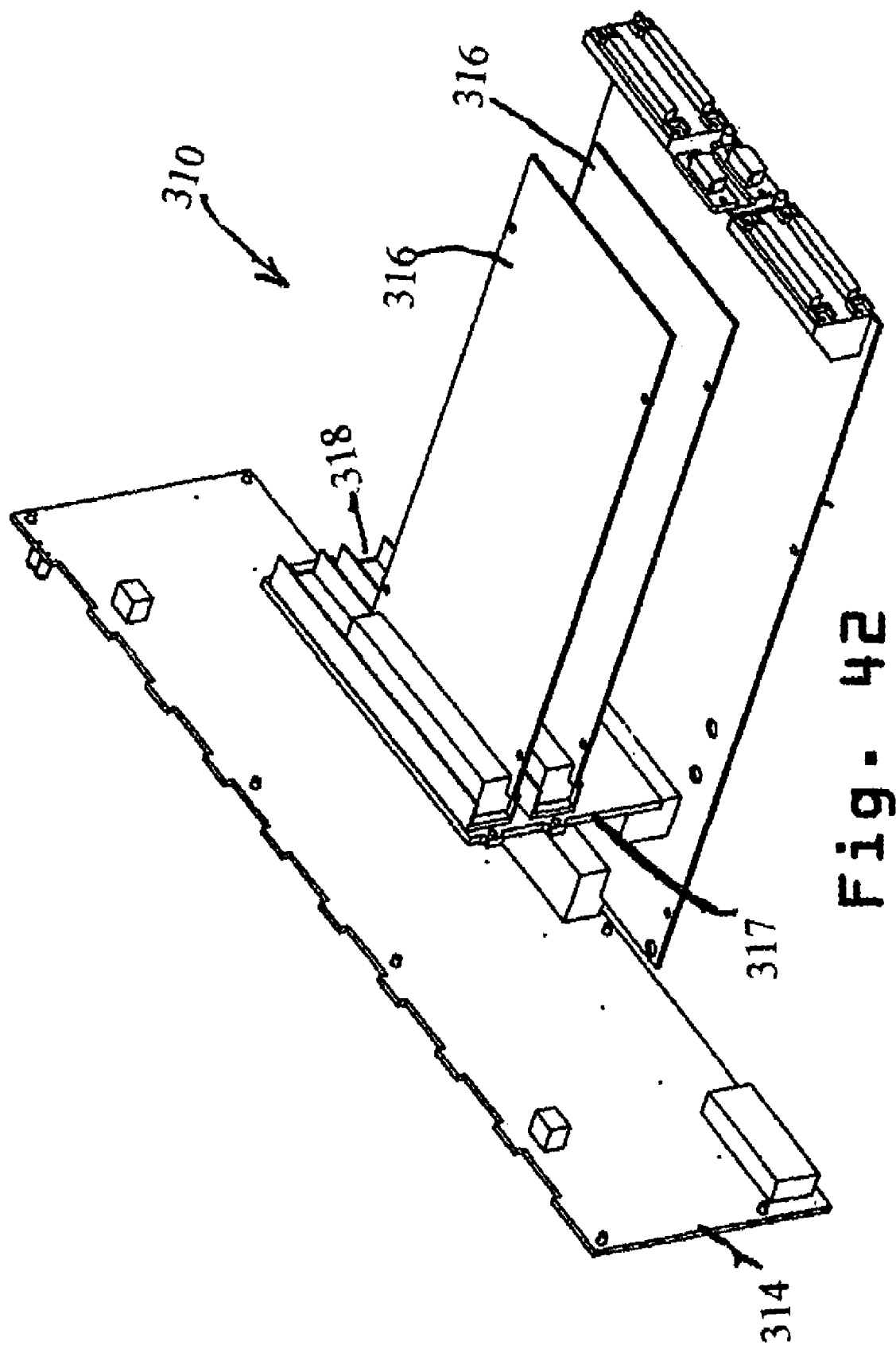
FIG. 42 is a rear perspective drawing of a ten storage-device peripheral enclosure that includes a back plane, two RAID controller cards, a personality board and a SAF-TE/SES board.
Figure 43:
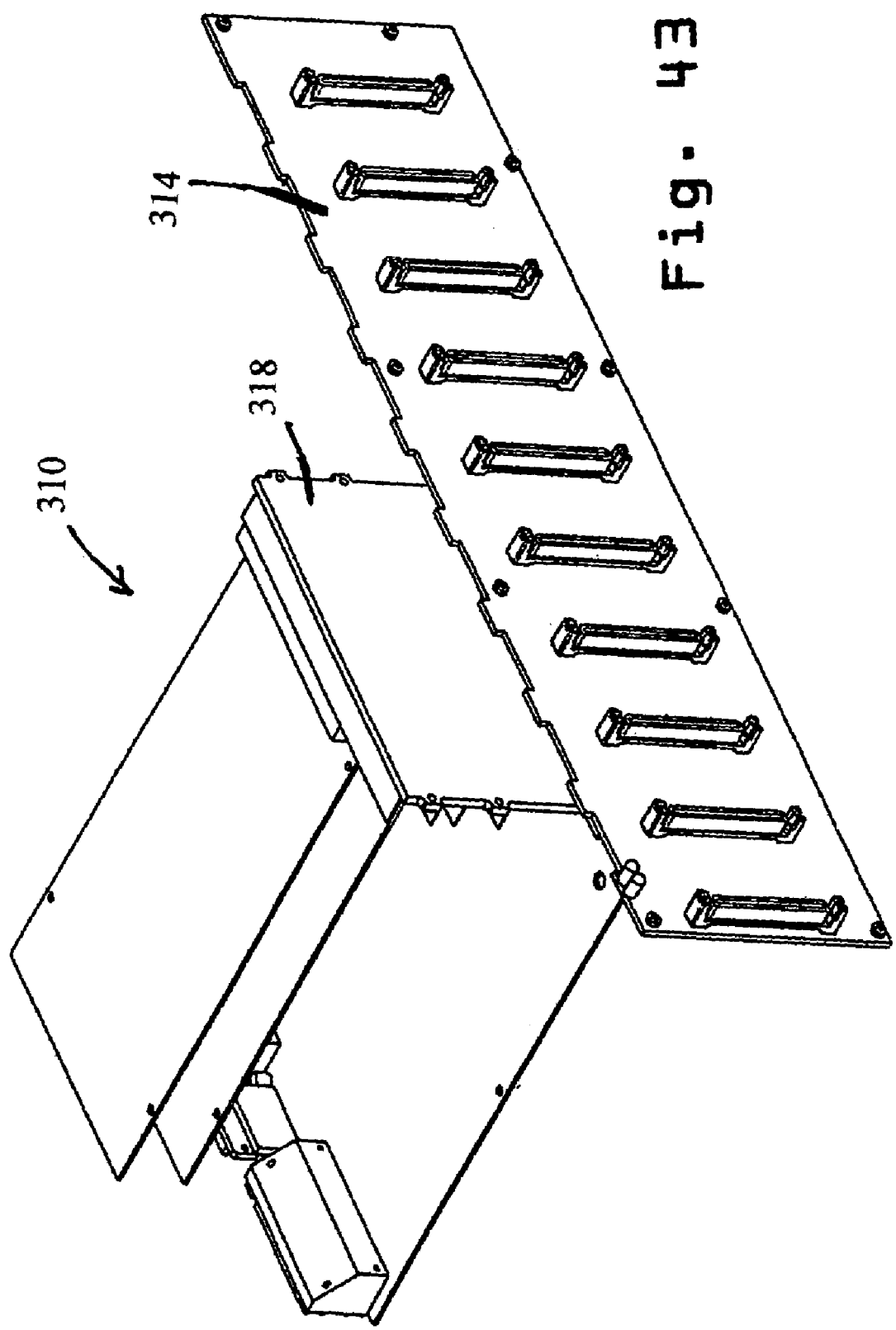
FIG. 43 is a front perspective drawing of the ten storage device peripheral enclosure of FIG. 42.

Referring to FIG. 42 in conjunction with FIG. 43 two controller bays are located in the back of the ten device peripheral enclosure 310 and plug into a riser card 351. The riser card 351 plugs into a personality board 317. The personality board 317 plugs into a back plane 314. The personality board 317 is connected to the two power supplies 315, SAF-TE/SES and to the drives of storage devices 311 that are connected to the opposite side of the back-plane 314.

Referring to FIG. 43 in conjunction with FIG. 42 the advanced technology back plane 314 acts as a connection point for all of the components that make up the ten storage-device peripheral enclosure 310. These components include the storage device drives 311, the blowers 313, controller cards 316, personality boards 317 and power supplies 315. Using board-to-board connectivity, there is a bus impedance matching to achieve maximum data transfer rates and reduce error rates.

Figure 44:
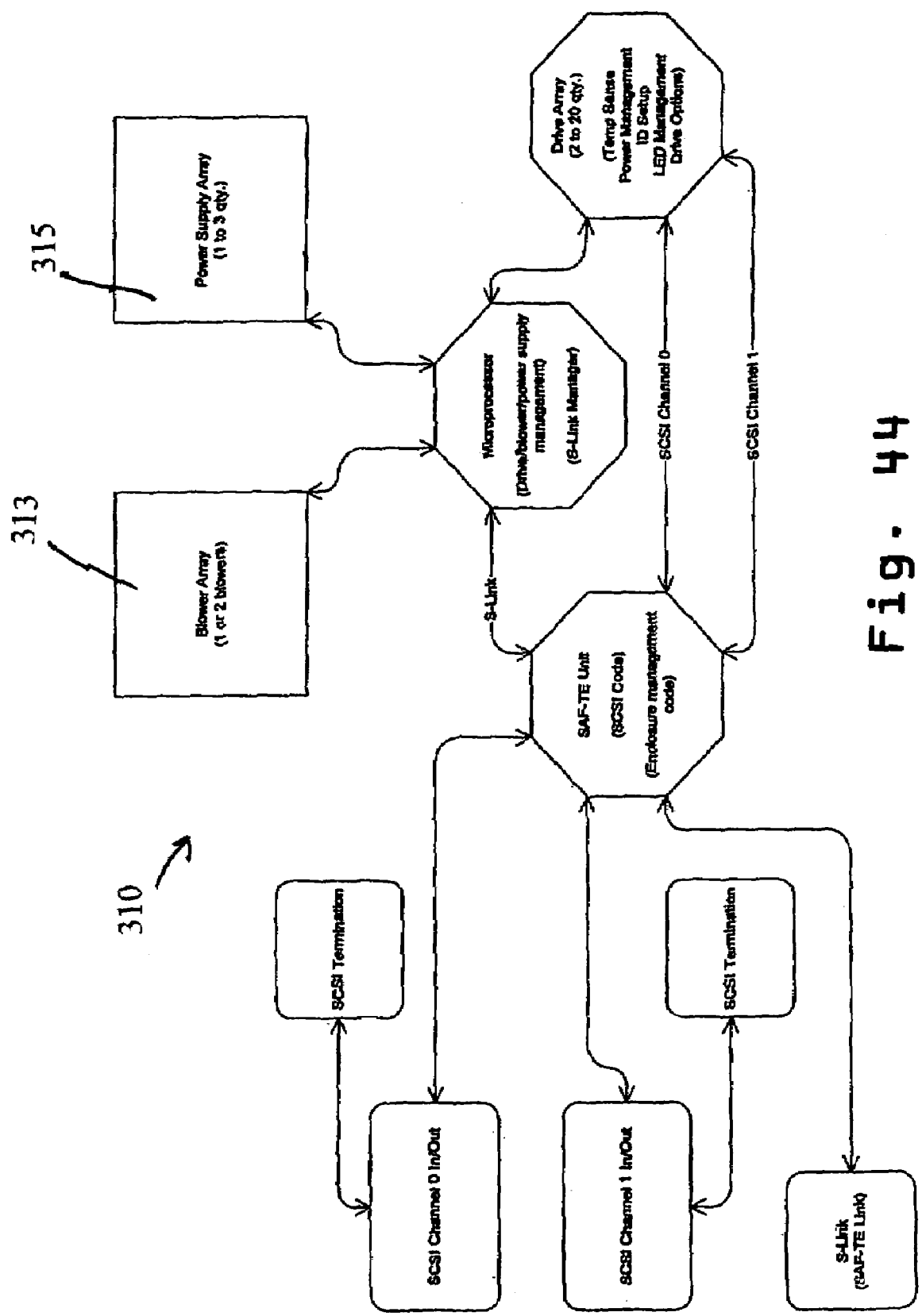
FIG. 44 is a schematic drawing of SCSI software and an electrical diagram of a peripheral enclosure.

Referring to FIG. 44 in conjunction with FIG. 42 the ten storage-device peripheral enclosure 310 includes ten storage devices 311, ten canisters 312, two blowers, a back plane 314, two power supplies 315, two controller cards 316 and a personality board 317. The ten storage devices 311 connect directly to the back plane 314 thereby reducing cabling and improving both functionality and reliability. The SAF-TE/SES, SCSI termination and other features are all built onto the back plane 314. There is a split bus in that the back plane 314 may be divided into dual channels. A SCSI Accessed Fault Tolerant Enclosure module may be plugged into a personality board 317 in order to provide the user with the ability to monitor all of the aspects of the enclosure. These aspects include cooling, power and device activity from a remote computer system that is connected to a ten storage-device peripheral enclosure 310 through a host or network connection. The module is designed to be universally plugged in it has two connections, one on each end. The module can be plugged in one way in order to enable it on the host channel or be flipped around the other way to enable it on the drive channel. The way the module is plugged in determines how it will interface with the host system.

Referring to FIG. 44 in conjunction with FIG. 42 and FIG. 43 a ten storage-device peripheral enclosure 310 is modular and fault-tolerant. There can be more than one power supply 315, more than one blower 313 and more than controller card 316. If any one of the components fails, the other one will continue to adequately run the ten storage-device peripheral enclosure 310. If one of the power supplies 315 fails out there is at least one power supply 315 still left. The remaining power supply will provide enough power to run the ten storage-device peripheral enclosure 310. The modular components are hot swappable so that the unit does not have to be shut down to replace the component. If a power supply 315 has failed it is simply replaced with a new power supply 315 while the ten storage-device peripheral enclosure 310 continues to run uninterrupted. The special connectors that are used on the power supplies 315 have specially designed pins that are staggered and allow hot swapping. If the user decides to install two controller cards 316, they can be setup in a fault-tolerant configuration. This configuration provides that if one of the controller cards 316 fails, the other controller card 316 will continue to work without causing system downtime. The special connectors that are used on the back plane 314 allow the failed controller card 316 to be replaced while the system continues to function.

If the user decides that he wants to be able to monitor a ten storage-device peripheral enclosure 310 from a remote location, he can add a SAF-TE/SES to the personality board 317. This is compliant to an industry standard. The design of a ten storage-device peripheral enclosure 310 has expanded on this industry standard and has added many vendor unique upgrades to its product. The design of a ten storage-device peripheral enclosure 310 also implements a proprietary serial-based interface in order to communicate with this SAF-TE/SES located on the back plane 314. This is called either an 'S-link' or an SAF-TE/SES link. It is a serial communications connection using a connector. Every peripheral enclosure that is part of the series has an S-Link connector on it. This allows the user to install a SAF-TE/SES into one peripheral enclosure and connect it to another peripheral enclosure using the S-Link to connect the other peripheral enclosure to the SAF-TE/SES. This way, the user can monitor all of the peripheral enclosures in his system using just one SAF-TE/SES. A rack-mountable, ten storage-device peripheral enclosure 310 fits into an industry-standard 19" cabinet space in a 3U form factor. The ten storage-device peripheral enclosure 310 has a special two piece mounting tray which incorporates simplified integrating hardware. The technology of the back plane 314 allows a number of storage devices 311, controller cards 316, redundant power supplies 315, redundant blowers 313 and SAF-TE/SES to be all within this small amount of space. No one else has been able to engineer a system like this within this amount of space. A ten storage-device peripheral enclosure 310 allows all major components to be removable and hot swappable so that the system is not compromised if one of these components fails. Without using the design of the back plane 314 the smallest, similarly featured enclosure which can be created would be 5U high. Power supplies 315 and blowers 313 would be in the back of the unit and the two controller cards 316 and ten storage devices 311 would be in the front.

A large number of storage devices 311 and controller cards 316 can fit into this 3U space including two controller cards 316 and ten storage devices 311. In any other enclosures of the prior art, the controller cards 316 and the storage devices 311 would be placed into a separate chassis. A chassis for a controller card 316 is typically 4U and a chassis for storage disk drive 311 is typically 3U and usually holds either eight or nine storage devices 311 at the most. The casing 310 holds ten storage devices 311. The same amount of storage devices 311 or more may fit into the casing 310 than in a 7U enclosure of the prior art that requires 3U's for storage devices and 4U's for controller enclosure. Even the most compact systems of the prior art that combine controller cards and drives into the same peripheral enclosure can be no smaller than 5½ inches. These systems can not come close to the casing 310 in performance or reduced points of failure because they have cabling and normally several different boards to make all of the connections to all devices.

The casing of a ten storage-device peripheral enclosure 310 complies with agency standards such as UL, CSA/TUV, C-Tick and CE. A conversion kit allows the rack-mountable ten-bay peripheral enclosure 310 to be made into either a ten-bay or a twenty-bay tower by adding on a plastic bottom and a side shell thereby turning it into a permanent tower peripheral enclosure. This universality to the peripheral enclosure 310 allows out the users to choose their migration pattern. A twenty-bay tower conversion kit requires two ten-bay rack-mountable peripheral enclosures 310. These peripheral enclosures 310 are configured in a RAID setup that is a Redundant Array of Independent Disks. If any one of the storage devices fails then the remaining device recalculate the missing data. These peripheral enclosures 310 offer many features that allow data to remain online and accessible such as hot-swap blowers, hot-swappable fans and hot-swappable removable canister. These features allow the highest data availability possible and are meant to keep data accessible even if a failure does occur. Depending on the RAID configuration used if an entire subsystem enclosure fails completely, the other remaining subsystem enclosures will be able to calculate and rebuild the data which was on the failed subsystem enclosure peripheral enclosure so that no system data loss will occur.

In order to prevent a unit failure while operating, the power supply pins are designed in such a way that when either removing or installing the power supply the system is not disrupted. This is done by connecting a zero voltage line and an option line first, connecting the interface lines and the DC power lines. This provides a safe means of power supply replacement while the unit continues to operate. The output connector on the power supply has three different length pins for staggered engagement when hot swapping. Only two lengths were needed for the power supply but the connector was selected because of its availability. Pin 19, DC Enable, must engage last so that the all outputs are connected before enabling the output. Controller cards in the casings can be networked by a side riser card at four peripheral component interconnect cards. The peripheral component-interconnect card is a computer card plus three cards or a personality board 317 and four peripheral component-interconnect cards.

Figure 45:
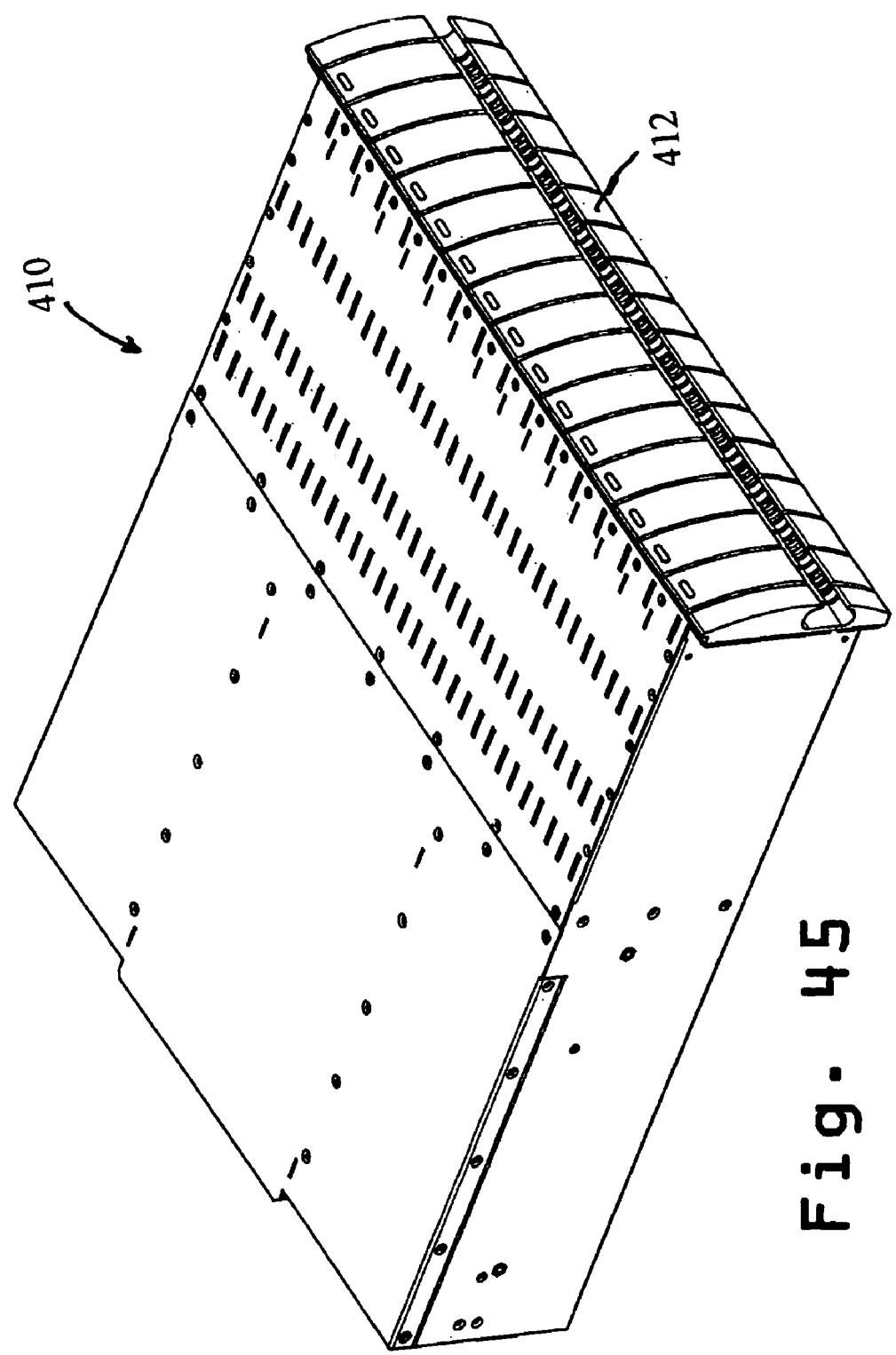
FIG. 45 is a front perspective drawing of a first rack-mountable fifteen storage-device peripheral enclosure that includes a fifteen drive back-plane, two controller cards and two personality boards.

Referring to FIG. 45 in conjunction with FIG. 46 and FIG. 47 a first fifteen device peripheral enclosure 410 includes fifteen storage devices 411, fifteen canisters 412, two blowers 413, a back plane 414, two power supplies 415, two controller cards 416 and two personality boards 417. The personality board 417 and controller cards 416 are located in the back of the fifteen-bay peripheral enclosure 410. The personality boards 417 plug into the back plane 414. The personality boards 417 are connected to the two power supplies 415. The personality boards 417 are also connected to the storage devices 411 that are connected to the opposite side of the back plane 414. The fifteen-bay peripheral enclosure 410 may include an array of fifteen Small Computer System Interface storage disk drives 411 that have a low voltage differential. The fifteen-bay peripheral enclosure 410 may be used in either Just-A Bunch of Drives applications or Redundant Array of Independent Disks applications. Option for universal interface include the following host connectivity or data bus technology Small Computer System Interface, Fiber Channel Arbitrated Loop, IEEE 1394 "Firewire", Advanced Technology Attachment Packet Interface, Serial ATA, Ethernet, such as 10/100Tx and GB Ethernet, for Network Attached Storage, Internet Small Computer System Interface and InfiniBand. In the space of 7"×5.2" on the rear panel either removable Just A Bunch of Drives modules or removable Redundant Array of Independent Disks modules may be installed to provide functionality. In this same space removable interface/interconnectivity modules contain embedded central processing units. Other features may be placed to create a complete file server or similar hardware requirements. The Redundant Array of Independent Disks module provides for two removable, hot-swappable controller cards as well as a universal I-O panel for either Small Computer System Interface host connectivity or Fiber Channel Arbitrated Loop host connectivity. The Just A Bunch of Drives module provides for redundant No Single Point of Failure I-O data paths and porting from a connected computer to an internal drive channels. Either the Just-A Bunch of Drives version or the Redundant Array of Independent Disks version has a removable interface feature that will serve any and all current and future bus technologies intended for data transfer.

Figure 48:
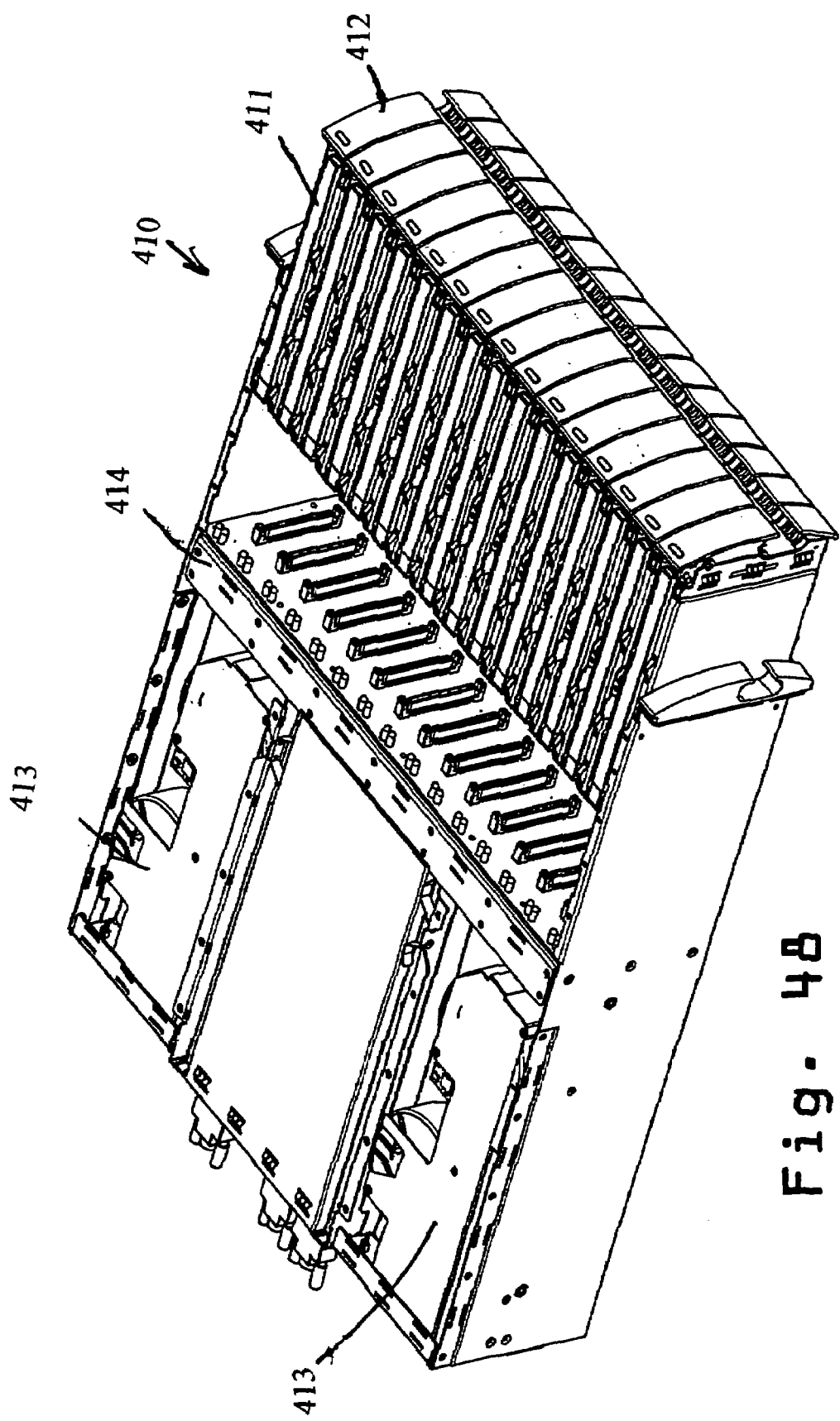
FIG. 48 is a rear perspective view of the first rack-mountable fifteen storage-device peripheral enclosure of FIG. 45.

Referring to FIG. 48 in conjunction with FIG. 46 and FIG. 49 the advanced technology back plane 414 is a connection point for all of the components that make up the peripheral enclosure 410. These components include fifteen storage device drives 411, blowers 413, controller cards 416 and power supplies 415. Using board-to-board connectivity, there is a bus impedance matching to achieve maximum data transfer rates and reduce error rates. The power supplies 415, the blowers 413, the personality boards 417 and all of the storage devices 411 connect directly to the back-plane 414 thereby reducing cabling and improving both functionality and reliability. The SAF-TE/SES, SCSI termination and other features are all built onto the back plane 414. There is a split bus in that the back plane 414 may be divided into dual channels. A Small Computer System Interface Accessed Fault Tolerant Enclosure module may be plugged into the personality board 412 in order to provide the user with the ability to monitor all of the aspects of the enclosure. These aspects include cooling, power supplies and device activity from a remote computer system that is connected to the peripheral enclosure through a host or network connection. The module is designed to be universally plugged in it has two connections, one on each end. The module can be plugged in one way in order to enable it on the host channel or be flipped around the other way to enable it on the drive channel. The way the module is plugged in determines how it will interface with the host system.

Referring to FIG. 49 in conjunction with FIG. 46, FIG. 47 and FIG. 48 the first fifteen storage-device peripheral enclosure 410 is modular and fault-tolerant. There can be more than one power supply 415, more than one blower 413 and more than one controller card 416. If any one of the components fails the other one will continue to adequately run the peripheral enclosure 410. If a power supply 415 fails out there is at least one power supply 415 still left. The remaining power supply 415 will provide enough power to run the peripheral enclosure 410. These modular components are hot-swappable so that the unit does not have to be shut down to replace the component. If a power supply 415 has failed it is simply replaced with a new one while the first ten storage-device peripheral enclosure 410 continues to run uninterrupted. The special connectors that are used on the power supplies 415 have specially designed pins that are staggered and allow hot swapping. If the user decides to install two controller cards, they can be setup in a fault-tolerant configuration. This configuration provides that if one of the controller cards 416 fails, the other controller card 416 will continue to work without causing system downtime. The special connectors are used on the back plane 414 and allow a failed controller card 416 to be replaced while the system continues to function.

Referring to FIG. 50 a second fifteen device peripheral enclosure 510 includes fifteen storage devices 511, fifteen canister 512, two blowers 513, a back plane 514, two power supplies 515 and two personality boards 517. The personality boards 517 are located in the back of the second fifteen-bay peripheral enclosure 510.

Figure 53:
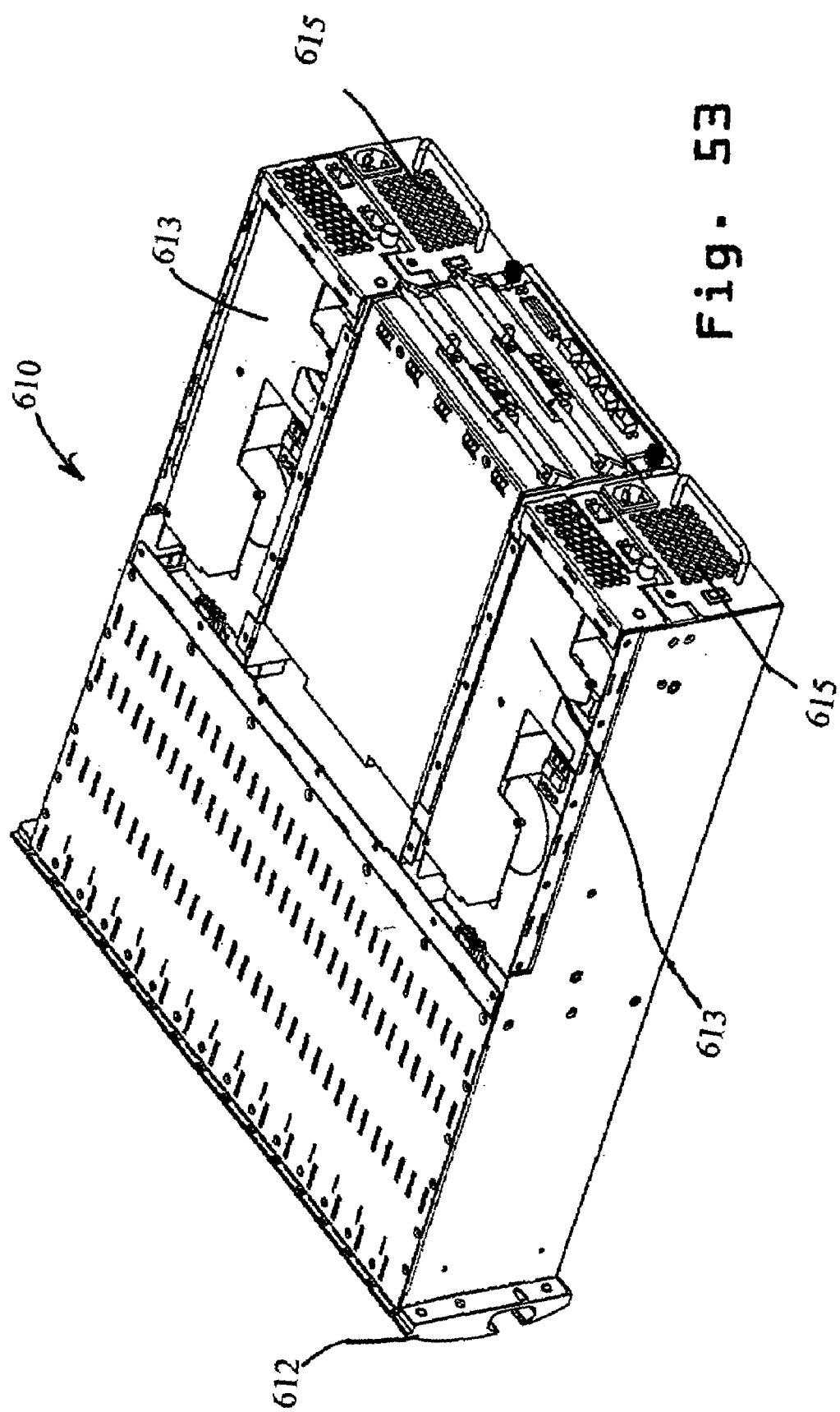
FIG. 53 is a rear perspective view of the third rack-mountable fifteen storage-device peripheral enclosure of FIG. 51.
Figure 54:
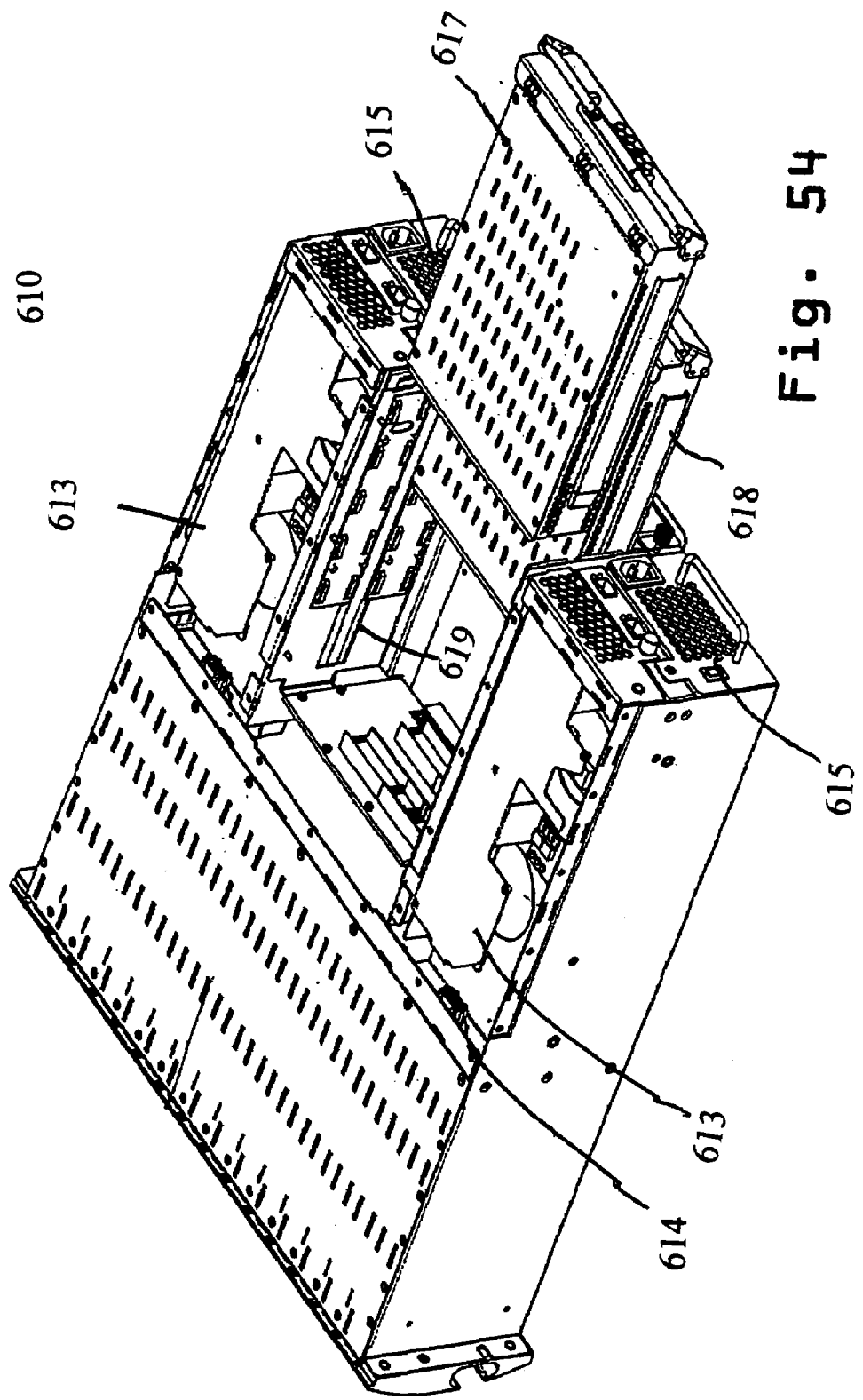
FIG. 54 is a rear exploded view of the third rack-mountable fifteen storage-device peripheral enclosure of FIG. 51.

Referring to FIG. 51 in conjunction with FIG. 52, FIG. 53 and FIG. 54 a third fifteen device peripheral enclosure 610 includes fifteen storage devices 611, fifteen canisters 612, two blowers 613, a back plane 614, two power supplies 615, two personality boards 617 and two carriers 618. Each of the two personality boards 617 is disposed in one of the two carriers 618. The carriers 618 are located in the back of the third fifteen storage-device peripheral enclosure 610. The personality boards 617 plug into the back plane 614. The personality boards 617 are connected to the two power supplies 615 and SAF-TE/SES. The personality boards 617 are also connected to the storage devices 611 that are connected to the opposite side of the back plane 614. The storage devices 611 of the third fifteen storage-device peripheral enclosure 610 may include an array of fifteen Small Computer System Interface storage disk drives 611 that have a low voltage differential. The third fifteen storage-device peripheral enclosure 610 may be used in either Just-A Bunch of Drives applications or Redundant Array of Independent Disks applications.

Figure 55:
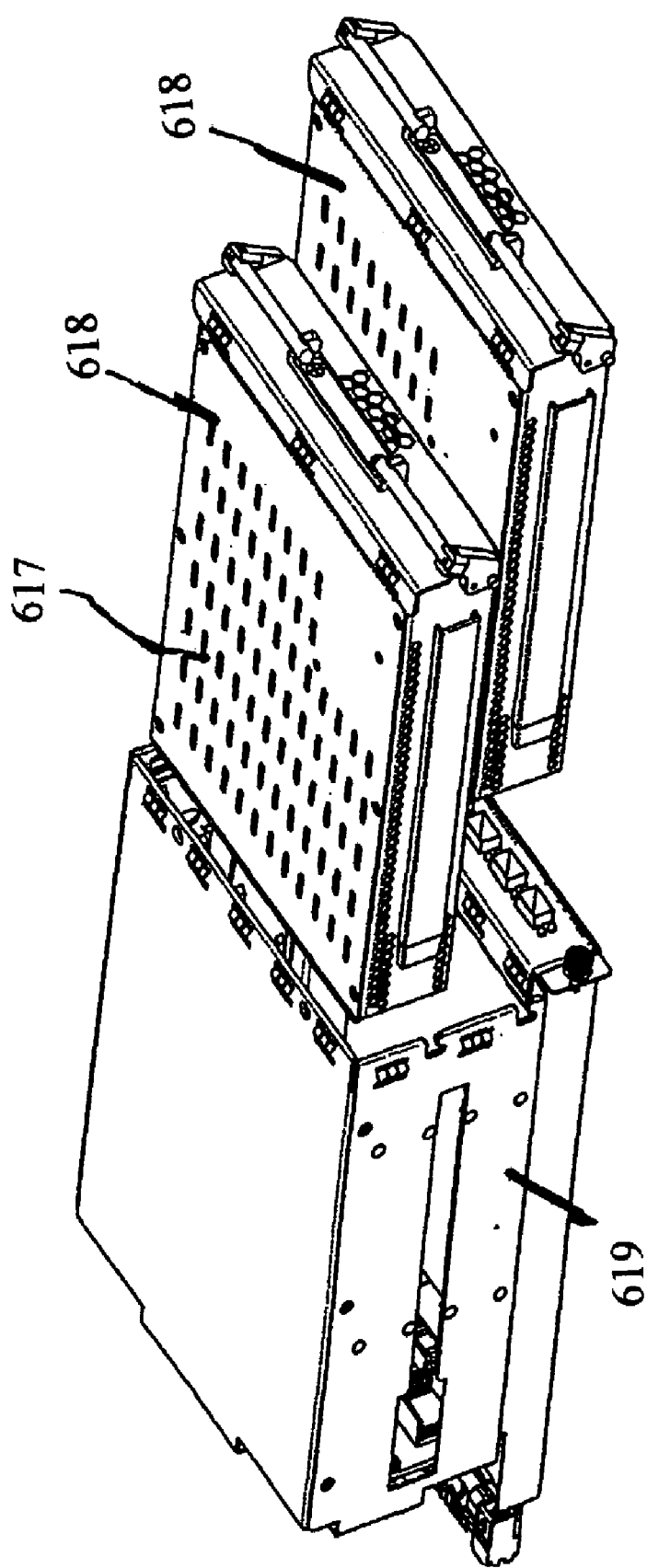
FIG. 55 is an exploded view of dual personality boards and a container for the dual personality boards of the third rack-mountable fifteen storage-device peripheral enclosure of FIG. 51.
Figure 56:
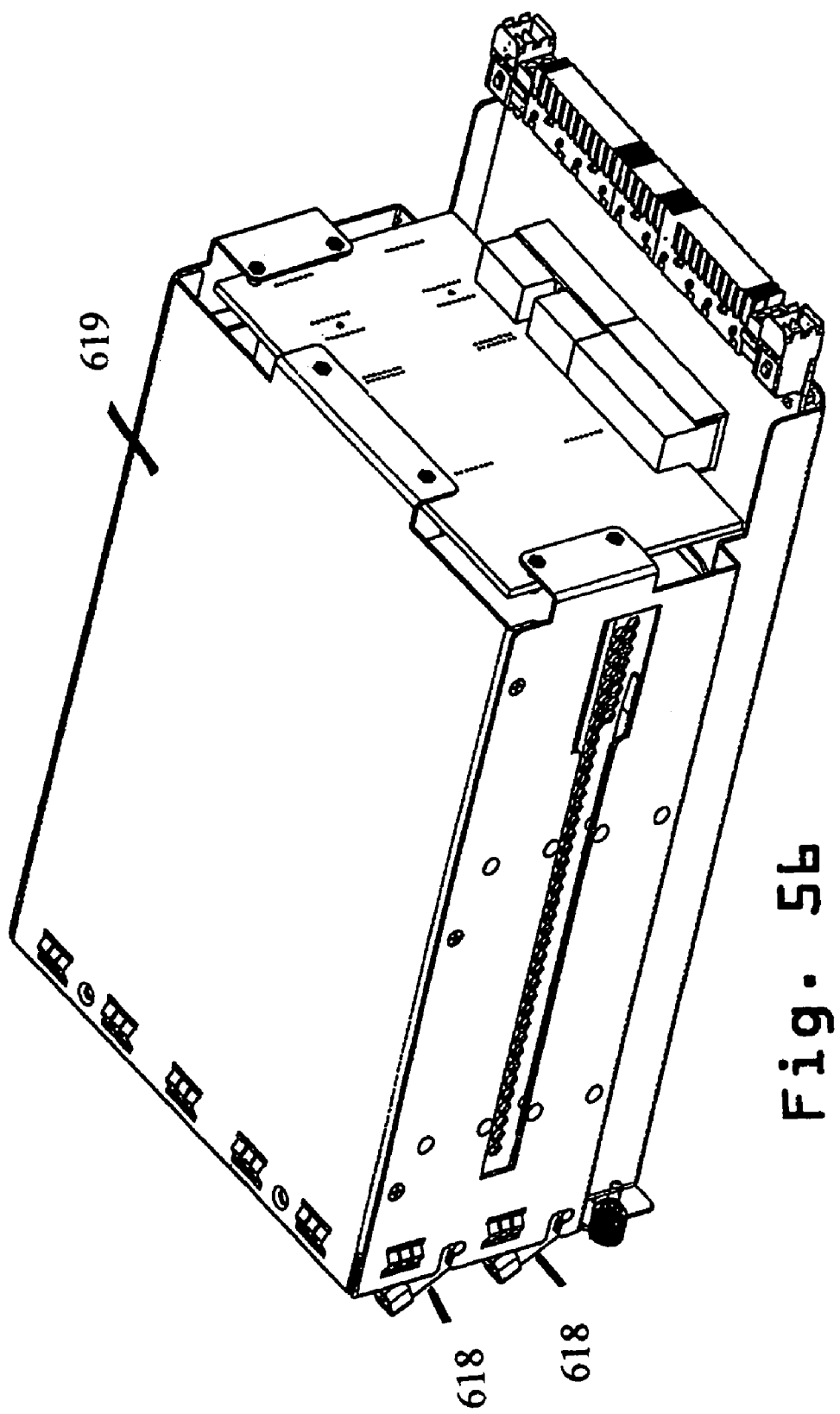
FIG. 56 is a front view of the container of the third rack-mountable fifteen storage-device peripheral enclosure of FIG. 55.

Referring to FIG. 55 in conjunction with FIG. 56 the third rack-mountable fifteen storage-device peripheral enclosure 610 also includes dual personality boards 617, two carriers 618 for the dual personality boards 618 and a container 619 for the two carriers 618.

Figure 57:
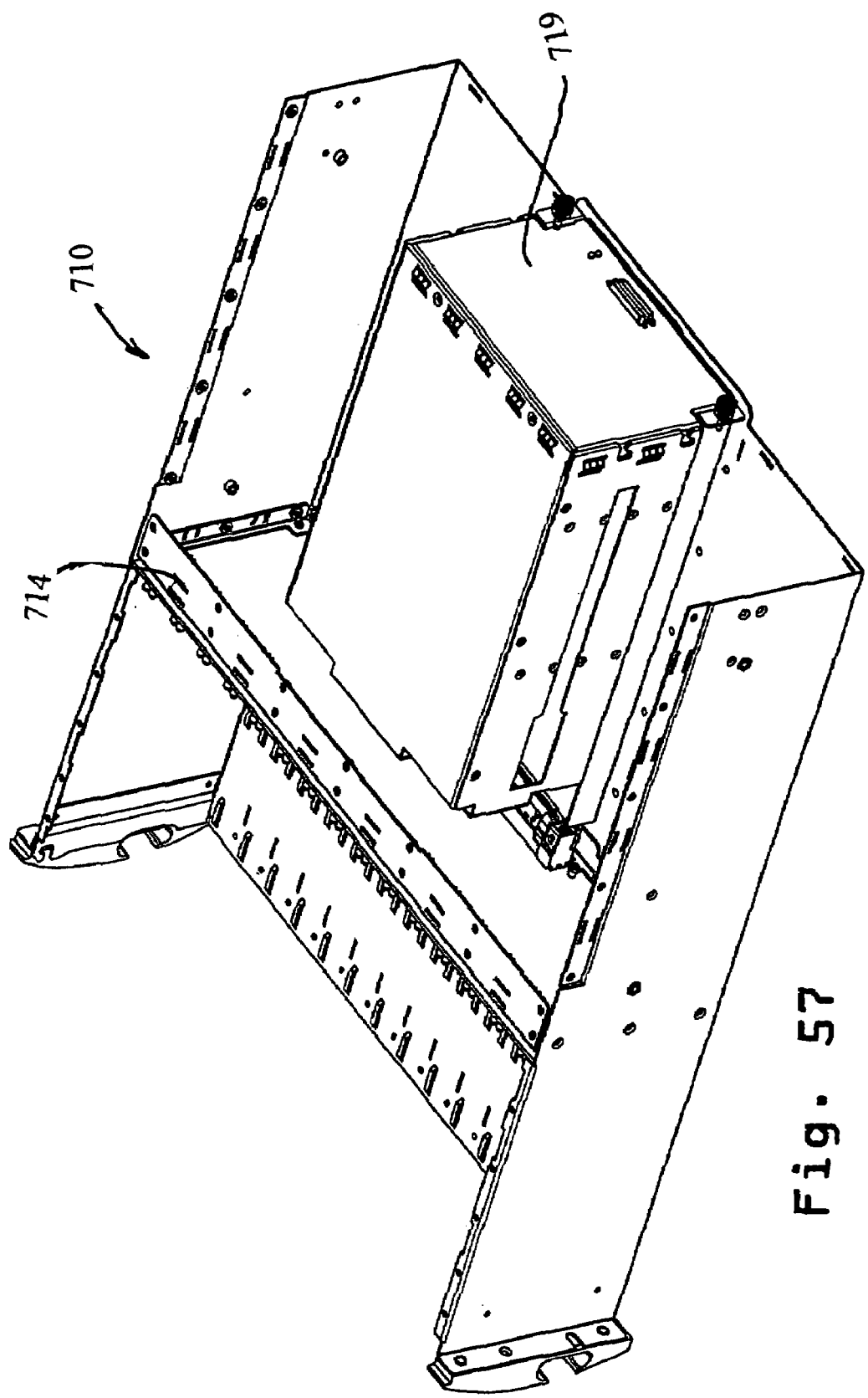
FIG. 57 is a rear perspective view of a container that a user may insert his own controller cards and personality boards, a back plane and a casing for a fourth rack-mountable fifteen storage-device peripheral enclosure.
Figure 58:
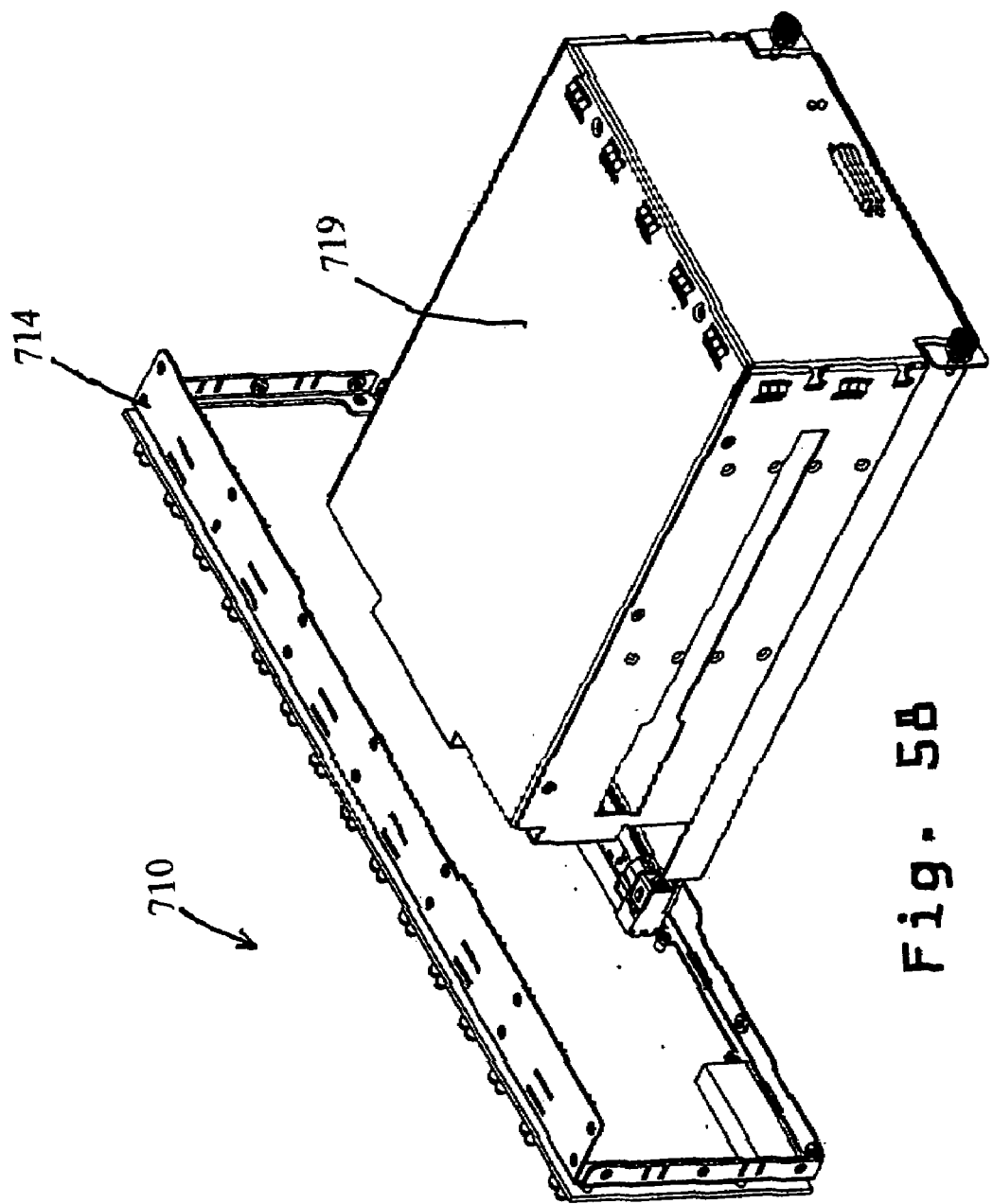
FIG. 58 is a rear perspective view of the container and the back plane for the fourth rack-mountable fifteen storage-device peripheral enclosure of FIG. 57.

Referring to FIG. 57 in conjunction with FIG. 58 a fourth rack-mountable fifteen storage-device peripheral enclosure includes casing 710, a back plane 714 and a container 719 that a user may insert his own controller cards and personality boards.

Figure 59:
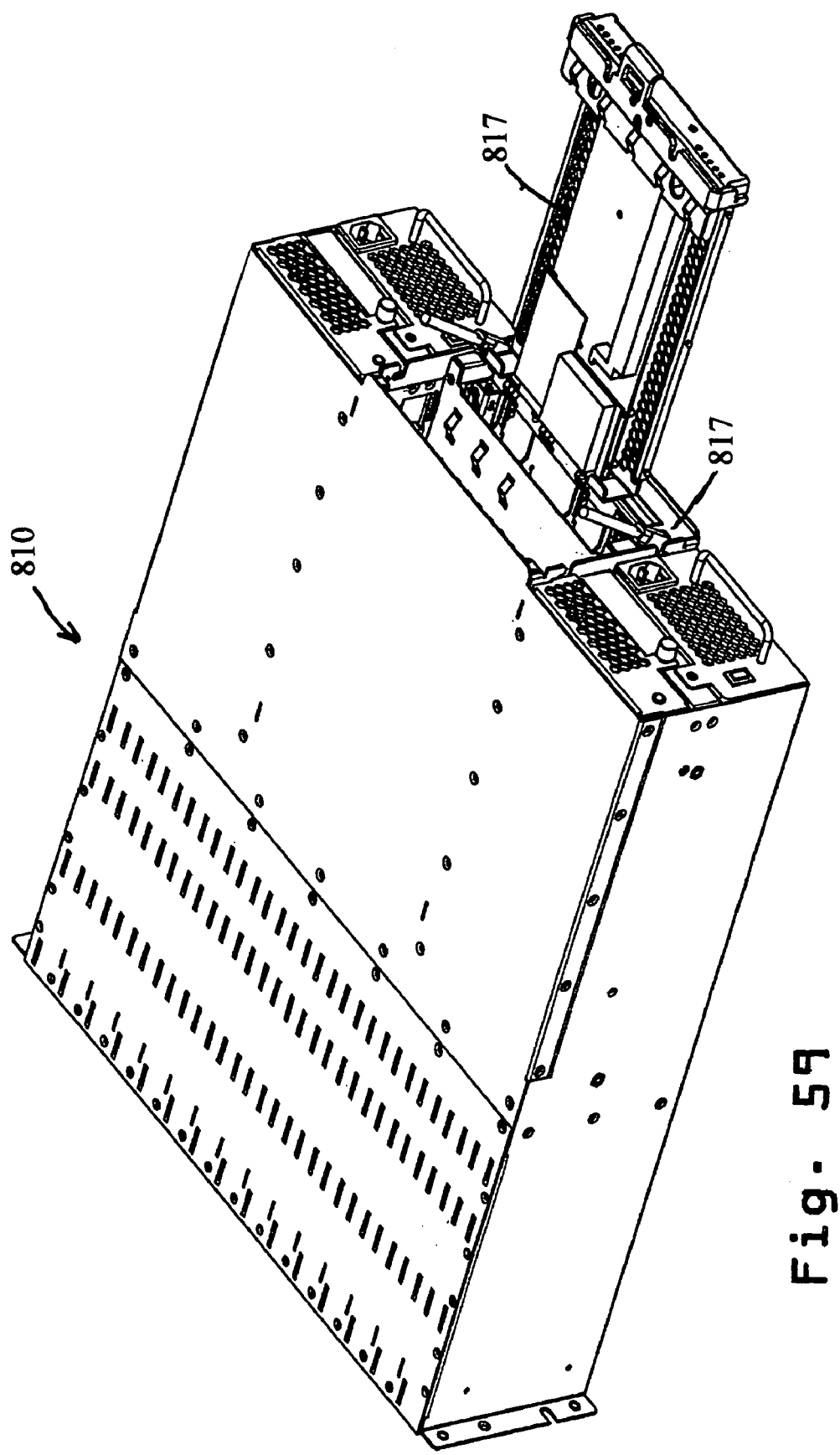
FIG. 59 is a rear perspective view of a fifth rack-mountable fifteen storage-device peripheral enclosure that includes a fifteen drive back plane, dual personality boards and two carriers for the dual personality boards.
Figure 60:
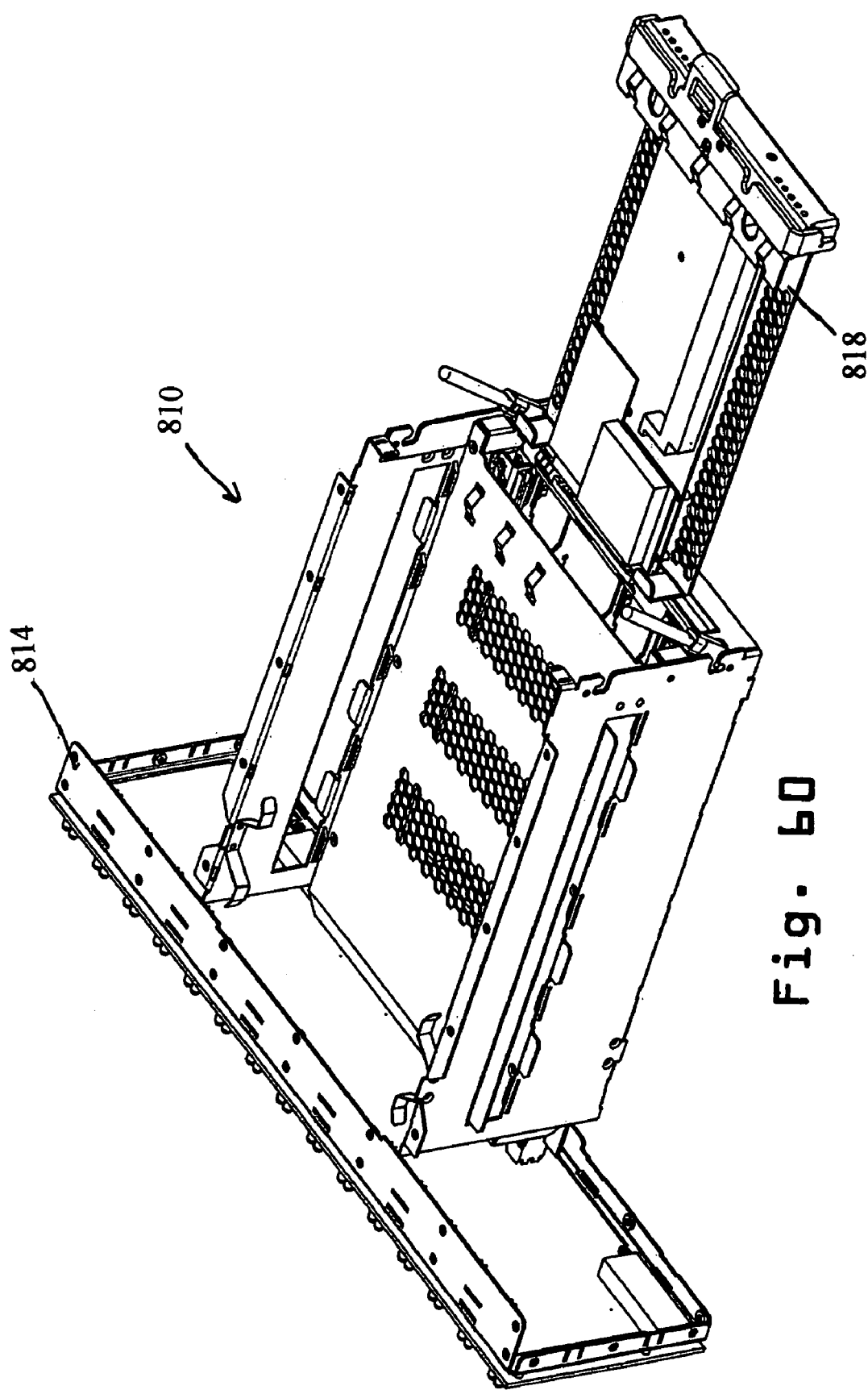
FIG. 60 is an exploded rear perspective view of the dual personality boards, the two carriers and the back plane for the fifth rack-mountable fifteen storage-device peripheral enclosure of FIG. 59.
Figure 61:
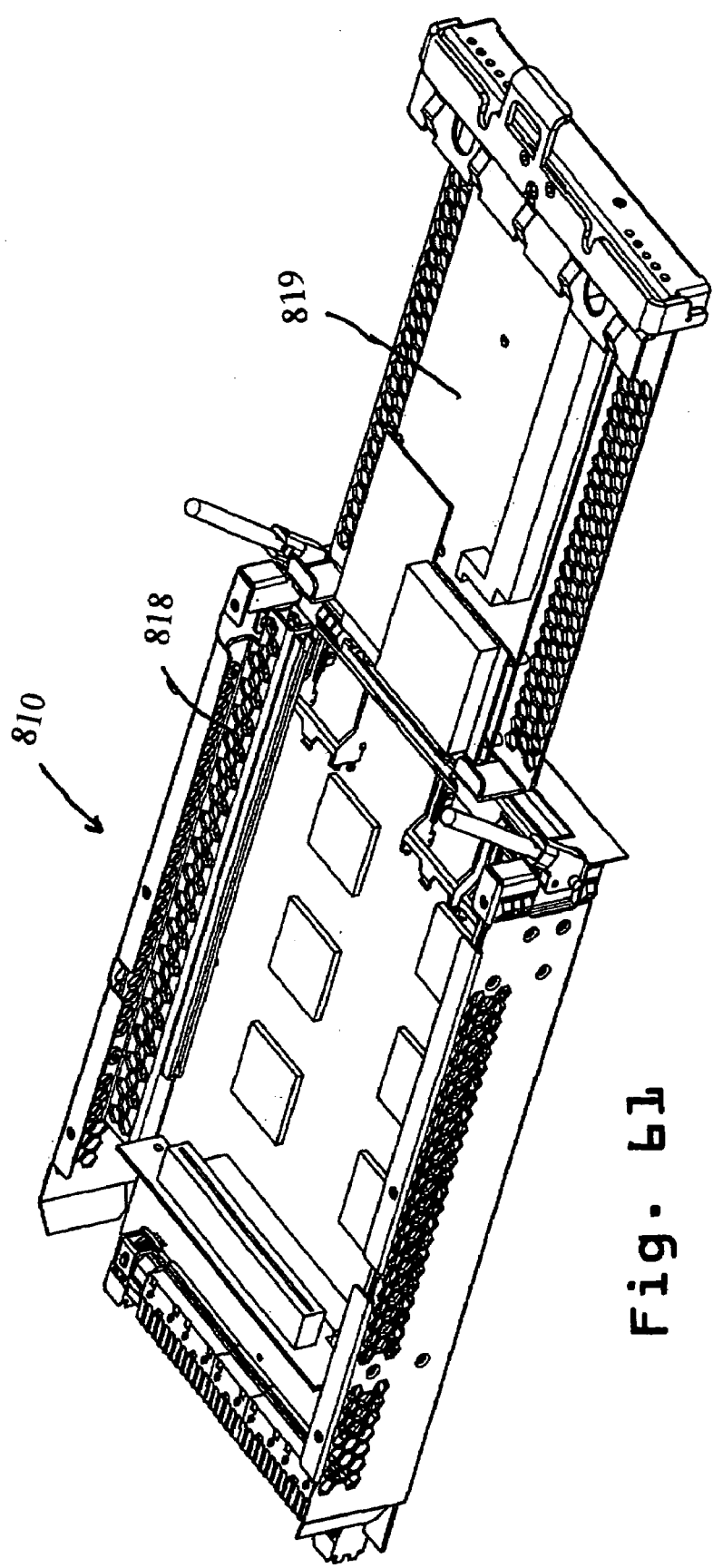
FIG. 61 is an exploded rear perspective view of one of the dual personality boards and one of the two carriers for the fifth rack-mountable fifteen storage-device peripheral enclosure of FIG. 59.

Referring to FIG. 59 in conjunction with FIG. 60 and FIG. 61 a fifth rack-mountable fifteen storage-device peripheral enclosure includes casing 810, a back plane 814, dual personality boards 817 and two carriers 818 for the dual personality boards 817.

Figure 62:
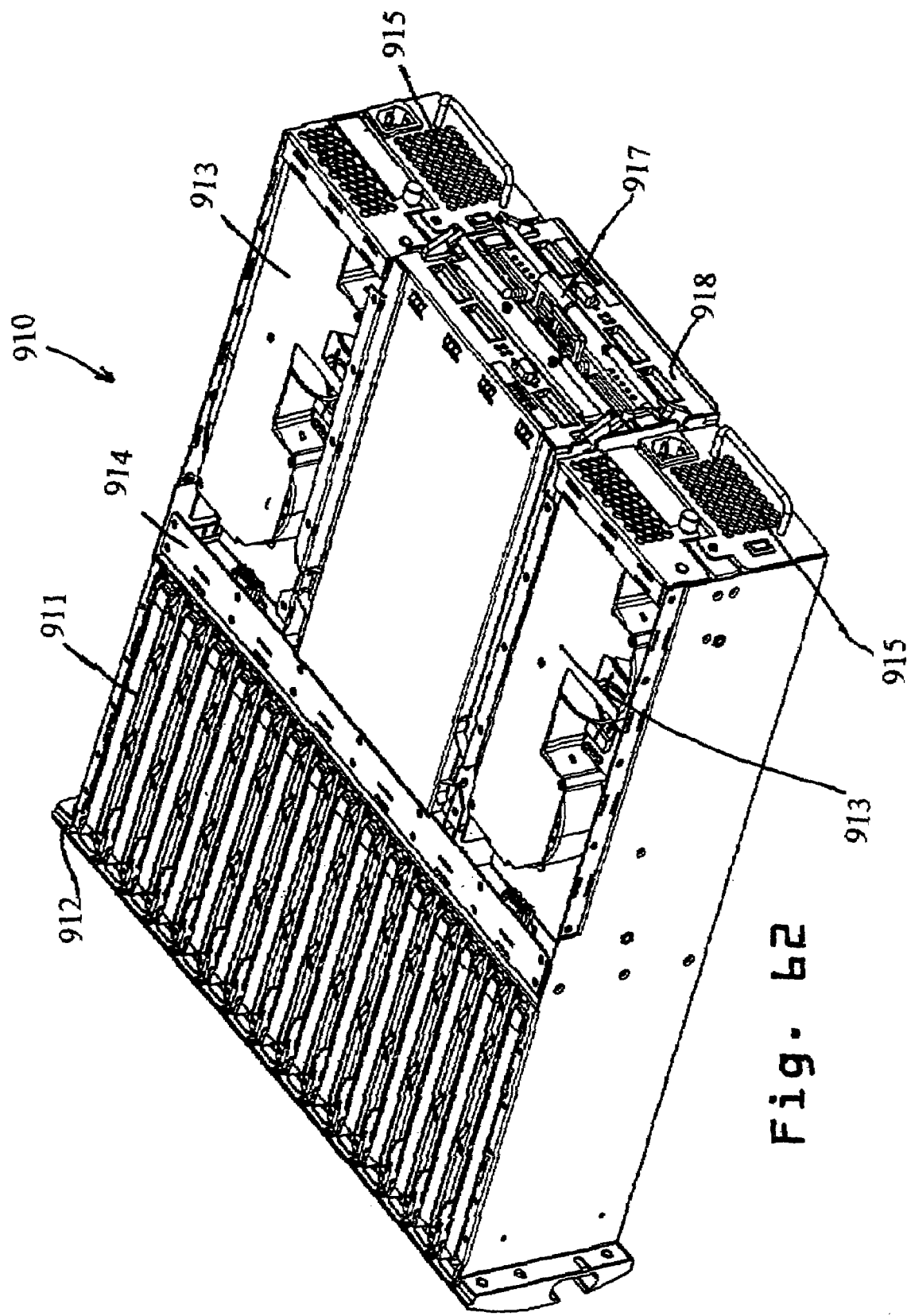
FIG. 62 is a rear perspective view of a sixth rack-mountable fifteen storage-device peripheral enclosure that includes a fifteen drive back plane, dual personality boards and two carriers for the dual personality boards.
Figure 63:
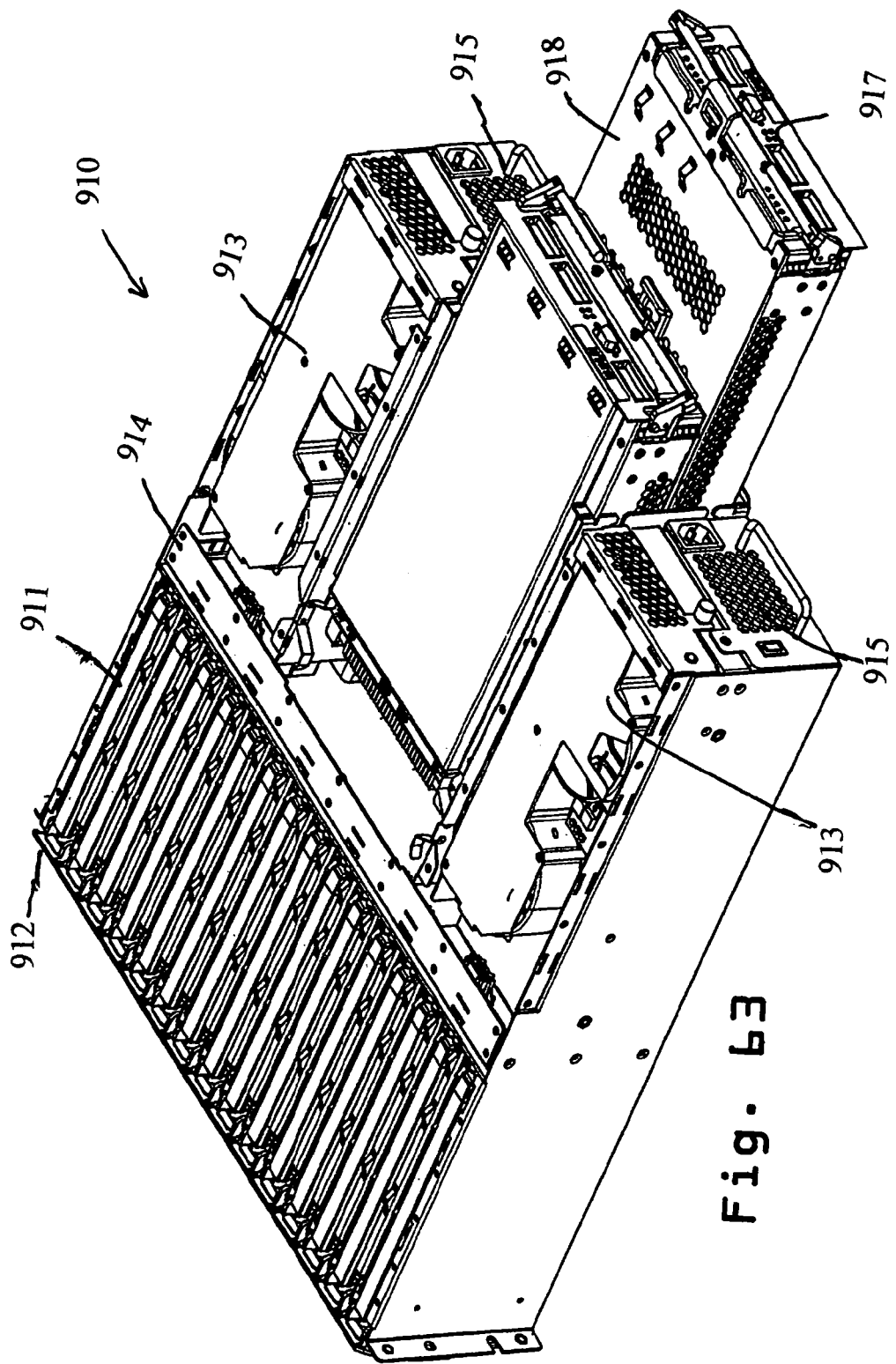
FIG. 63 is an exploded rear perspective view of the dual personality boards and the back plane for the sixth rack-mountable fifteen storage-device peripheral enclosure of FIG. 63.

Referring to FIG. 62 in conjunction with FIG. 63 a sixth rack-mountable fifteen storage-device peripheral enclosure includes casing 910, fifteen storage device 911, fifteen canister 912, two blowers 913, a back plane 914, two power supplies 915 and dual personality boards 917.

Figure 64:
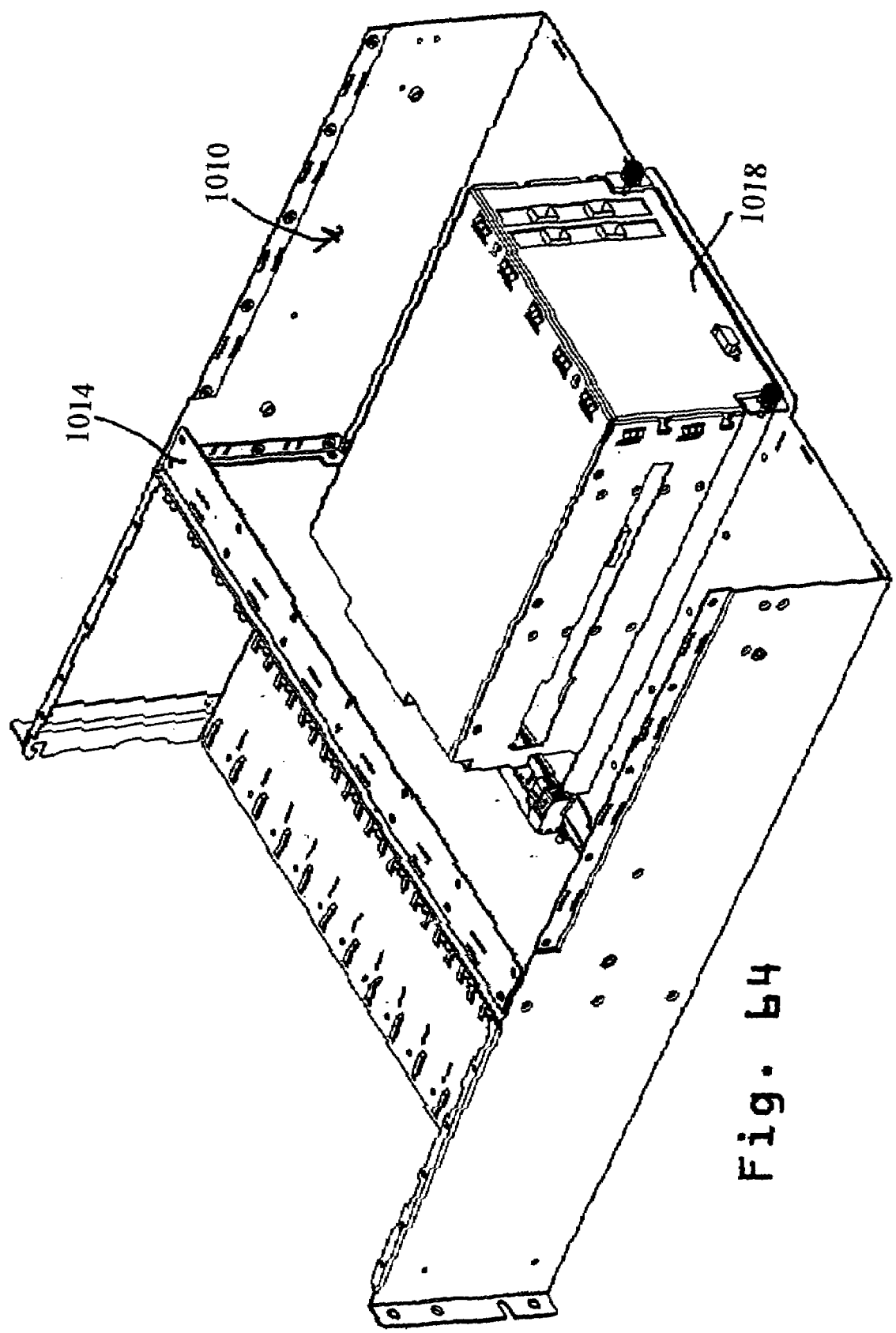
FIG. 64 is a rear perspective view of casing, a circuit board, a container that a user may insert his own controller cards and personality boards, a back plane for a seventh rack-mountable fifteen storage-device peripheral enclosure.
Figure 65:
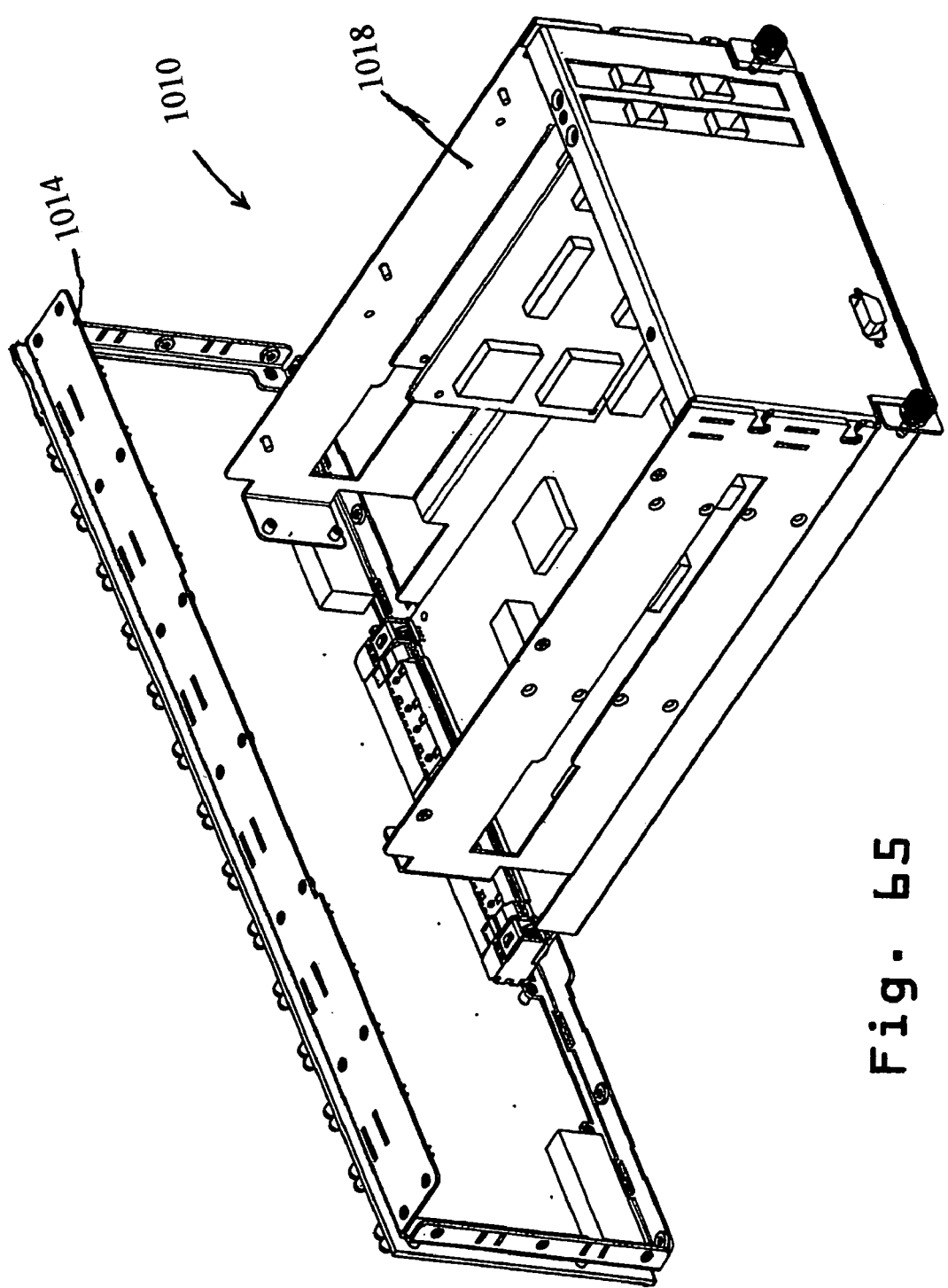
FIG. 65 is a rear perspective view of the circuit board, the container and the back plane for a seventh rack-mountable fifteen storage-device peripheral enclosure of FIG. 64.
Figure 66:
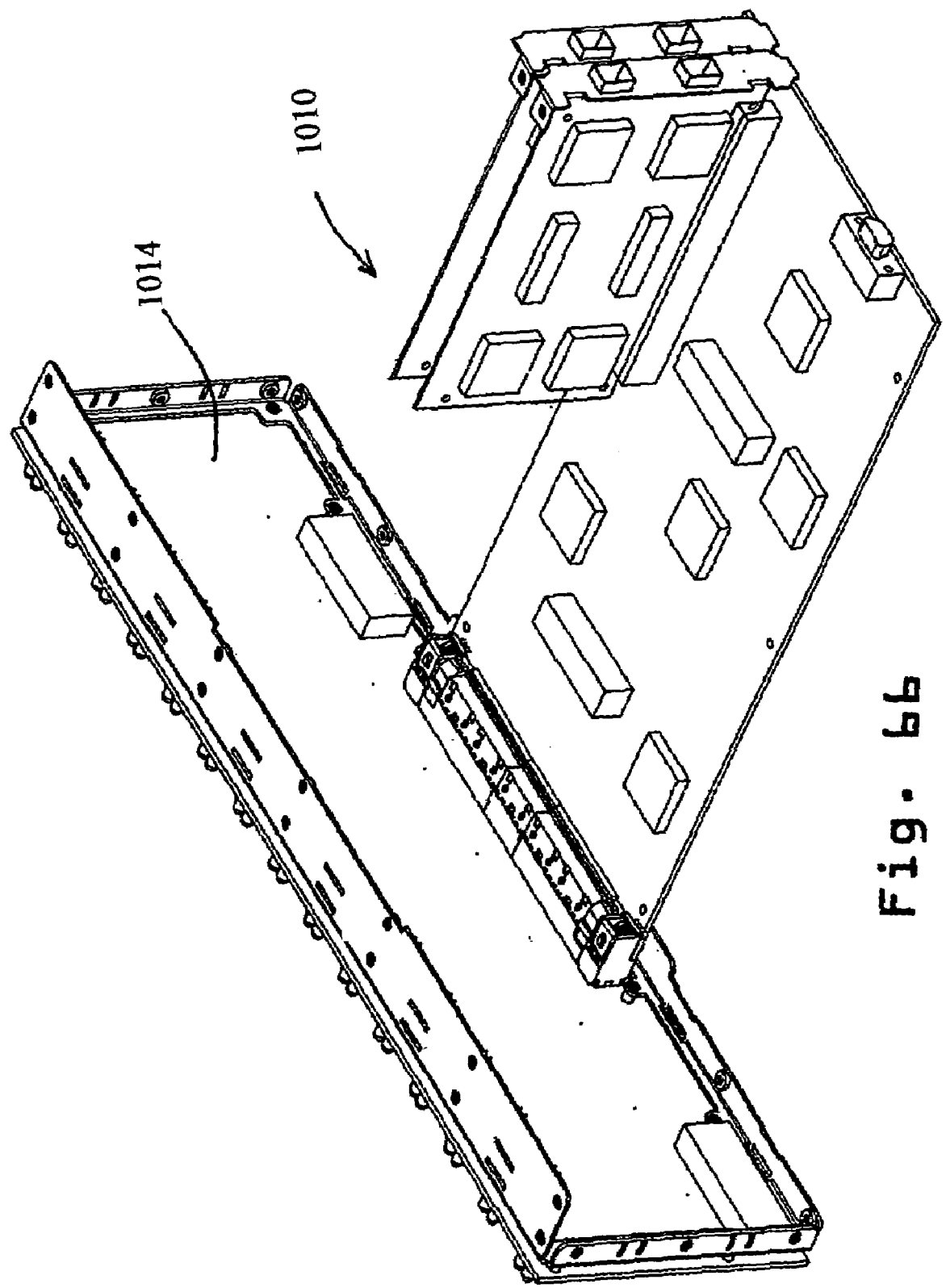
FIG. 66 is a rear perspective view of the circuit board and the back plane for a seventh rack-mountable fifteen storage-device peripheral enclosure of FIG. 64.

Referring to FIG. 64 in conjunction with FIG. 65 and FIG. 66 a seventh rack-mountable fifteen storage-device peripheral enclosure 1010 includes casing, fifteen storage devices 1011 and fifteen canisters 1012. The seventh rack-mountable fifteen storage-device peripheral enclosure 1010 also includes two blowers 1013, a back plane 1014, two power supplies 1015 and a circuit board 1116 and a container 1019 that a user may insert his own controller cards and personality boards.

Figure 67:
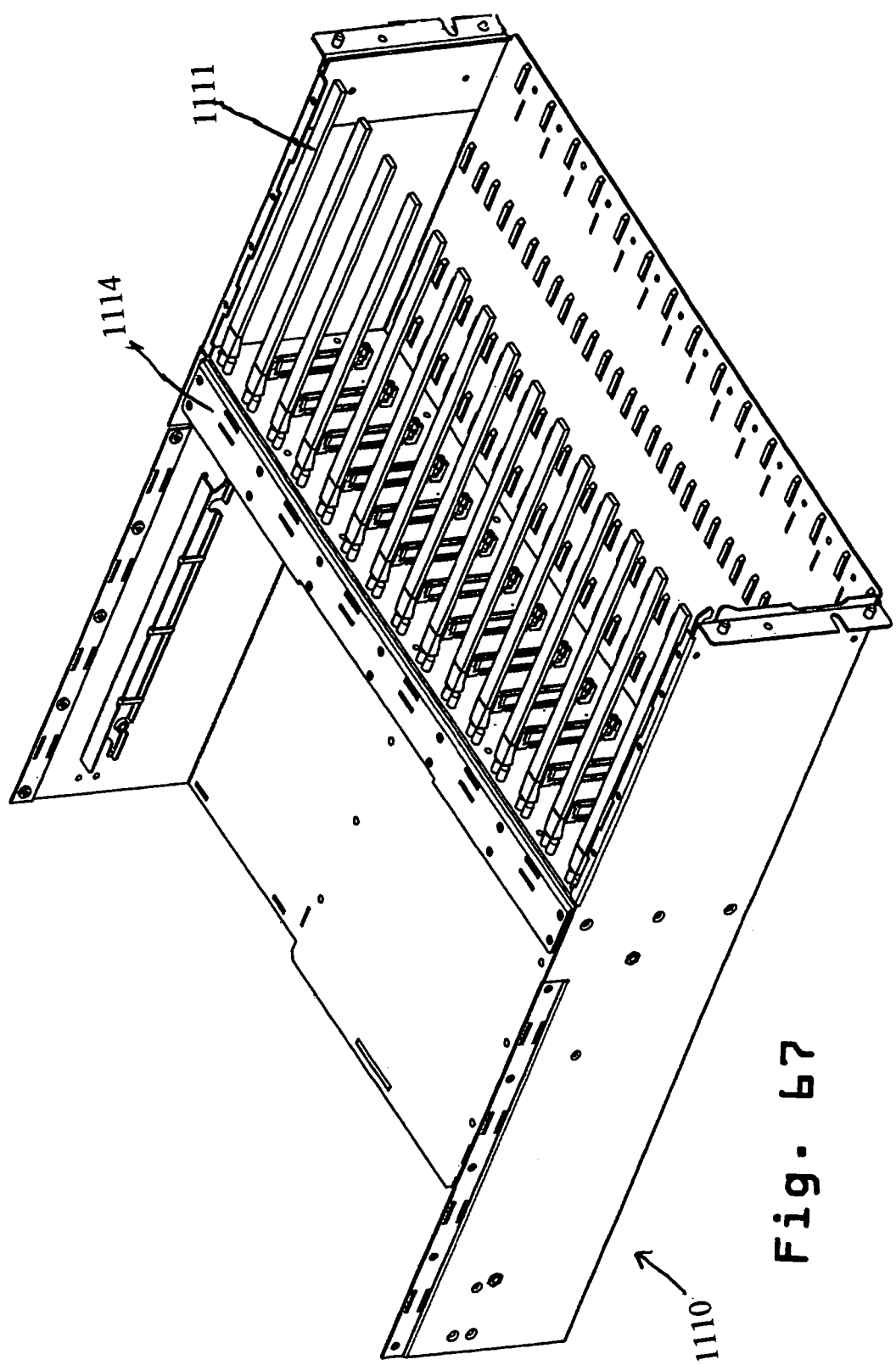
FIG. 67 is a front perspective view of casing and a back plane for an eighth rack-mountable fifteen storage-device peripheral enclosure.
Figure 68:
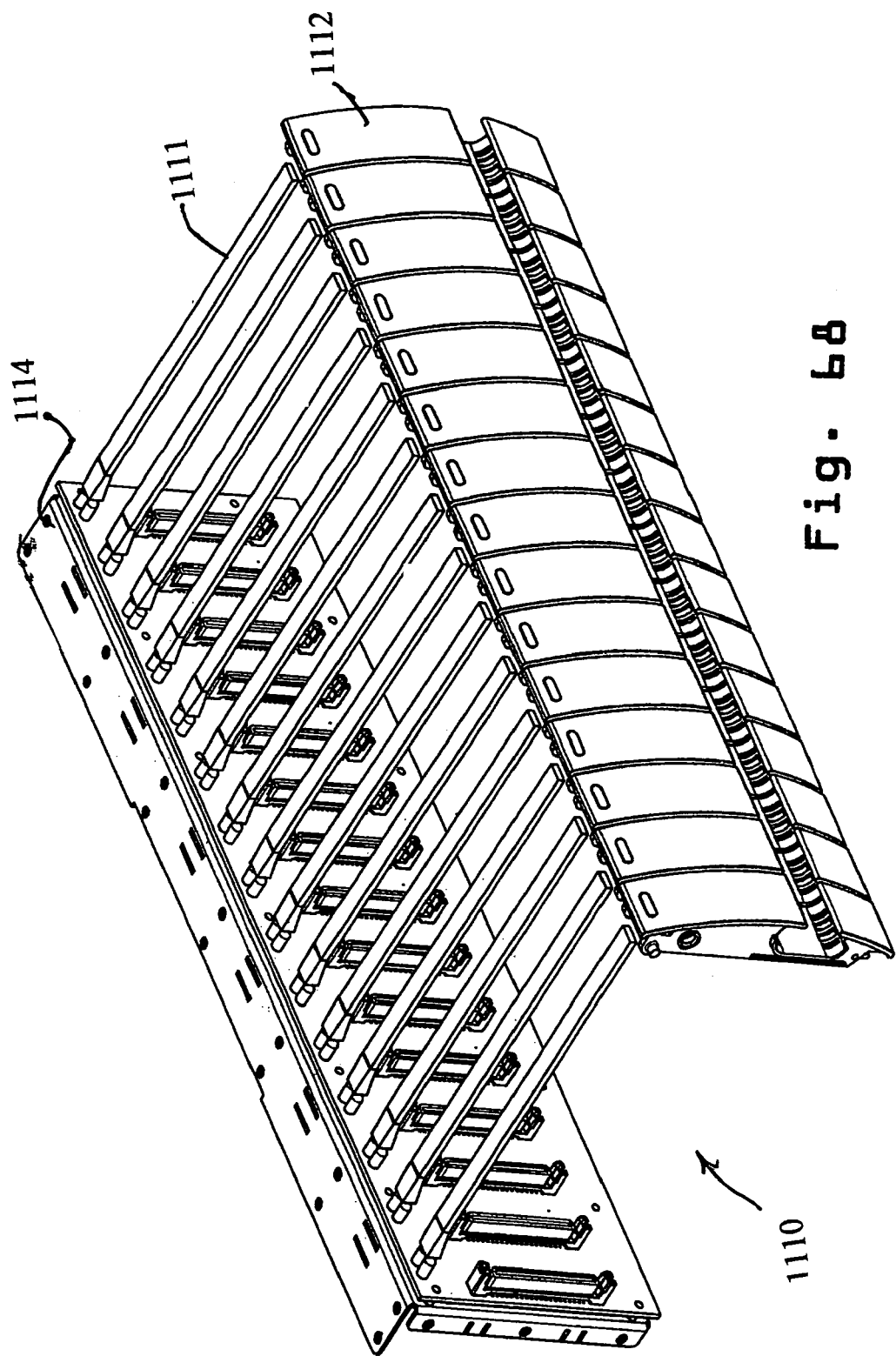
FIG. 68 is a front perspective view of the back plane and handles and light pipes of the fifteen storage devices for the eighth rack-mountable fifteen storage-device peripheral enclosure of FIG. 67.
Figure 69:
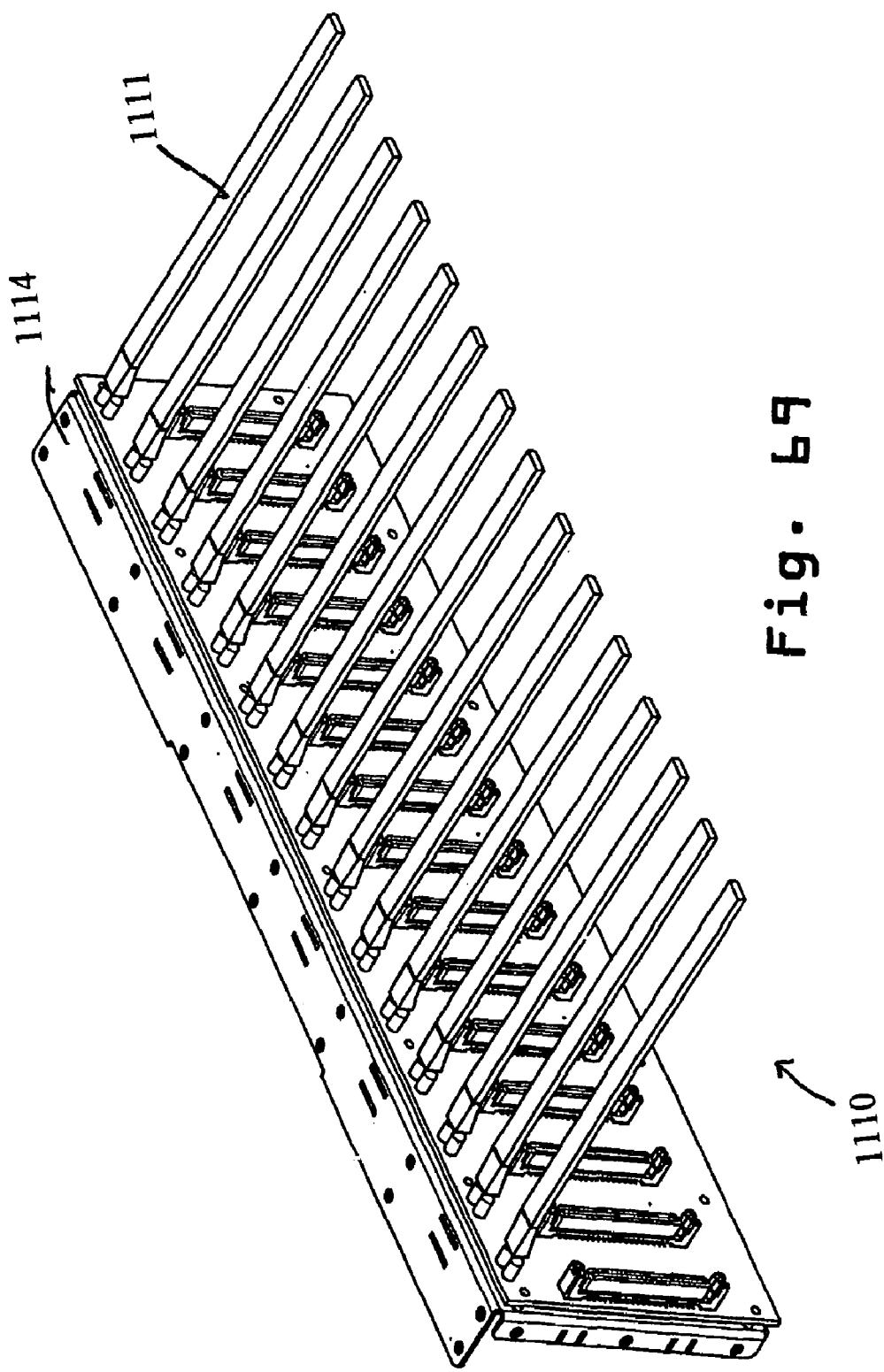
FIG. 69 is a front perspective view of the back plane and the light pipes of the fifteen storage devices for the eighth rack-mountable fifteen storage-device peripheral enclosure of FIG. 67.

Referring to FIG. 67 in conjunction with FIG. 68 and FIG. 69 an eighth rack-mountable fifteen storage-device peripheral enclosure 1110 includes casing, light pipes 1111 and handles 1112 of fifteen canisters and a back plane 1114.

Figure 70:
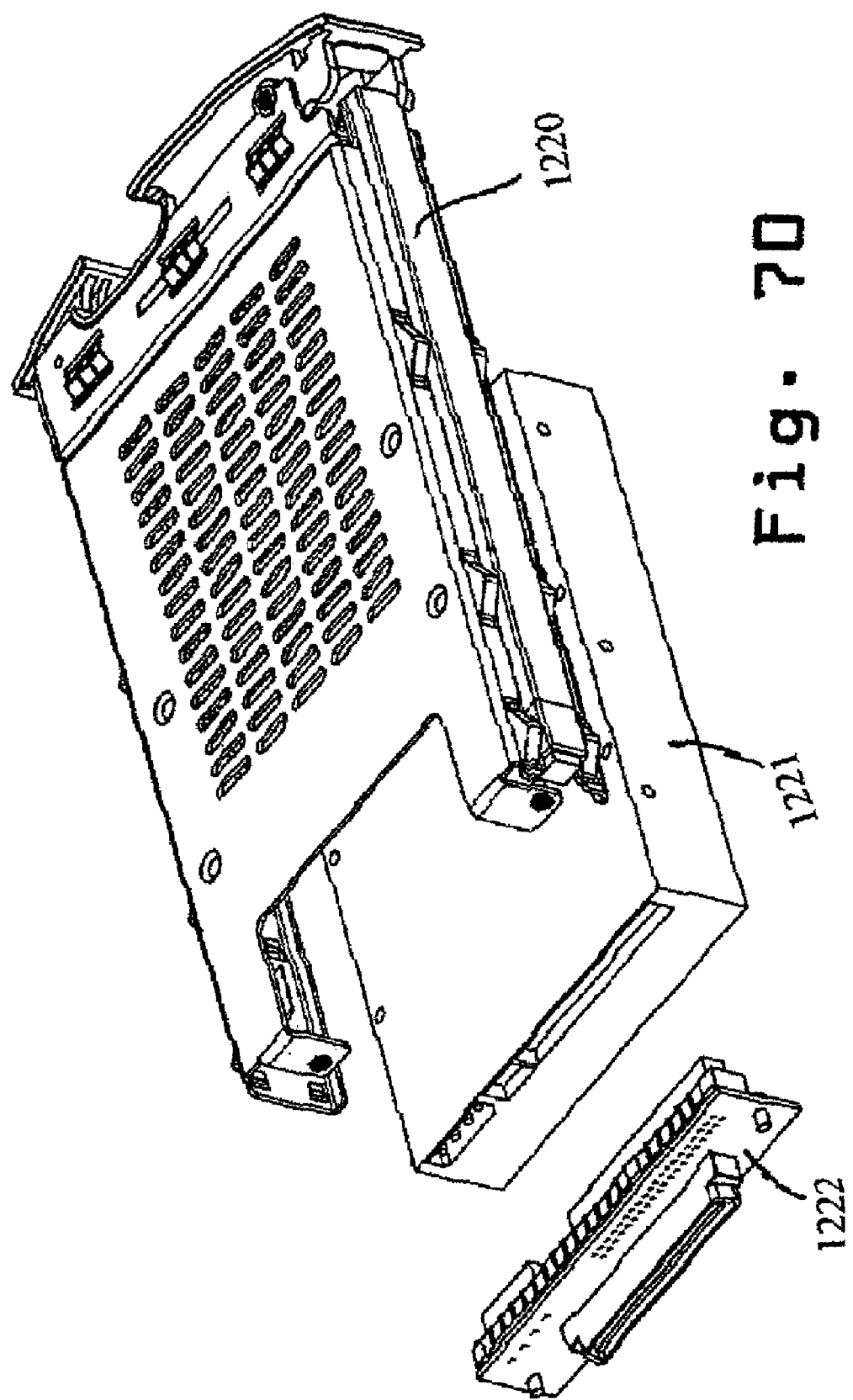
FIG. 70 is a rear perspective view of a canister, an electrical converter and a storage device.

Referring to FIG. 70 in conjunction with FIG. 69 the back plane has a connector. A canister 1220 holds a storage device 1221 and an electrical converter 1222. The electrical converter 1222 connects to the connector of the back plane.

Figure 71:
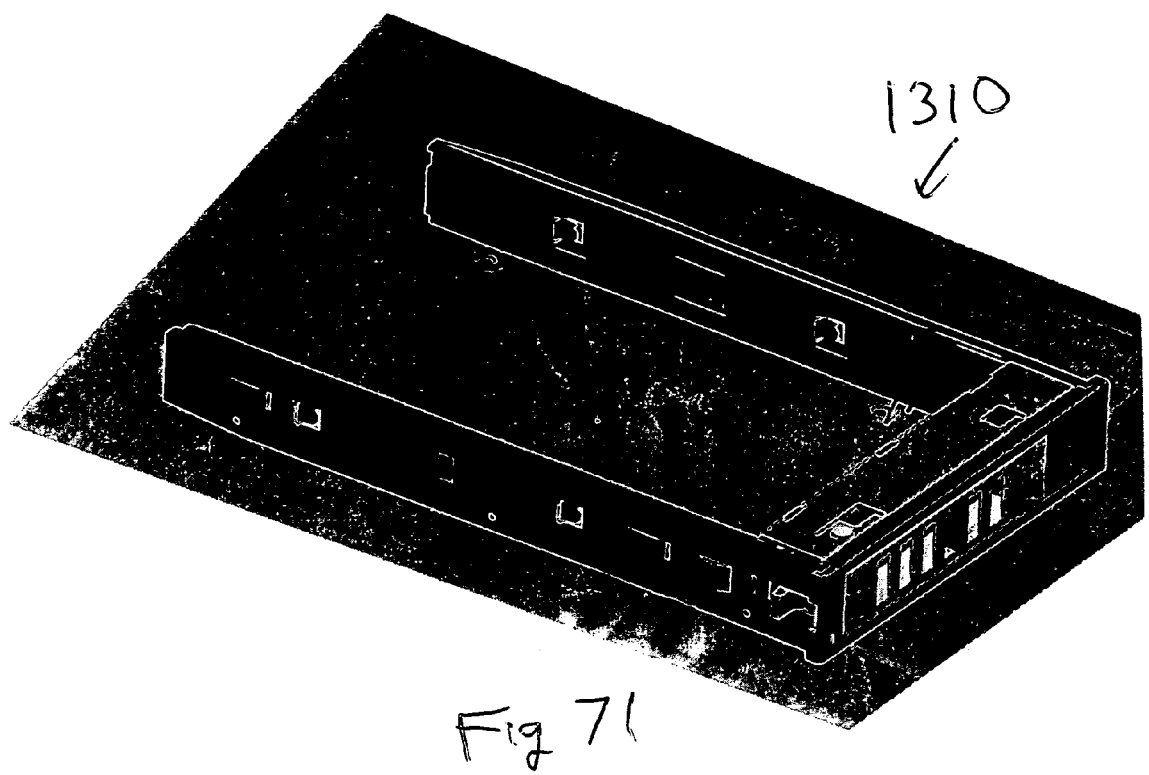
FIG. 71 is a perspective view of a canister having a u-shaped tray with a pair of side walls according to the invention.
Figure 76A:
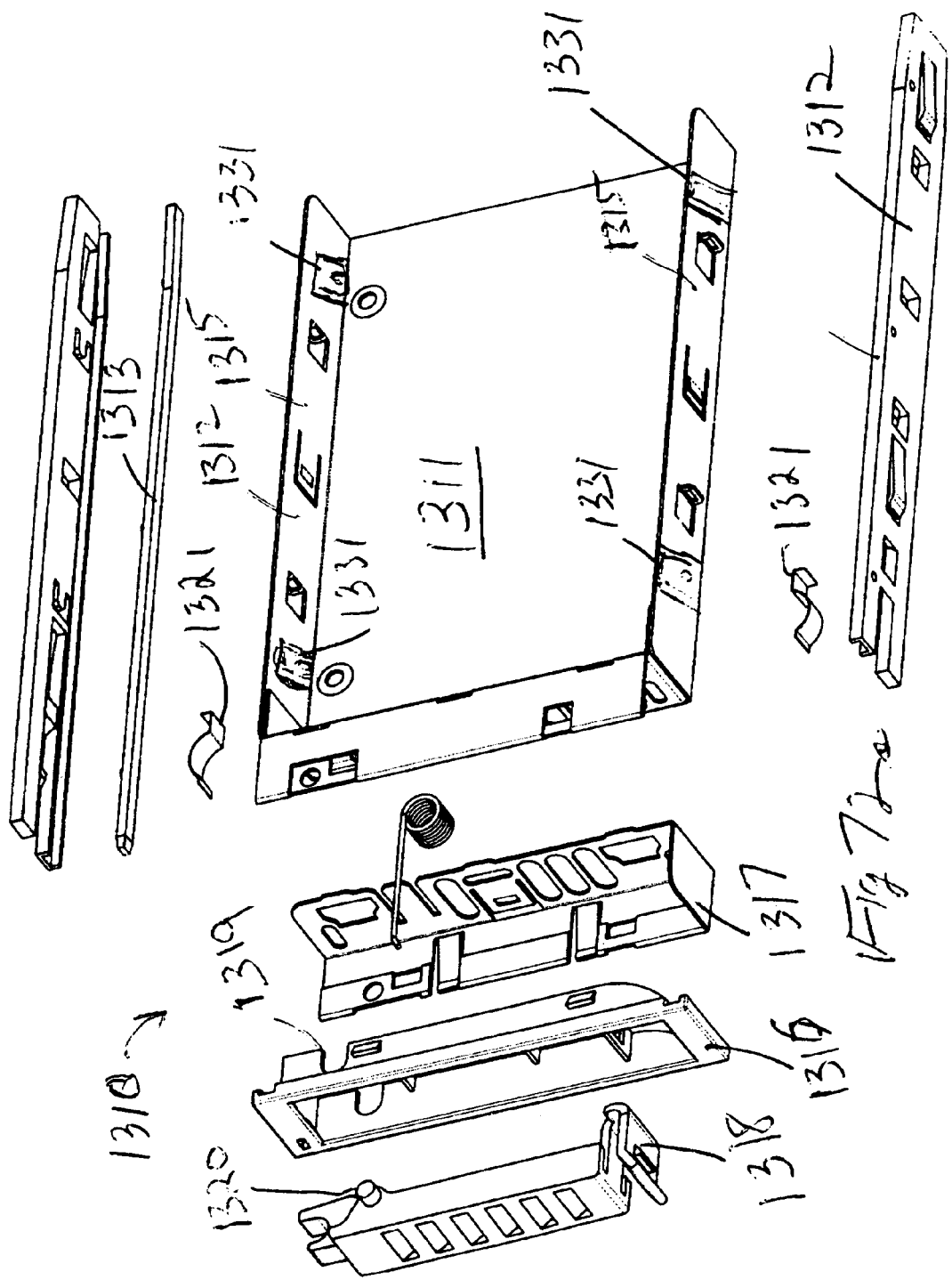

Referring to FIG. 71 in conjunction with FIG. 72 a canister 1310 includes a unshaped tray 1311 and two guide-rails 1312. The u-shaped tray 1311 has a rectangular cross-section and a depth. The canister 1310 also includes a light pipe system 1313 and a cam mechanism 1314. The u-shaped tray 1311 has two side walls 1315. The canister 1310 includes a front plate 1316, a front frame 1317 and a handle 1318. The front frame 1317 is mechanically coupled to the u-shaped tray 1311 and the front plate 1316. Each guide rail 1312 is mechanically coupled to one of the two side walls 1315 of the unshaped tray 1311. The cam mechanism 1314 has a pivot mount 1319 and a pin 1320. The pivot mount 1319 mechanically couples the handle 1318 to the u-shaped tray 1311. The u-shaped also has a plurality of flat springs 1321 that are disposed on the top outside surface and the bottom outside surface of the canister 10. The light pipe system 1313 includes a light pipe 1315 and a special lens 1316. The light pipe 1315 has an input end and an output end. A data storage device has a pair of side walls each of which has a pair of mounting holes. Each side wall 1315 of the u shaped tray 1311 has a pair of inward-directed protrusions 1331 each of which is aligned with one of the mounting holes of the data storage devices so that the storage device can be securely disposed with the u shaped tray.

From the foregoing it can be seen that a canister for use with a peripheral computer enclosure has been described.

Accordingly it is intended that the foregoing disclosure be considered only as an illustration of the principle of the present invention.

What is claimed is:

1. A canister for use with a data storage device and a casing of a computer peripheral enclosure with the casing having at least one compartment each of which has a rectangular cross-section and a depth and each of which also has two guide rail guides, said canister comprising a u-shaped tray having a rectangular cross-section and a depth which are slightly less than the rectangular cross-section and the depth of said compartment, respectively, a pair of side walls whereby said u-shaped tray is able to slide freely, but snugly, into said compartment of said casing, a front plate mechanically coupled to said u-shaped tray, a handle which mechanically couples said u-shaped tray to said compartment and a light pipe system having a light pipe mechanically coupled to said side wall; and a pair of guide rails each of which is mechanically coupled to said side walls of said u-shaped tray walls whereby said canister on said guide rails of said u-shaped tray slides freely, but snugly, into said compartment on the guide rail guides.

2. A canister for use with a data storage device and a casing of a computer peripheral enclosure with the casing having at least one compartment each of which has a rectangular cross-section and a depth and each of which also has two guide rail guides wherein the data storage device has a pair of side walls each of which has a pair of mounting holes, said canister comprising a u-shaped tray having a rectangular cross-section and a depth which are slightly less than the rectangular cross-section and the depth of said compartment, respectively, and also having a pair of side walls whereby said u-shaped tray is able to slide freely, but snugly, into said compartment of said casing wherein said u shaped tray has a pair of inward-directed protrusions each of which is aligned with one of the mounting holes of the data storage devices so that the storage device can be securely disposed with said u shaped tray; and a pair of guide rails each of which is mechanically coupled to said side walls of said u-shaped tray walls whereby said canister on said guide rails of said u-shaped tray slides freely, but snugly, into said compartment on the guide rail guides.

* * * * *